US010847150B2

(12) United States Patent
Seok et al.

(10) Patent No.: US 10,847,150 B2
(45) Date of Patent: Nov. 24, 2020

(54) DIALOGUE SYSTEM, VEHICLE HAVING THE SAME AND DIALOGUE SERVICE PROCESSING METHOD

(71) Applicants: Hyundai Motor Company, Seoul (KR); Kia Motors Corporation, Seoul (KR)

(72) Inventors: Donghee Seok, Suwon-Si (KR); Dongsoo Shin, Suwon-Si (KR); Jeong-Eom Lee, Yongin-Si (KR); Ga Hee Kim, Seoul (KR); Seona Kim, Seoul (KR); Jung Mi Park, Anyang-Si (KR); HeeJin Ro, Seoul (KR); Kye Yoon Kim, Gunpo-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 16 days.

(21) Appl. No.: 15/833,833

(22) Filed: Dec. 6, 2017

(65) Prior Publication Data

US 2019/0115016 A1 Apr. 18, 2019

(30) Foreign Application Priority Data

Oct. 13, 2017 (KR) ........................ 10-2017-0132913

(51) Int. Cl.
*G10L 15/22* (2006.01)
*G10L 15/18* (2013.01)

(52) U.S. Cl.
CPC .......... *G10L 15/22* (2013.01); *G10L 15/1815* (2013.01); *G10L 2015/223* (2013.01); *G10L 2015/228* (2013.01)

(58) Field of Classification Search
CPC ...................................................... G10L 15/22
See application file for complete search history.

(56) References Cited

U.S. PATENT DOCUMENTS

| | | | |
|---|---|---|---|
| 2008/0235017 A1* | 9/2008 | Satomura | G10L 15/22 704/246 |
| 2010/0216509 A1* | 8/2010 | Riemer | H04M 1/72577 455/557 |
| 2012/0015686 A1* | 1/2012 | Krupnik | A63H 30/04 455/550.1 |
| 2013/0275875 A1* | 10/2013 | Gruber | G10L 15/22 715/728 |
| 2013/0275899 A1* | 10/2013 | Schubert | G06F 3/0481 715/765 |
| 2016/0104486 A1* | 4/2016 | Penilla | H04L 67/12 704/232 |
| 2017/0162197 A1* | 6/2017 | Cohen | G06F 3/012 |
| 2018/0204570 A1* | 7/2018 | Puranik | G10L 15/22 |
| 2018/0204572 A1* | 7/2018 | Manabe | G10L 15/30 |

* cited by examiner

*Primary Examiner* — Douglas Godbold
(74) *Attorney, Agent, or Firm* — Morgan, Lewis & Bockius LLP

(57) ABSTRACT

A dialogue system is provided to assist a user while minimizing distraction and achieve safe driving by adjusting a level of a dialogue service based on a dialogue with the user in a vehicle driving environment and multiple kinds of information including vehicle state information, driving environment information, and user information, and a vehicle having the dialogue system and a dialogue service processing method is provided.

21 Claims, 34 Drawing Sheets

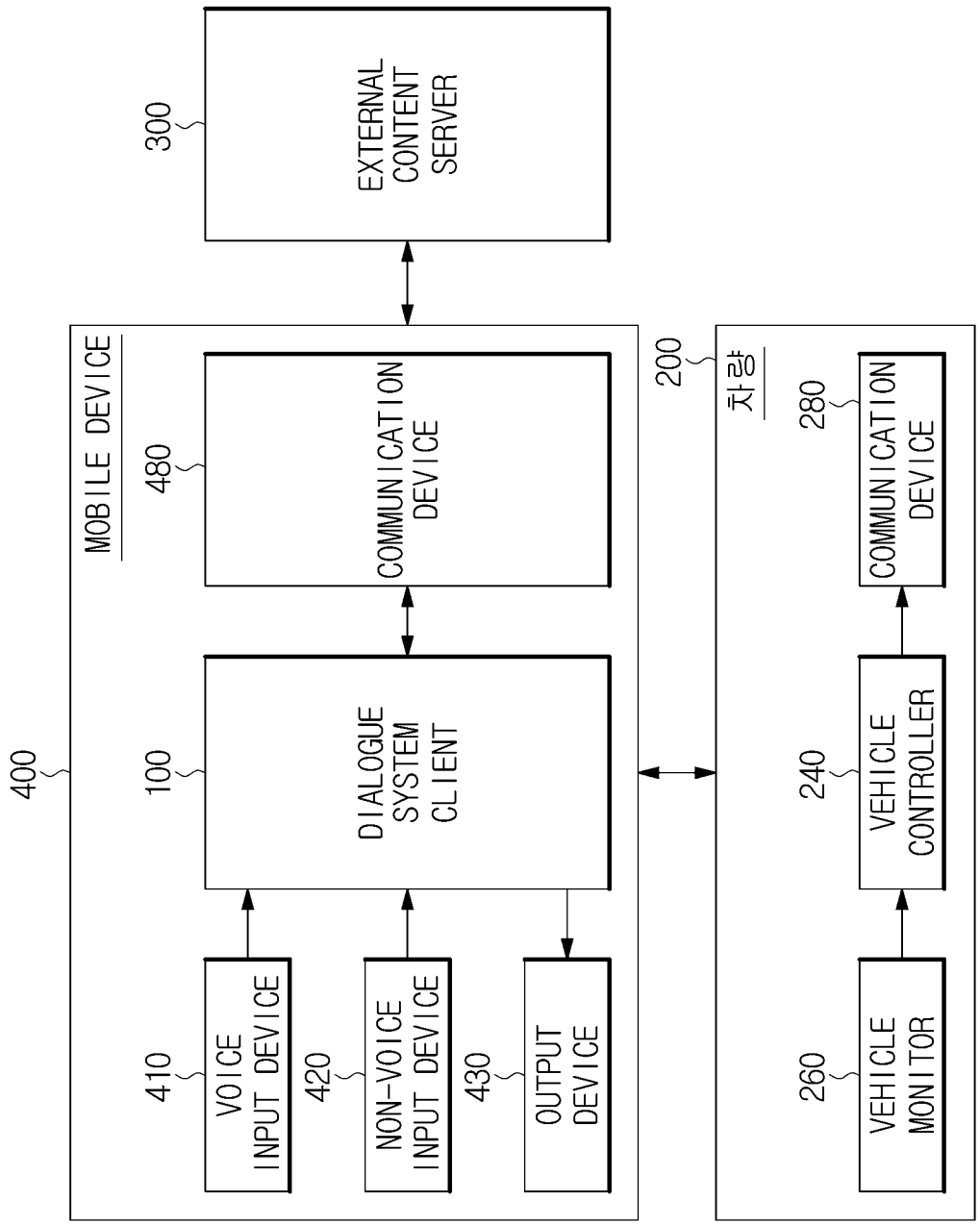

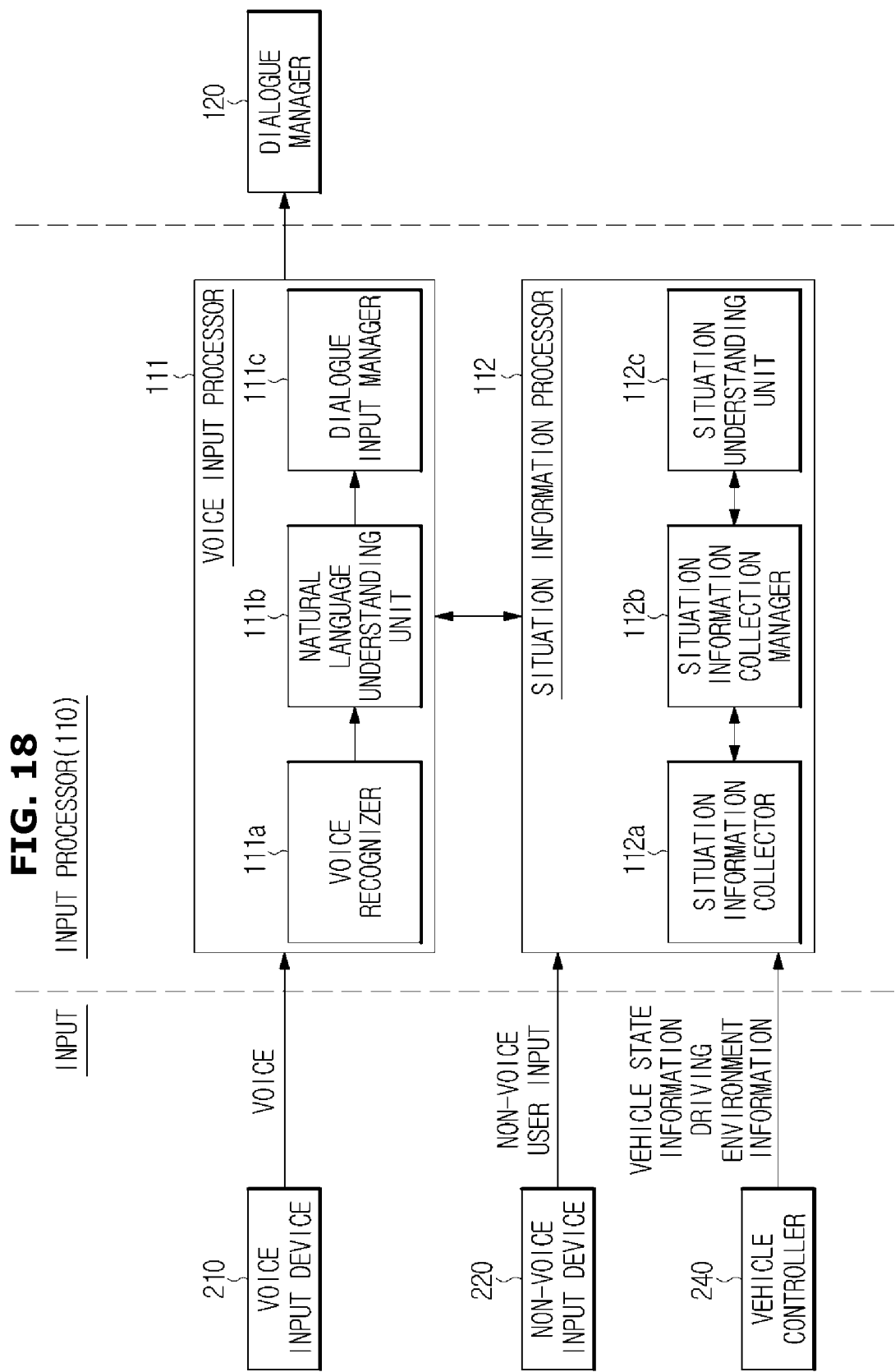

FIG. 24

146a ACTION FACTOR

| DOMAIN | ACTION | ESSENTIAL FACTOR | SELECTION FACTOR | INITIAL VALUE | REFERENCE POSITION |
|---|---|---|---|---|---|
| SERVICE LEVEL | LEVEL ADJUSTMENT | LEVEL INTEGER VALUE | SITUATION INFORMATION | CURRENT SERVICE LEVEL INTEGER VALUE | 1. ROAD GUIDE HISTORY<br>2. ACCIDENT INFORMATION<br>3. WEATHER INFORMATION |
| NAVIGATION | ROAD GUIDE | CURRENT POSITION, DESTINATION | ROUTE TYPE | ROUTE TYPE: FAST ROAD | CURRENT POSITION, DESTINATION: 1. INPUT PROCESSOR, DIALOGUE STATE, 2. SITUATION INFORMATION, 3. RETRIEVING SHORT-TERM/LONG-TERM MEMORY SEQUENTIALLY |

FIG. 25

| MORPHEME ANALYSIS RESULT | SURROUNDING SITUATION INFORMATION | SURROUNDING SITUATION INFORMATION | VEHICLE CONTROL |
|---|---|---|---|
| COLD HANDS .... | TEMPERATURE > 20<br>RAIN | AIR CONDITIONER on | RAISE AIR CONDITIONER TEMPERATURE 3 DEGREES |
| | TEMPERATURE > 20<br>RAIN | AIR CONDITIONER Off | TURN ON AIR CONDITIONER |
| | TEMPERATURE > 20<br>RAINx | AIR CONDITIONER on<br>AIR CONDITIONER DIRECTION:up | HEATER WIND DIRECTION:down |
| | TEMPERATURE > 20<br>RAINx | AIR CONDITIONER on<br>AIR CONDITIONER DIRECTION:down<br>WIND AMOUNT OF AIR CONDITIONER: MEDIUM OR HIGHER | WIND AMOUNT OF AIR CONDITIONER:LOW |
| | TEMPERATURE > 20<br>RAINx | AIR CONDITIONER on<br>AIR CONDITIONER DIRECTION:down<br>WIND AMOUNT OF AIR CONDITIONER: LOW | RAISE AIR CONDITIONER TEMPERATURE 3 DEGREES |
| | TEMPERATURE < 20 | HEATER off | HEATER on |
| | TEMPERATURE < 20 | HEATER on<br>Steering HEAT LINE off | Steering HEAT LINE on |
| | TEMPERATURE < 20 | HEATER on<br>Steering HEAT LINE on<br>HEATER WIND DIRECTION:down | HEATER WIND DIRECTION: CHANGE BOTH DIRECTIONS |
| | TEMPERATURE < 20 | HEATER on<br>Steering HEAT LINE on<br>HEATER WIND DIRECTION: up<br>HEATER TEMPERATURE < MAX | INCREASE IN HEATER TEMPERATURE |
| | TEMPERATURE < 20 | HEATER on<br>Steering HEAT LINE on<br>HEATER WIND DIRECTION: up<br>HEATER TEMPERATURE == MAX<br>HEATER TEMPERATURE < MAX | INCREASE IN HEATER WIND AMOUNT |
| | TEMPERATURE < 20 | HEATER on<br>Steering HEAT LINE on<br>HEATER WIND DIRECTION: up<br>HEATER TEMPERATURE == MAX<br>HEATER WIND DIRECTION == MAX<br>HEAT LINE SEAT off | HEAT LINE SEAT On |
| | TEMPERATURE < 20 | HEATER on<br>Steering HEAT LINE on<br>HEATER WIND DIRECTION: up<br>HEATER TEMPERATURE == MAX<br>HEATER WIND DIRECTION == MAX<br>HEAT LINE SEAT on | ANNOUNCEMENT TO WAIT FOR A WHILE BECAUSE HEATER IS CURRENTLY IN FULL OPERATION |

FIG. 26A

| MORPHEME ANALYSIS RESULT | SURROUNDING SITUATION INFORMATION | VEHICLE STATE INFORMATION | ASCERTAIN CAUSE(option) | VEHICLE CONTROL |
|---|---|---|---|---|
| HANDS ARE COLD/ FROZEN/ TREMBLING | SUMMER | WIND DIRECTION ORIENTED TOWARD HEAD TEMPERATURE OF 19 DEGREES MAXIMUM WIND AMOUNT | HANDS ARE COLD DUE TO WIND OF AIR CONDITIONER ORIENTED TO HANDS | CHANGE WIND DIRECTION TOWARD FEET REDUCE VOLUME OF WIND AMOUNT |
| | WINTER | WIND DIRECTION ORIENTED TOWARD FEET TEMPERATURE OF 30 DEGREES LOW WIND AMOUNT | HANDS ARE COLD BECAUSE HEAT IS NOT DELIVERED TO HANDS | TURN STEERING WHEEL HEAT LINE ON |
| STUFFY | | VEHICLE SPEED OF 30 KM OR LESS AND INTERVALS BEFORE AND AFTER VEHICLE ARE LESS THAN 30 CM | STUFFY DUE TO TRAFFIC CONGESTION | GUIDE CHANGE IN ROUTE OPTIONS (FAST ROUTE) OR PLAY MUSIC/TURN CHATTING FUNCTION on |
| | WINTER | VEHICLE SPEED OF 30 KM OR MORE HEATER On | STUFFY DUE TO HOT AIR | WINDOW OPENING FUNCTION |
| DROWSY | | INNER-AIR MODE | DROWSINESS CAUSED DUE TO NON-CIRCULATION OF AIR | CHANGE OUTSIDE AIR MODE |
| | | OUTER-AIR MODE HEATER On | DROWSINESS CAUSED DUE TO WARM WIND | OPEN WINDOW |
| SWEATY/ HOT | WINTER | HEATER On | HOT DUE TO EXCESSIVE HEATING | LOWER TEMPERATURE/ REDUCE WIND AMOUNT |
| | WINTER | HEATER Off | HOT DUE TO BODY HEAT | RECOMMEND OPENING WINDOW/ CHECK BIORHYTHM |
| | SUMMER | AIR CONDITIONING Off | HOT DUE TO SEASON CHARACTERISTICS | AIR CONDITIONER On |
| | SUMMER | AIR CONDITIONING On | TEMPERATURE OF AIR CONDITIONER IS SET TO BE HIGH | LOWER TEMPERATURE OF AIR CONDITIONER/ INCREASE WIND AMOUNT |
| COLD | SUMMER | AIR CONDITIONER On | COLD DUE TO STRONG WIND OF AIR CONDITIONER | RAISE TEMPERATURE OF AIR CONDITIONING/ REDUCE WIND AMOUNT |
| | SUMMER | AIR CONDITIONER Off | HEATER EXECUTION DUE TO COLDNESS CAUSED BY DISEASE OR THE LIKE | HEATER On |
| | WINTER | HEATER On | WEAK HEATING | RAISE TEMPERATURE OF HEATER /INCREASE WIND AMOUNT |
| | WINTER | HEATER Off | COLD DUE TO NON-EXECUTION OF HEATER | HEATER On |

FIG. 26B

| MORPHEME ANALYSIS RESULT | SURROUNDING SITUATION INFORMATION | VEHICLE STATE INFORMATION | ASCERTAIN CAUSE(option) | VEHICLE CONTROL |
|---|---|---|---|---|
| HEADACHE | WINTER | HEATER on | DROWSINESS CAUSED DUE TO NON-CIRCULATION OF AIR | CONVERT OUTER AIR AND OPEN WINDOW |
| | WINTER | HEATER off | HEADACHE CAUSED DUE TO COLDNESS | HEATER On |
| | SUMMER | AIR CONDITIONER off | HEADACHE CAUSED DUE TO HEAT | AIR CONDITIONER On |
| | SUMMER | AIR CONDITIONER On | HEADACHE CAUSED DUE TO AIR-CONDITIONINGITIS | CHANGE WIND AMOUNT AND WIND DIRECTION |
| | TRAFFIC CONGESTION | VEHICLE SPEED OF 30 KM OR LESS AND INTERVALS BEFORE AND AFTER VEHICLE ARE LESS THAN 30 CM | HEADACHE CAUSED DUE TO TRAFFIC CONGESTION | HUMOR/PLAYING MUSIC, OR THE LIKE |
| UNCOMFORTABLE | WINTER/ RAINING | | UNPLEASANT DUE TO HIGH HUMIDITY | EXECUTE DEFOGGING FUNCTION/ EXECUTE DEHUMIDIFICATION FUNCTION |
| | SUMMER/ BRIGHT | | UNPLEASANT FEELING DUE TO SWEAT CAUSED BY SEASONAL CHARACTERISTICS | EXECUTE AIR CONDITIONER AT MINIMUM TEMPERATURE |
| | SUMMER/ RAINING | | HIGH HUMIDITY INSIDE VEHICLE | EXECUTE AIR CONDITIONER DEHUMIDIFICATION MODE |

FIG. 29

| SITUATION INFORMATION EVENT | DETERMINATION REFERENCE | SERVICE DETERMINATION PARAMETER |
|---|---|---|
| NAVIGATION INFORMATION | WHETHER IT IS USER'S FIRST TIME ON CURRENT ROUTE | 1 |
| | WHETHER ROUTE IS IN SAFETY DRIVING SECTION | 1 |
| ACCIDENT INFORMATION | WHETHER THERE IS ACCIDENT INFORMATION ON ROUTE | 1 |
| WEATHER INFORMATION | WHETHER THERE IS WEATHER INFORMATION SUCH AS RAIN/FOG/SNOW OR THE LIKE ON CURRENT ROUTE AFFECTING DRIVING | 1 |

FIG. 30

| SERVICE LEVEL | SERVICE LIMITATION |
|---|---|
| BASIC DIALOGUE TYPE | Full SERVICE SUPPLY |
| ATTENTION STAGE 1 | SERVICE LIMITATION OF USER CHECKING OWN SPEECH |
| | WARNING RESPONSE OUTPUT WHEN NUMBER OF DIALOGUE STEPS EXCEEDS PRESET NUMBER |
| ATTENTION STAGE 2 | SEARCHING FUNCTION LIMITATION |
| | WARNING RESPONSE OUTPUT WHEN NUMBER OF DIALOGUE STEPS EXCEEDS PRESET NUMBER |
| ATTENTION STAGE 3 | ONLY EMERGENCY DIALOGUE IS POSSIBLE |

DIALOGUE SYSTEM, VEHICLE HAVING THE SAME AND DIALOGUE SERVICE PROCESSING METHOD

CROSS-REFERENCE TO RELATED APPLICATION

The present application claims priority to Korean Patent Application No. 10-2017-0132913, filed on Oct. 13, 2017 in the Korean Intellectual Property Office, the entire contents of which is incorporated herein for all purposes by this reference.

BACKGROUND OF THE INVENTION

Field of the Invention

The present invention relates to a dialogue system for ascertaining an intention of a user through a dialogue with the user and supplying information or a service needed by the user, a vehicle having the dialogue system, and a dialogue service processing method.

Description of Related Art

Since vehicle AVNs and most mobile devices have small screens and small buttons, inconvenience can occur when visual information is supplied to users or inputs of users are received.

When a user looks away from the road or takes his or her hands off of the steering wheel to confirm visual information or operate units while driving, it may pose a risk to safe driving.

Accordingly, when dialogue systems for ascertaining the intentions of users through dialogues with the users and supplying services needed by the users are applied to vehicles, services are expected to be supplied more safely and conveniently.

On the other hand, there is concern of the dialogues between the users and the dialogue systems distracting the users from driving, and it is necessary for the dialogue systems to inform the users of the necessity to focus on driving based on input driving environments and adjust service levels.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a dialogue system that assists a user while minimizing distraction and achieves safe driving by adjusting a level of a dialogue service based on a dialogue with the user in a vehicle driving environment and multiple kinds of information including vehicle state information, driving environment information, and user information, and provide a vehicle having the dialogue system and a dialogue service processing method.

Additional aspects of the disclosure will be set forth in part in the description which follows and, in part, will be obvious from the description, or may be learned by practice of the disclosure.

In accordance with one aspect of the present invention, a dialogue system may include: an input processor configured to extract situation information including at least one of vehicle state information regarding a state of a vehicle and driving environment information regarding a driving environment of the vehicle or an action corresponding to speech of a user; a storage configured to store the collected situation information; a dialogue manager configured to determine a service level to be supplied based on the situation information and determine an action of adjusting the determined service level; and a result processor configured to generate speech to execute the determined action and generate a control signal of service limitation based on the determined service level.

The storage may store a dialogue policy to be executed in accordance with the determined service level. The result processor may generate a response for a result of the service limitation based on the dialogue policy.

The storage may store situation information associated with the extracted action. The input processor may extract an action of service level adjustment associated with an action corresponding to the speech.

The input processor may request the vehicle to transmit situation information necessary to determine the service level when situation information regarding the action for the service level adjustment associated with the action corresponding to the speech is not stored in the storage.

The dialogue manager may acquire situation information necessary to determine whether an action corresponding to the determined service level is executed from the storage and determine an action of adjusting the service level based on the acquired situation information.

The storage may store a determination parameter for determining the service level.

The dialogue manager may determine the service level based on the parameter and the situation information.

The dialogue manager may determine an action of readjusting the adjusted service level based on new situation information received by the input processor.

The result processor may generate speech to execute an action regarding the changed service level.

The result processor may generate a control signal of the vehicle based on the changed service level.

The dialogue system may further include a communication device configured to receive the situation information from the vehicle and transmit a response to the vehicle.

The dialogue system may further include a communication device configured to communicate with an external server. The dialogue manager may request the external server to transmit a factor value when the situation information is not able to be acquired from the storage.

The dialogue system may further include a communication device configured to receive the situation information from a mobile device connected to the vehicle and transmit a response and the control signal of the service limitation to the mobile device.

In accordance with another aspect of the present invention, a dialogue service processing method may include: storing situation information including at least one of vehicle state information regarding a state of a vehicle and driving environment information regarding a driving environment of the vehicle in a storage; extracting the situation information and an action corresponding to speech of a user; acquiring, from the storage, at least one of a factor value of a condition determination factor used to determine at least one action candidate including the action corresponding to the speech and a factor value of an action factor used to execute the at least one action candidate; determining a service level to be supplied based on the situation information and an action to be executed from the at least one action candidate based on the acquired factor value of the condition determination factor; and generating a control signal of service limitation based on the determined service level and a response to execute the determined action using the acquired factor value of the action factor.

The storage may store a dialogue policy to be executed in accordance with the service level. The generating of the control signal may include generating a response for a result of the service limitation based on the dialogue policy.

The dialogue service processing method may further include: storing situation information regarding an action in the storage by action; and acquiring situation information regarding the action corresponding to the speech from the storage and transmitting the situation information to a dialogue manager.

The dialogue service processing method may further include requesting the vehicle to transmit situation information necessary to determine the service level when the situation information regarding the action corresponding to the speech is not stored in the storage.

The determining of the service level may include determining the service level using the requested situation information as the factor value of the condition determination factor or the factor value of the action factor.

The service level may be changed based on the situation information delivered by the vehicle.

The situation information may include at least one of navigation information, accident information, and weather information.

In accordance with yet another aspect of the present invention, a vehicle may include: a dialogue system including an input processor configured to extract situation information including at least one of vehicle state information regarding a state of a vehicle and driving environment information regarding a driving environment of the vehicle or an action corresponding to speech of a user, a storage configured to store the collected situation information, a dialogue manager configured to determine a service level to be supplied based on the situation information and determine an action of adjusting the determined service level, and a result processor configured to generate speech to execute the determined action and generate a control signal of service limitation based on the determined service level.

The vehicle may further include a controller configured to execute an operation related to the determined service based on the control signal.

According to the dialogue system, a vehicle having the dialogue system, and the dialogue service processing method according to various aspects of the present invention, it is possible to minimize distraction to a user and achieve safe driving by adjusting a level of a dialogue service based on a dialogue with the user in a vehicle driving environment and multiple kinds of information including vehicle state information, driving environment information, and user information.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 17 is a control block diagram illustrating a mobile-independent scheme in which the dialogue system is mounted on a mobile device;

FIG. 18, FIG. 19A, and FIG. 19B are control block diagrams illustrating a subdivided configuration of an input processor in the configuration of the dialogue system;

FIG. 24 is a view illustrating exemplary information stored in an action factor DB;

FIG. 25 is a view illustrating exemplary information stored in an ambiguity resolution information DB;

FIG. 26A and FIG. 26B are tables summarizing various examples in which an ambiguity resolver resolves ambiguity, extracts an action with reference to the ambiguity resolution information DB, and controls a vehicle;

FIG. 29 is a view illustrating a determination reference by which a service level is determined according to an exemplary embodiment;

FIG. 30 is a view illustrating an example of limitation of a service adjusted in accordance with a service level.

Figure 1:
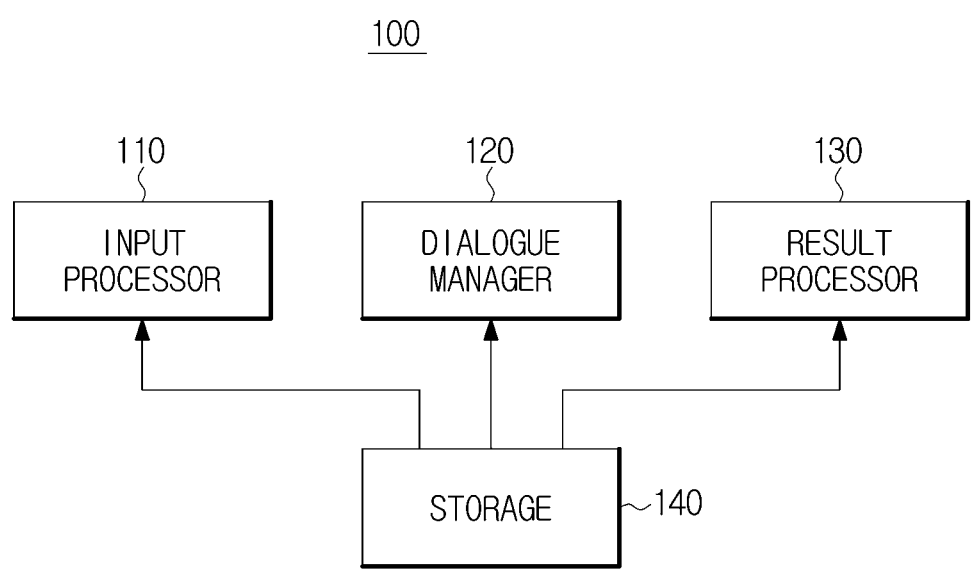
FIG. 1 is a control block diagram of a dialogue system according to an exemplary embodiment.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Like reference numerals refer to like elements throughout the specification. Not all details of embodiments of the present invention are described herein, and description of general art to which the present invention pertains and overlapping descriptions between embodiments are omitted. Components indicated by terms including "unit," "module," "member," and "block" herein may be implemented by software or hardware. According to different embodiments, a plurality of units, modules, members, and blocks may be implemented by a single element, or each of a single unit, a single module, a single member, and a single block may include a plurality of elements.

Throughout the specification, a certain part being "connected" to another part includes the certain part being directly connected to the other part or being indirectly connected to the other part. Indirect connection includes being connected through a wireless communication network.

Also, a certain part "including" a certain element signifies that the certain part may further include another element instead of excluding other elements unless particularly indicated otherwise.

Singular expressions include plural referents unless clearly indicated otherwise in context.

A reference numeral provided to each step for convenience of description is used to identify each stage. The reference numerals are not for describing an order of the steps, and the steps may be performed in an order different from that shown in the drawings unless a specific order is clearly described in the context.

Hereinafter, embodiments of a dialogue system, a vehicle having the same, and a dialogue service processing method will be described more specifically with reference to the accompanying drawings.

The dialogue system according to one exemplary embodiment is an apparatus that ascertains an intention of a user using a voice of the user and an input other than the voice and supplies a service appropriate for the intention of the user or a service needed by the user. The dialogue system can execute a dialogue with the user by outputting system speech as means for supplying a service or means for clearly ascertaining the intention of the user.

According to various aspects of the present invention, services supplied to a user may include all the operations executed to meet a necessity of the user or an intention of the user including supplying information, controlling a vehicle, executing audio/video/navigation functions, and supplying content delivered from an external server.

The dialogue system according to one exemplary embodiment can accurately ascertain an intention of a user in a special environment including a vehicle by providing a dialogue processing technology specified for a vehicle environment.

A gateway connecting the dialogue system to a user may be a vehicle or a mobile device connected to the vehicle. As will be described below, the dialogue system may be provided in a vehicle or may be provided in an outside remote server of a vehicle to exchange data through communication with the vehicle or a mobile device connected to the vehicle.

Some of the constituent elements of the dialogue system may be provided in a vehicle and some of the constituent elements may be provided in a remote server so that an operation of the dialogue system can also be executed partially in the vehicle and the remote server.

FIG. 1 is a control block diagram of a dialogue system according to an exemplary embodiment.

Referring to FIG. 1, a dialogue system 100 according to an exemplary embodiment of the present invention includes an input processor 110 configured to process a user input including a voice of the user and an input other than the voice or an input including information regarding a vehicle or information regarding the user, a dialogue manager 120 configured to ascertain an intention of the user using a processing result of the input processor 110 and determine an action corresponding to the intention of the user or a state of the vehicle, a result processor 130 configured to supply a specific service in accordance with an output result of the dialogue manager 120 or output system speech to continue a dialogue, and a storage 140 configured to store various information necessary for the dialogue system 100 to execute an operation to be described.

The input processor 110 may receive two types of inputs, a voice of the user and an input other than a voice. The input other than a voice may include not only recognition of a user's gesture and non-voice of the user input through an operation on an input device but also vehicle state information indicating a state of a vehicle, driving environment information regarding a vehicle driving environment, and user information indicating a state of the user. In addition to the information, all the information regarding the vehicle and the user may be input to the input processor 110 as long as the information is information that can be used to ascertain an intention of the user or supply a service to the user. The user may include both a driver and a passenger.

The input processor 110 recognizes an input user's voice, converts the voice into a spoken sentence in a text format, and ascertains an intention of the user by applying a natural language understanding technology to the spoken sentence of the user.

The input processor 110 collects information regarding a state of the vehicle or a driving environment other than the user's voice and understands a situation using the collected information.

The input processor 110 delivers information regarding an intention and a situation of the user ascertained through the natural language understanding to the dialogue manager 120.

The dialogue manager 120 determines an action corresponding to the intention of the user and a current situation based on the information regarding the intention of the user and the situation delivered from the input processor 110 and manages factors necessary to execute the action.

The action according to the embodiment may be any of the operations executed to supply a specific service and the kinds of actions may be defined in advance. In some cases, supplying a service and executing an action may have the same meaning.

For example, actions including service level adjustment, road guidance, vehicle state inspection, and gas station recommendation may be defined in advance in a domain/action inference rule DB 141 (see FIG. 19A), and an action corresponding to speech of the user, that is, an action intended by the user, may be extracted from actions defined in advance in accordance with stored inference rules. Actions associated with events occurring in vehicles may be defined in advance and stored in an associated action DB 146*b* (see FIG. 21).

The kinds of actions are not limited. The actions can be anything that can be executed through a vehicle 200 or a mobile device 400 by the dialogue system 100 as long as the actions are defined in advance and inference rules or relations with other actions/events are stored.

The dialogue manager 120 delivers information regarding a determined action to the result processor 130.

The result processor 130 generates and outputs a dialogue response and a command necessary to execute the delivered action. The dialogue response can be output as text, an image, or audio. When the command is output, a service including vehicle control and external content supply corresponding to the output command can be executed.

The storage 140 stores various information necessary for dialogue processing and service supply. For example, information regarding a domain, an action, a speech act, and an entity name used for natural language understanding may be stored in advance, a situation understanding table used to understand a situation from input information may be stored, or data detected by a detector provided in the vehicle, information regarding the user, and information necessary to execute an action may be stored in advance. The information stored in the storage 140 will be described in more detail later.

As described above, the dialogue system 100 provides a dialogue processing technology specialized in a vehicle environment. All or some of the constituent elements of the dialogue system 100 may be included in the vehicle. The dialogue system 100 may be provided in a remote server and the vehicle is configured as only a gateway between the dialogue system 100 and the user. In either case, the dialogue system 100 may be connected to the user via the vehicle or a mobile device connected to the vehicle.

Figure 2:
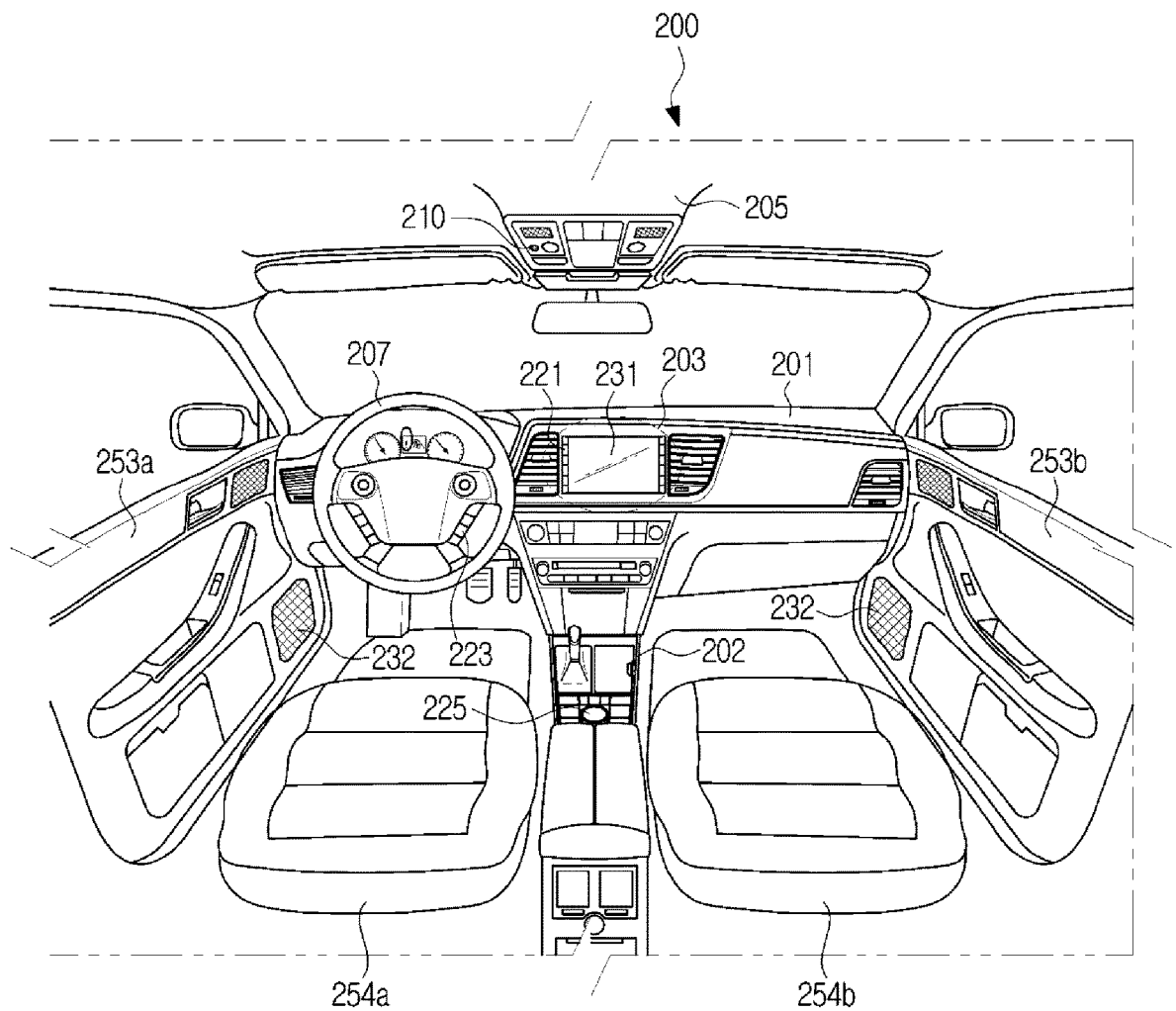
FIG. 2 is a view illustrating an internal configuration of a vehicle.

FIG. 2 is a view illustrating an internal configuration of a vehicle.

Referring to FIG. 2, a display 231 displaying screens necessary to control the vehicle including an audio function, a video function, a navigation function, or a telephoning function and input buttons 221 to receive inputs of control commands of the user may be provided in a center fascia 203 which is a central region of a dashboard 201 within the vehicle 200.

To facilitate an operation of a driver, input buttons 223 may be provided on a steering wheel 207 and a jog shuttle 225 executing a role of an input button may be provided in a center console region 202 between a driver seat 254*a* and a passenger seat 254*b*.

A module including a processor configured to control a display 231, an input button 221, and various functions is configured as an audio video navigation (AVN) terminal or is configured as a head unit.

The display 231 may be realized as one of diverse display units including a liquid crystal display (LCD), a light emitting diode (LED), a plasma display panel (PDP), an organic light emitting diode (OLED), and a cathode ray tube (CRT).

The input button 221 may be provided as a hard key type in a region adjacent to the display 231, as illustrated in FIG. 2, and the display 231 may also execute a function of the input button 221 when the display 231 is realized as a touch screen type.

The vehicle 200 may receive a command of the user as a voice input via a voice input device 210. The voice input device 210 may include a microphone configured to receive a sound input, convert the sound input into an electric signal, and output the electric signal.

To input a voice effectively, the voice input device 210 may be provided in a head lining 205, as illustrated in FIG. 2, but embodiments of the vehicle 200 are not limited thereto. The voice input device 201 may be provided on the dashboard 201 or may be provided on the steering wheel 207. Additionally, there is no limitation as long as the voice input device 201 is located at a position at which a voice of the user is appropriately received.

Within the vehicle 200, a speaker 232 configured to execute a dialogue with the user or output a sound necessary to provide a service desired by the user may be provided. For example, the speaker 232 may be provided inside a driver seat door 253a and a passenger seat door 253b.

The speaker 232 may output a voice for navigation route guidance, a sound or a voice included in audio/video content, a voice for providing information or a service desired by the user, and system speech generated as a response to speech of the user.

The dialogue system 100 according to an exemplary embodiment of the present invention may provide a service optimized for a lifestyle of the user using a dialogue processing technology specialized in a vehicle environment and may configure a new service using a technology including a connected car, an Internet of things (IoT), artificial intelligence (AI), or the like.

When the dialogue processing technology specialized in a vehicle environment as in the dialogue system 100 according to an exemplary embodiment is applied, it is easy to recognize and handle main situations (contexts) in a direct driving situation of the driver. A service may be provided weighting factors having an influence on driving including flow shortage and drowsiness, and it is easy to acquire information necessary to provide a service including a driving time and destination information, based on a condition during movement to a destination in most cases.

It is easy to realize an intelligent service for ascertaining an intention of the driver and proposing a function. This is because real-time information and an action are preferentially considered in a direct driving situation of the driver. For example, when the driver searches for a gas station while driving, the searching may be interpreted as a driver's intention to approach a gas station now. However, when a gas station is searched for in a non-vehicle environment, the searching may be interpreted as multiple intentions including a position information inquiry, a telephone number inquiry, and a price inquiry in addition to an intention to approach a gas station now.

A vehicle has limited space, but there are various situations inside the vehicle. For example, the dialogue system 100 may be utilized in a driving situation of an unfamiliar interface of a rent vehicle or the like, a situation of a chauffeur service, a management situation including vehicle washing, a situation in which an infant is being accommodated, a situation in which a driver visits a specific destination, and the like.

There are various service opportunities and dialogue situations in vehicle driving including a vehicle inspection stage, a departure preparation stage, a driving stage, and a parking stage, and stages before and after the driving of the vehicle. The dialogue system 100 may be utilized in situations including a situation in which a driver does not know countermeasures of vehicle problems, a linkage situation of a vehicle with various external units, a driving habit confirmation situation of fuel efficiency, a safety support function utilization situation including smart cruise control, a navigation operation situation, a drowsiness situation, a situation in which a driver repeatedly drives along the same route every day, and a situation in which a driver confirms a place at which the driver can park or stop a vehicle.

Figure 3:
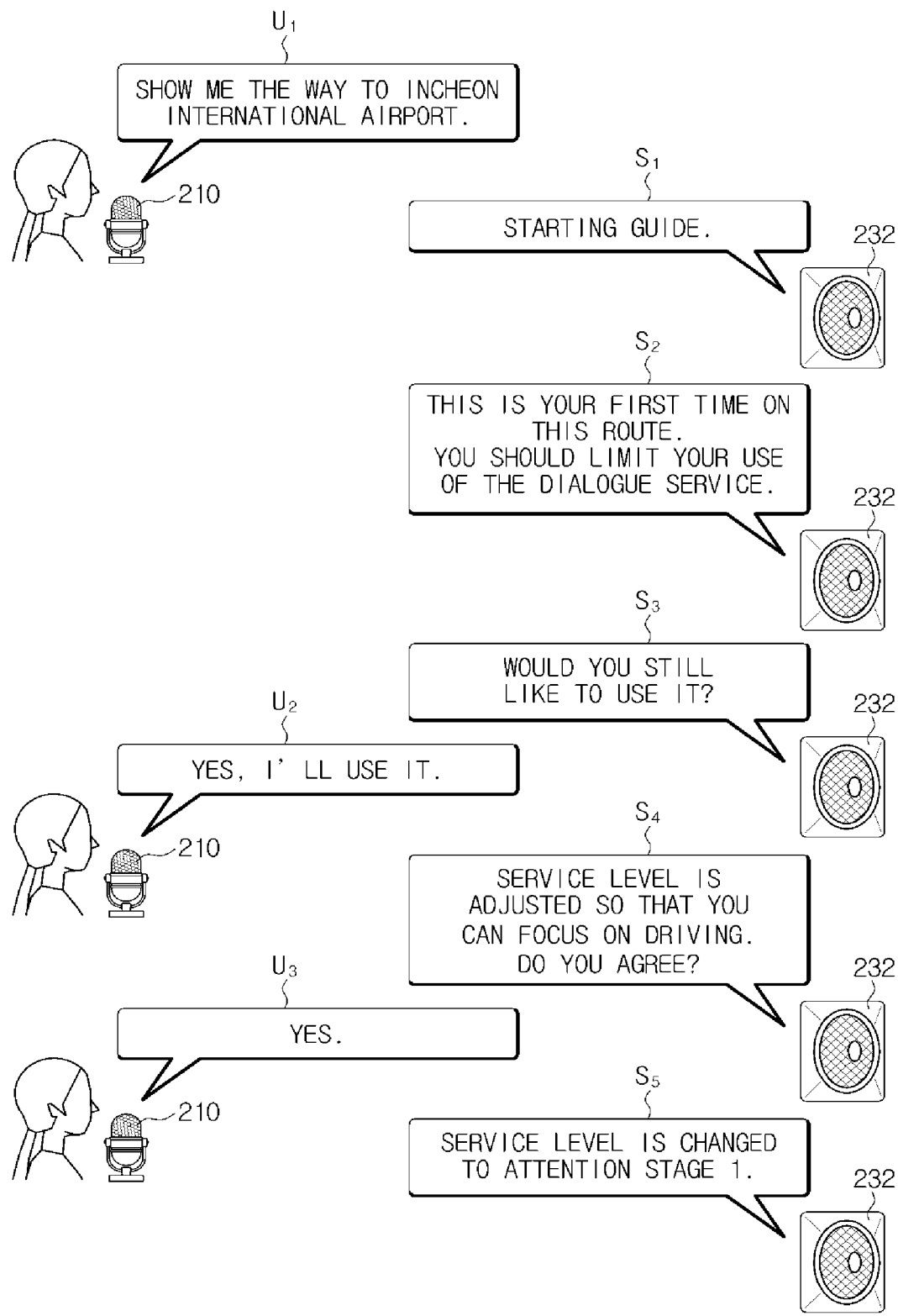
FIG. 3, FIG. 4, and FIG. 5 are views illustrating an exemplary dialogue exchanged between the dialogue system and a driver.
Figure 4:
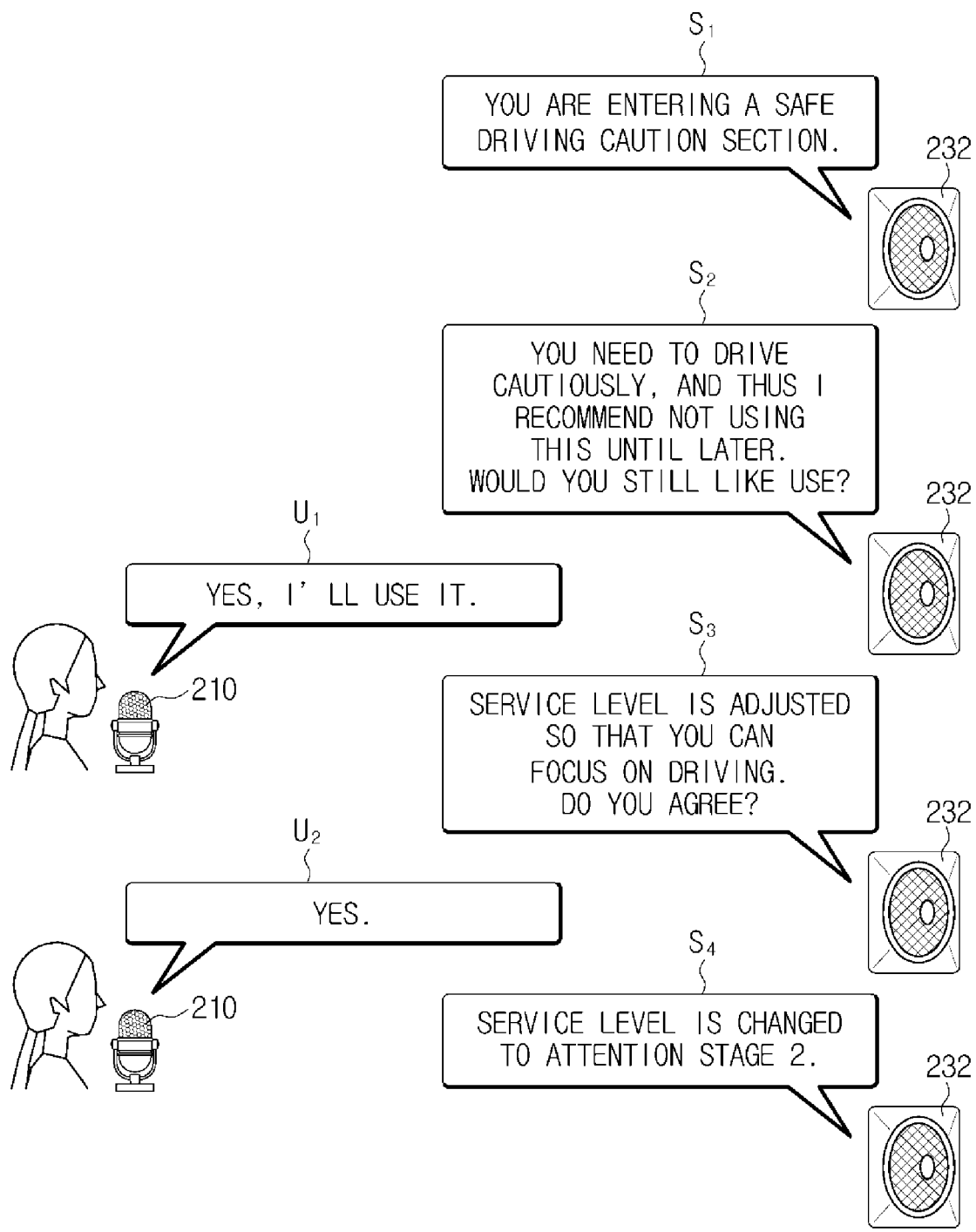
Figure 5:
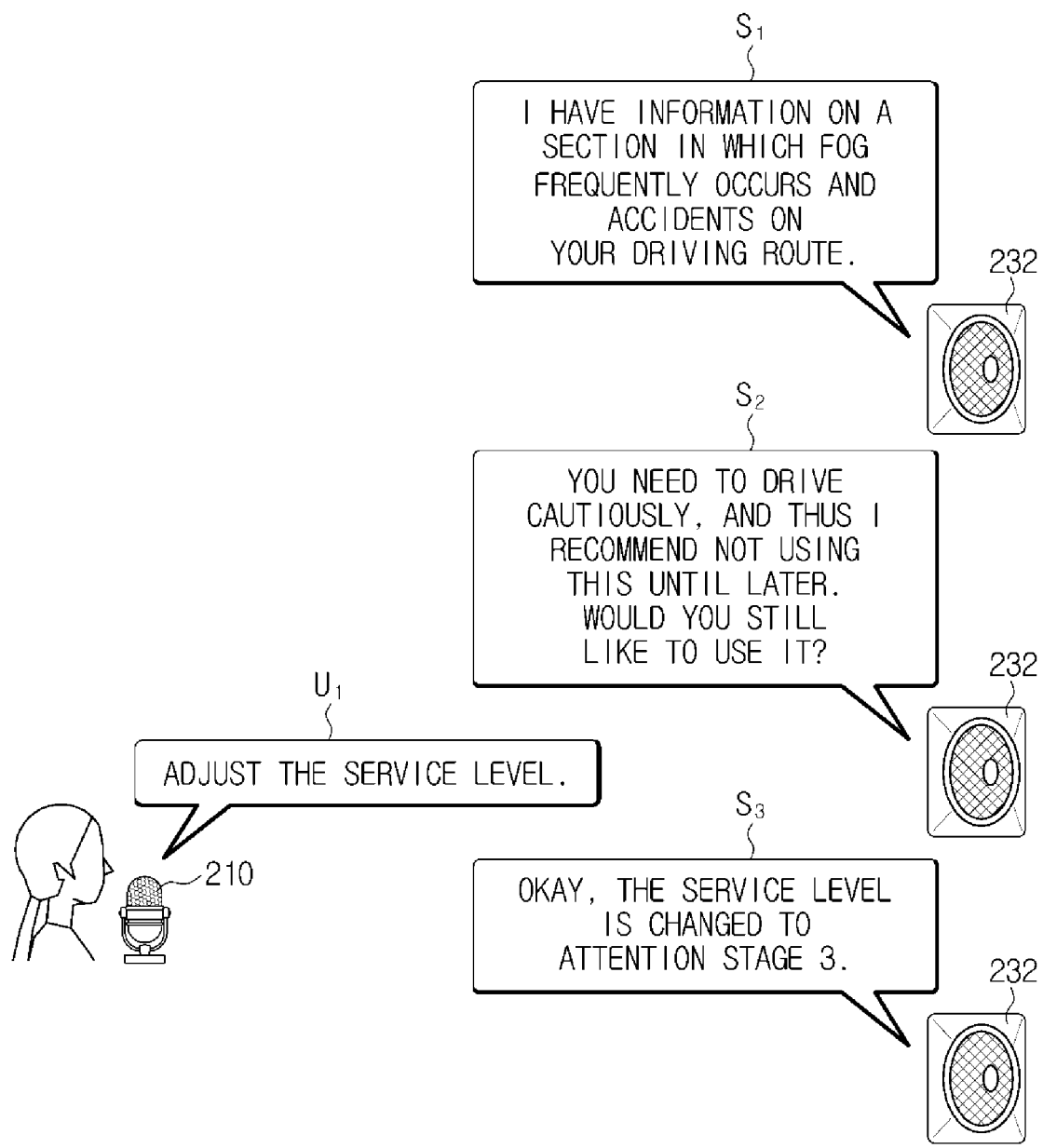

FIG. 3, FIG. 4, and FIG. 5 are views illustrating an exemplary dialogue exchanged between the dialogue system and a driver.

Referring to FIG. 3, when a driver inputs speech (U1: Show me the way to Incheon International Airport) for inquiring about guidance, the dialogue system 100 may recognize a destination and output speech (S1: Starting guide to Incheon International Airport) for informing the driver of a response to the request to indicate that vehicle control starts.

The dialogue system 100 according to an exemplary embodiment included together may also output speech for supplying information to indicate whether the user has traveled a route to the requested destination before, speech (S2: This is your first time on this route. You should limit use of the dialogue service) for cautioning about dialogue service use, and speech (S3: Would you still like to use it?) for inquiring about continuing to use the dialogue system.

The driver may input speech (U2: Yes, I'll use it) for responding to the inquiry of the dialogue system 100 with agreement. The dialogue system 100 may output speech (S4: I will adjust the service level to help you focus on driving. Do you agree?) for inquiring of the user about agreement with the adjustment of the service level in a response to the user.

In accordance with speech (U3: Yes) of the agreement of the driver, the dialogue system 100 determines a service level to which adjustment is possible during the driving on a new route based on data set in advance or received from the outside.

The dialogue system 100 may output speech (S5: The service level is changed to attention stage 1) for notifying the driver that a service adjusted in accordance with the finally determined service level is output.

Referring to FIG. 4, the dialogue system 100 may receive vehicle driving environment information indicating that the vehicle 200 enters a safe driving caution section from a controller 240 during the driving. Based on the vehicle driving environment information, the dialogue system 100 determines that it is necessary to adjust the service level through the following speeches.

The dialogue system 100 may output speech (S1: You are now in a safe driving caution section) for supplying information regarding safe driving and may output speech (S2: You need to drive cautiously, and thus I recommend that you not use this until later. Would you still like to use it?) for inquiring about continuing to use the dialogue system.

The driver may input speech (U1: Yes, I'll use it) for responding to the inquiry of the dialogue system 100 with agreement. The dialogue system 100 may output speech (S3: The service level is adjusted to focus on driving. Do you agree?) for inquiring of the user about agreement of the adjustment of the service level in a response to the user.

In accordance with a speech (U2: Yes) of the agreement of the driver, the dialogue system 100 determines a service level adjustable during the driving of the safe driving caution section based on data set in advance or received from the outside.

The dialogue system 100 may output a speech (S4: I will adjust the service level is changed to attention stage 2) for notifying the driver that a service adjusted in accordance with the finally determined service level is output.

Referring to FIG. 5, the dialogue system 100 may receive vehicle driving environment information indicating that a section in which fog frequently occurs and accident information on a driving route have been collected during the driving of the vehicle 200 from the outside thereof via the controller 240 or a communication device 280. Based on the vehicle driving environment information, the dialogue system 100 determines that it is necessary to adjust the service level through the following speech.

The dialogue system 100 may output speech (S1: A section in which fog frequently occurs and accident information on a driving route have just been collected) for supplying information regarding safe driving and may output speech (S2: You need to drive cautiously, and thus I recommend that you not use this until later. Would you still like to use it) for inquiring about continuing to use the dialogue system.

Unlike FIG. 4, the driver may omit speech for responding to the inquiry with agreement and immediately input speech (U1: Adjust the service level) for requesting the dialogue system to adjust the service level.

The dialogue system 100 may analyze the dialogue requested by the user and output speech (S3: Okay, the service level is changed to attention stage 3) for informing the driver of a response to the adjustment of the service level and an execution result of the adjustment result.

In the present way, the dialogue system 100 may adjust the level of the dialogue service by also considering content not spoken by the user based on vehicle driving information. Thus, the dialogue system 100 may improve dialogue efficiency and a safe driving possibility by adjusting a service desired by the user depending on a situation.

Figure 6:
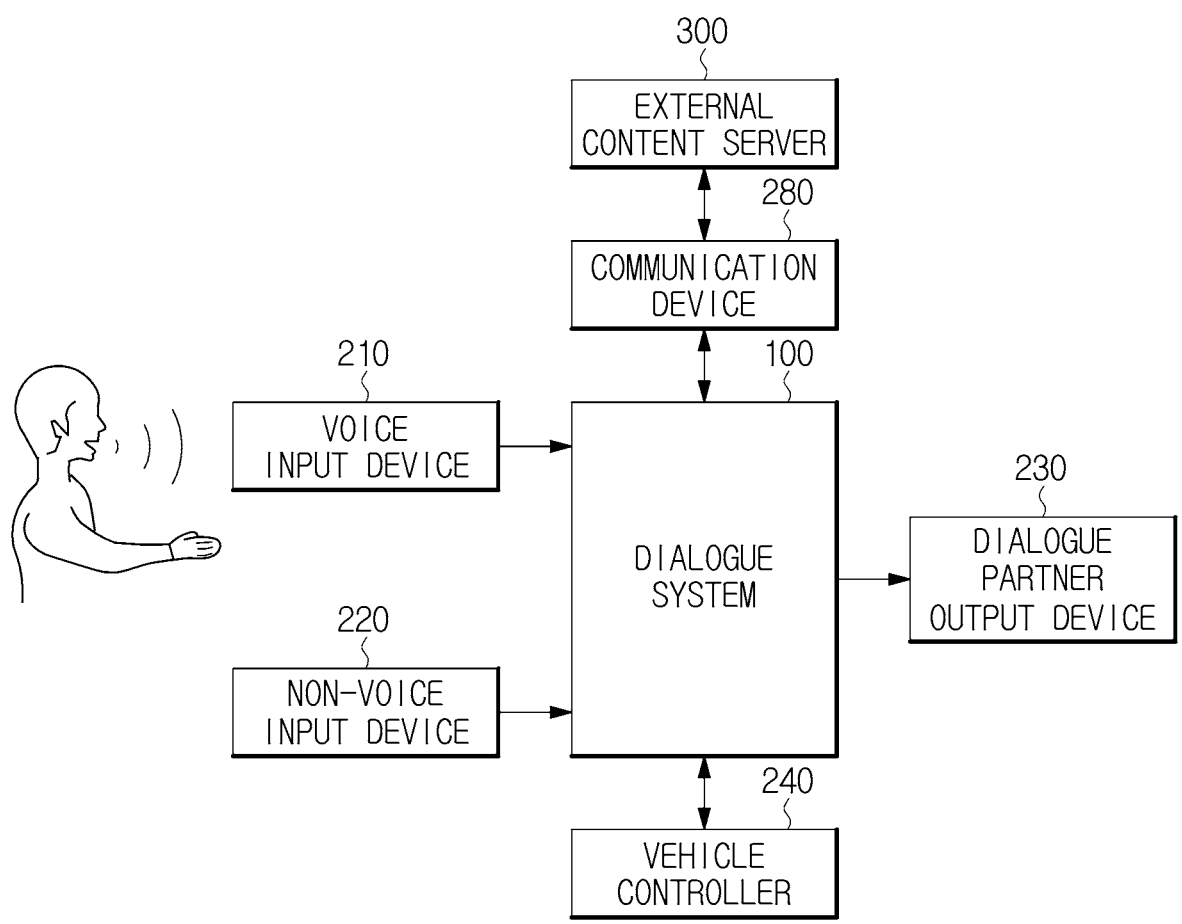
FIG. 6 and FIG. 7 are control block diagrams illustrating a connection relation among constituent elements of the dialogue system and the vehicle in brief.
Figure 7:
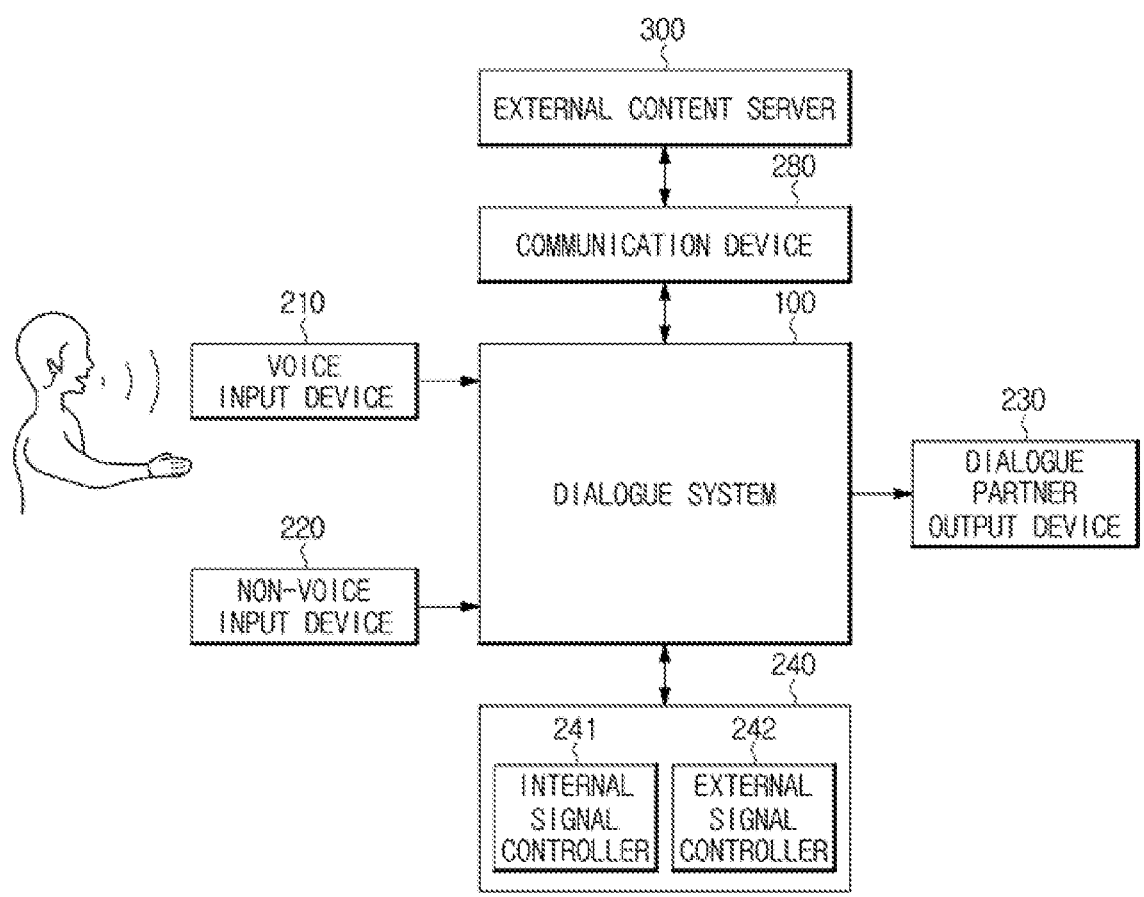

FIG. 6 and FIG. 7 are control block diagrams illustrating a connection relation among constituent elements of the dialogue system and the vehicle in brief Referring to FIG. 6, a user's voice input to the dialogue system 100 may be input via the voice input device 210 provided in the vehicle 200. As described above in FIG. 2, the voice input device 210 may include a microphone provided within the vehicle 200.

During an input by the user, an input other than a voice may be input via a non-voice input device 220. The non-voice input device 220 may include the input buttons 221 and 223 receiving commands through a user operation and the jog shuttle 225.

The non-voice input device 220 may also include a camera configured to image the user. A gesture, an expression, or a visual line direction of the user used as means for a command input may be recognized through a video captured by the camera. Alternatively, a state (drowsy state or the like) of the user may also be ascertained through a video captured by the camera.

Information regarding a vehicle may be input to the dialogue system 100 via the controller 240. The information regarding a vehicle may include vehicle state information or surrounding situation information acquired through various detectors provided in the vehicle 200 and may also include information basically stored in the vehicle 200 including a type of fuel of the vehicle.

The dialogue system 100 ascertains an intention and a situation of the user using a user's voice input via the voice input device 210, a non-voice input of the user input via the non-voice input device 220, and various information input via the controller 240 and outputs a response to execute an action corresponding to the intention of the user.

A dialogue partner output device 230 is a device configured to supply a visual, auditory, or tactile output to a dialogue partner and may include the display 231 and the speaker 232 provided in the vehicle 200. The display 231 and the speaker 232 may visually or auditorily output a response to speech of the user, an inquiry about the user, or information requested by the user. Alternatively, a vibrator may be mounted on the steering wheel 207 to output vibration.

The controller 240 may control the vehicle 200 to execute an action corresponding to an intention or a current situation of the user in accordance with a response output from the dialogue system 100.

On the other hand, the vehicle 200 may collect not only data acquired through detectors provided in the vehicle 200 but also information acquired from an external content server 300 or an external device via the communication device 280, for example, driving environment information and user information including a traffic situation, weather, a temperature, passenger information, and driver personal information, and may deliver the information to the dialogue system 100.

As illustrated in FIG. 7, information including a remaining fuel amount, a rainfall amount, a rainfall speed, nearby obstacle information, a speed, engine temperature, a tire air pressure, and a current position, acquired from detectors provided in the vehicle may be input to the dialogue system 100 via an internal signal controller 241.

Driving environment information acquired from the outside thereof through vehicle-to-everything (V2X) may be input to the dialogue system 100 via an external signal controller 242. V2X means that various useful information including a traffic situation is exchanged or shared while a vehicle is travelling and mutual communication with other vehicles and road infrastructures is performed.

V2X communication may include vehicle-to-infrastructure (V2I) communication, vehicle-to-vehicle (V2V) communication, and vehicle-to-nomadic-units (V2N) communication. Accordingly, when the V2X communication is used, direct communication between vehicles or communication with infrastructures disposed in streets may be performed and information regarding front traffic information, approach of other vehicles, or a collision possibility may be exchanged to be reported to a driver.

Accordingly, the driving environment information input to the dialogue system 100 via the external signal controller 242 may include front traffic information, approach information related to surrounding vehicles, a collision warning with other vehicles, a real-time traffic situation, an unexpected incident, and a traffic flow control state.

Although not illustrated, a signal acquired through V2X may also be input to the vehicle 200 via the communication device 280.

The controller 240 may include a memory configured to store programs used to execute the above-described operations or operations to be described below and a processor configured to execute the stored programs. A single memory and a single processor may be provided. When pluralities of memories and processors are provided, the memories and the processors may be integrated on one chip or may be physically divided.

The internal signal controller 241 and the external signal controller 242 may be realized by the same processor or may be realized by separate processors.

Figure 8:
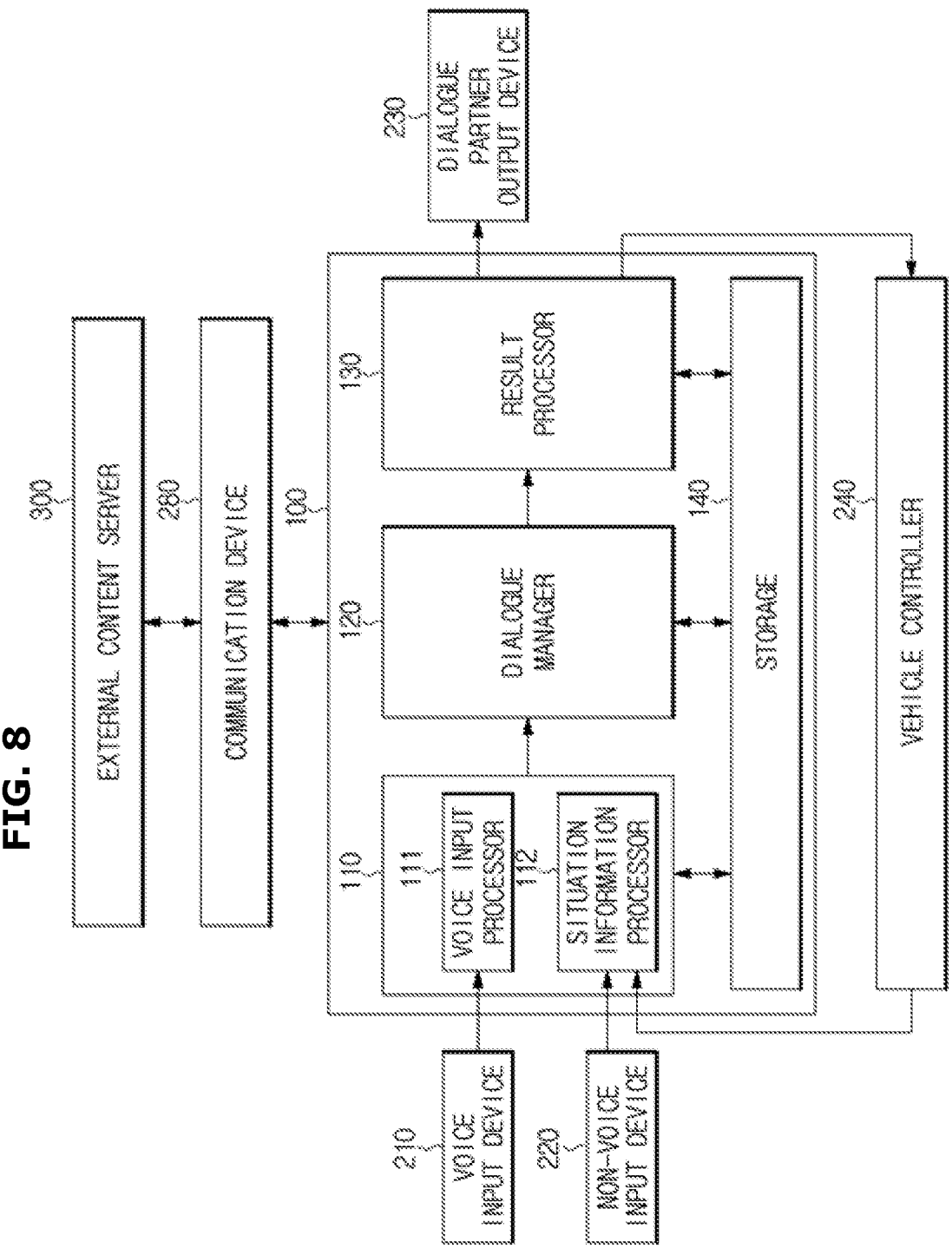
FIG. 8 and FIG. 9 are control block diagrams illustrating a connection relation among constituent elements of the dialogue system and the vehicle in brief.
Figure 9:
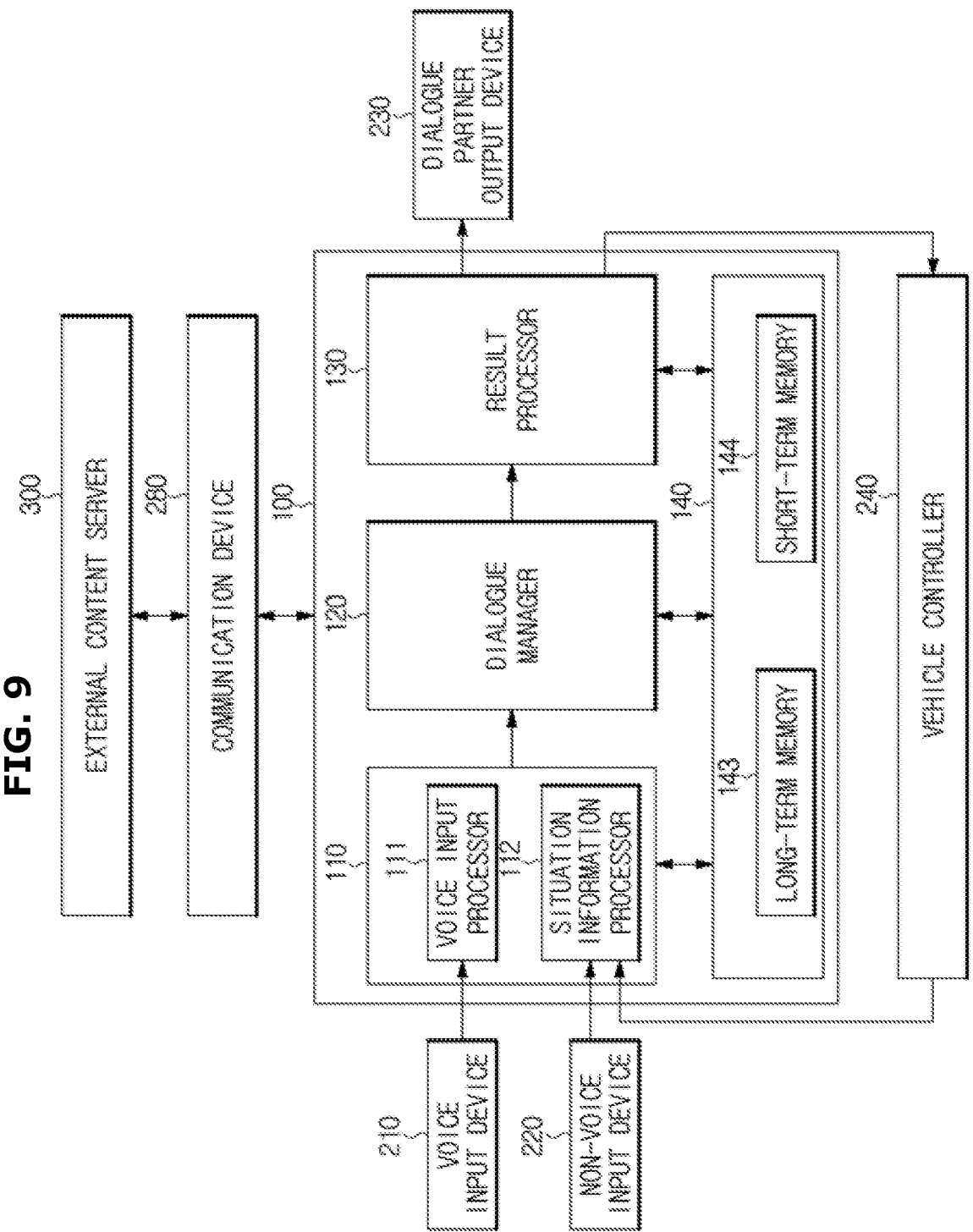

FIG. 8 and FIG. 9 are control block diagrams illustrating a connection relation among constituent elements of the dialogue system and the vehicle in brief Referring to FIG. 8, a voice of a user transmitted from the voice input device 210 is input to a voice input processor 111 in the input processor 110, and a non-voice input of the user transmitted from the non-voice input device 220 is input to a situation information processor 112 in the input processor 110.

The situation information processor 112 understands a situation based on the vehicle state information, the driving environment information, and the user information. The dialogue system 100 may ascertain an intention of the user more accurately through such situation understanding or may effectively search for a service currently needed by the user.

A response output from the result processor 130 may be input to the dialogue partner output device 230 or the controller 240 so that the vehicle 200 can supply a service needed by the user. Alternatively, the response may be transmitted to the external content server 300 to request a service needed by the user.

The vehicle state information, the driving environment information, and the user information transmitted from the controller 240 are stored in the storage 140.

Referring to FIG. 9, the storage 140 may include a long-term memory 143 and a short-term memory 144. The data stored in the storage 140 may be separately stored in the short-term and long-term memories depending on importance of the data, permanence of the data, and an intention of a designer.

The short-term memory 144 may store previously executed dialogues. The previous executed dialogues may be dialogues executed within a reference time from a current time. Alternatively, dialogues may be stored continuously until capacity of speech content between the user and the dialogue system 100 reaches a reference value.

For example, when a user says "Tell me restaurants near Gangnam Station," the dialogue system 100 searches for restaurants near Gangnam Station through the external content server 300 and supplies information regarding the located restaurants near Gangnam Station to the user. As an example of supply of information, a restaurant list may be displayed on the display 231. When a user says "The first one," dialogue content from an inquiry to selection of a restaurant may be stored in the short-term memory 144.

Alternatively, the whole dialogue content may be stored and specific information included in the dialogue content may also be stored. For example, the first restaurant in the restaurant list may also be stored as the restaurant selected by the user in the short-term memory 144 or the long-term memory 143.

When the user asks the dialogue system 100 "What about the weather?" after the dialogue about the restaurants near Gangnam Station, the dialogue system 100 may infer that a position of interest of the user is Gangnam Station from the dialogue stored in the short-term memory 144 and may output a response "It is raining near Gangnam Station," to the user.

Thereafter, when the user says "What do you recommend at the restaurant," the dialogue system 100 may infer that the "restaurant" is the restaurant near Gangnam Station from the dialogue stored in the short-term memory, may acquire information regarding a recommended dish at the restaurant through a service supplied from the external content server 300, and may output a response including "The noodle soup is good at that restaurant."

The long-term memory 143 may store data depending on whether data is permanent. For example, it may be determined that permanence of data in regard to telephone numbers of family or friends, POI information such as home or a company, and preference of the user for specific factors is guaranteed, and thus the data may be stored in the long-term memory 143. Conversely, data for which it is determined that the permanence of the data is not guaranteed may be stored in the short-term memory 144.

For example, since a current position of the user is temporary data, the current position of the user may be stored in the short-term memory 144. Since a destination included in a road guide request can be viewed as permanent data serving as a reference of determination regarding whether the user is visiting the destination for the first time, the destination may be stored in the long-term memory 144.

When a user says "Show me the way to Incheon International Airport," the dialogue system 100 may ascertain a current position of the user from the short-term memory 144 and may determine whether there is data regarding Incheon International Airport or a destination related to Incheon International Airport from the long-term memory 143.

The dialogue system 100 may also supply a service or information preemptively to the user using data stored in the long-term memory 143 and the short-term memory 144.

For example, the long-term memory 143 may store service levels supplied by the dialogue system 100 and kinds of functions limited in the dialogue system in accordance with the service levels. When the dialogue system 100 receives weather information indicating that driving is difficult from the vehicle controller 240, the dialogue system 100 may supply agreement or disagreement of service level adjustment depending on a service level adjustment reference stored in the long-term memory 143.

As another example, information regarding weather may be stored in the short-term memory 144. When the driving of the vehicle ends, information regarding weather is received from the outside of the vehicle and becomes meaningless in many cases. The dialogue system 100 may analyze the information regarding weather stored in the short-term memory 144 and may output "I have information that there will be fog on your route shortly. I recommend that you not use the dialogue system is until later so that you can drive safely."

Figure 10:
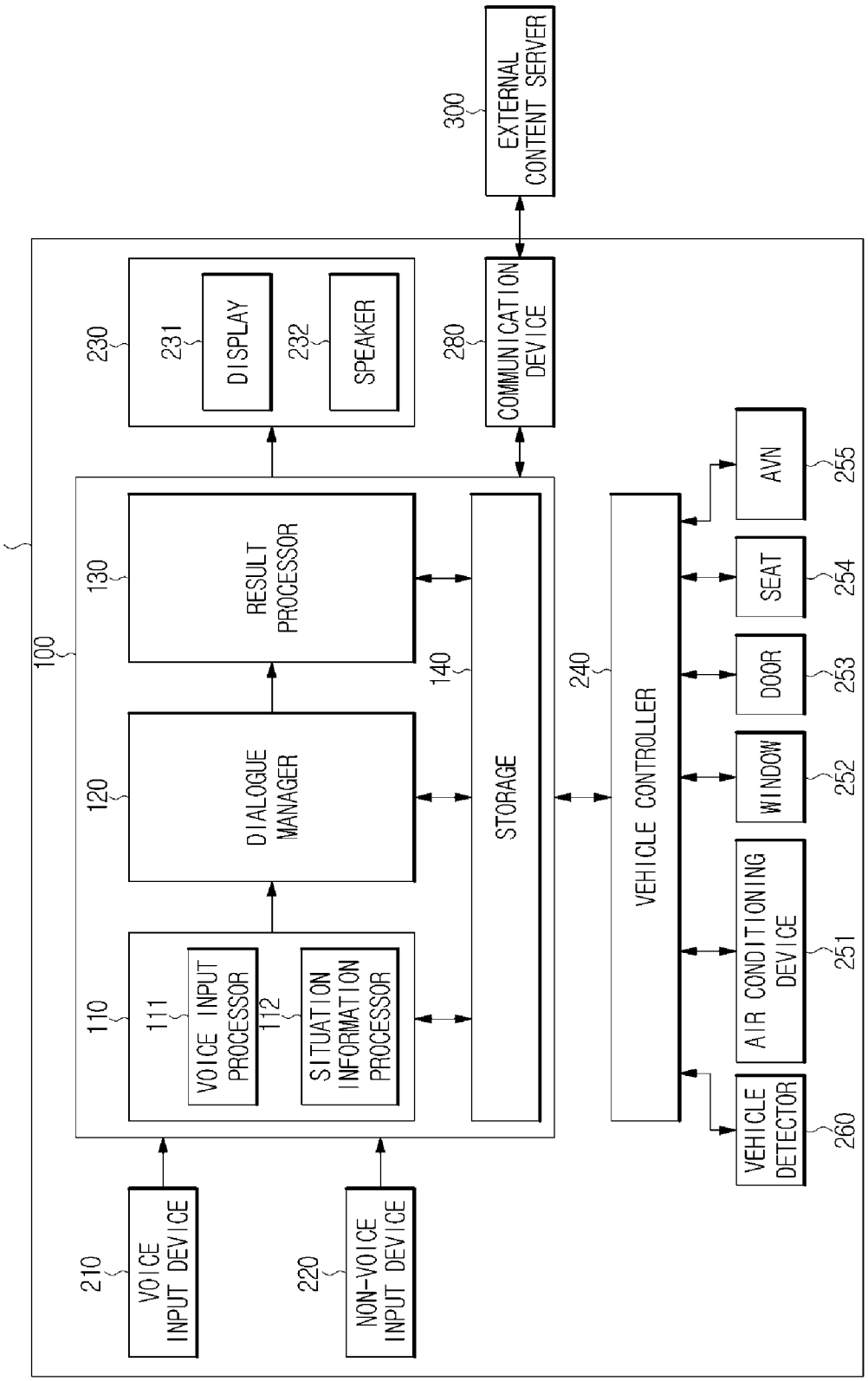
FIG. 10 is a control block diagram illustrating a vehicle-independent scheme in which the dialogue system is provided in the vehicle.

FIG. 10 is a control block diagram illustrating a vehicle-independent scheme in which the dialogue system is provided in the vehicle.

In the vehicle-independent scheme, as illustrated in FIG. 10, the dialogue system 100 including the input processor 110, the dialogue manager 120, the result processor 130, and the storage 140 may be included in the vehicle 200.

When the dialogue system 100 is disposed in the vehicle 200, the vehicle 200 may autonomously process a dialogue with a user and supply a needed service to the user. Here, information necessary for dialogue processing and service supply may be taken from the external content server 300.

The vehicle state information or the driving environment information including a remaining fuel amount, a rainfall amount, a rainfall speed, nearby obstacle information, a tire air pressure, a current position, an engine temperature, and a vehicle speed, detected by a vehicle detector 260 is input to the dialogue system 100 via the controller 240.

The controller 240 may control an air conditioning device 251, a window 252, a door 253, a seat 254, or an AVN 255 provided in the vehicle 200 in accordance with a response output by the dialogue system 100.

For example, the dialogue system 100 may determine that an intention of a user or a service needed by the user is lowering of an internal temperature of the vehicle 200. When a command corresponding to the determination is generated and output, the controller 240 may control the air conditioning device 251 to lower an internal temperature of the vehicle 200.

As another example, the dialogue system 100 may determine that an intention of the user or a service needed by the user is raising a driver seat window 252a. When a command corresponding to the determination is generated and output, the controller 240 may control the window 252 to raise the driver seat window 252a.

As yet another example, the dialogue system 100 may determine that a service level corresponding to an intention of a user is adjusted. The dialogue system 100 may give a command for a control operation of the controller 240 supplied in cooperation with the dialogue system 100 in accordance with the service level and the controller 240 may interrupt a related control operation.

Figure 11:
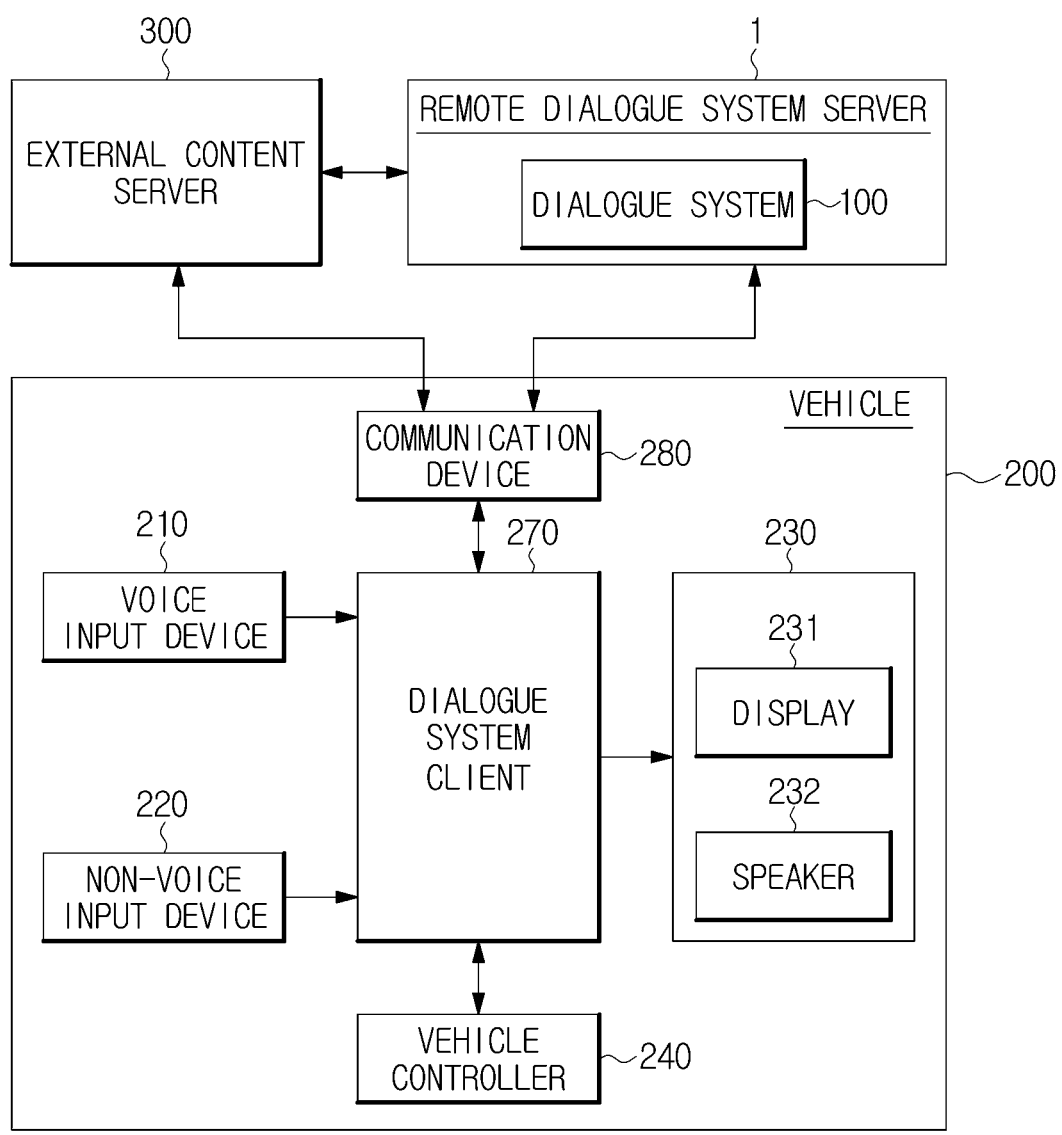
FIG. 11 and FIG. 12 are control block diagrams illustrating a vehicle gateway scheme in which the dialogue system is provided in a remote server and the vehicle is configured as only a gateway connecting a user to the dialogue system.
Figure 12:
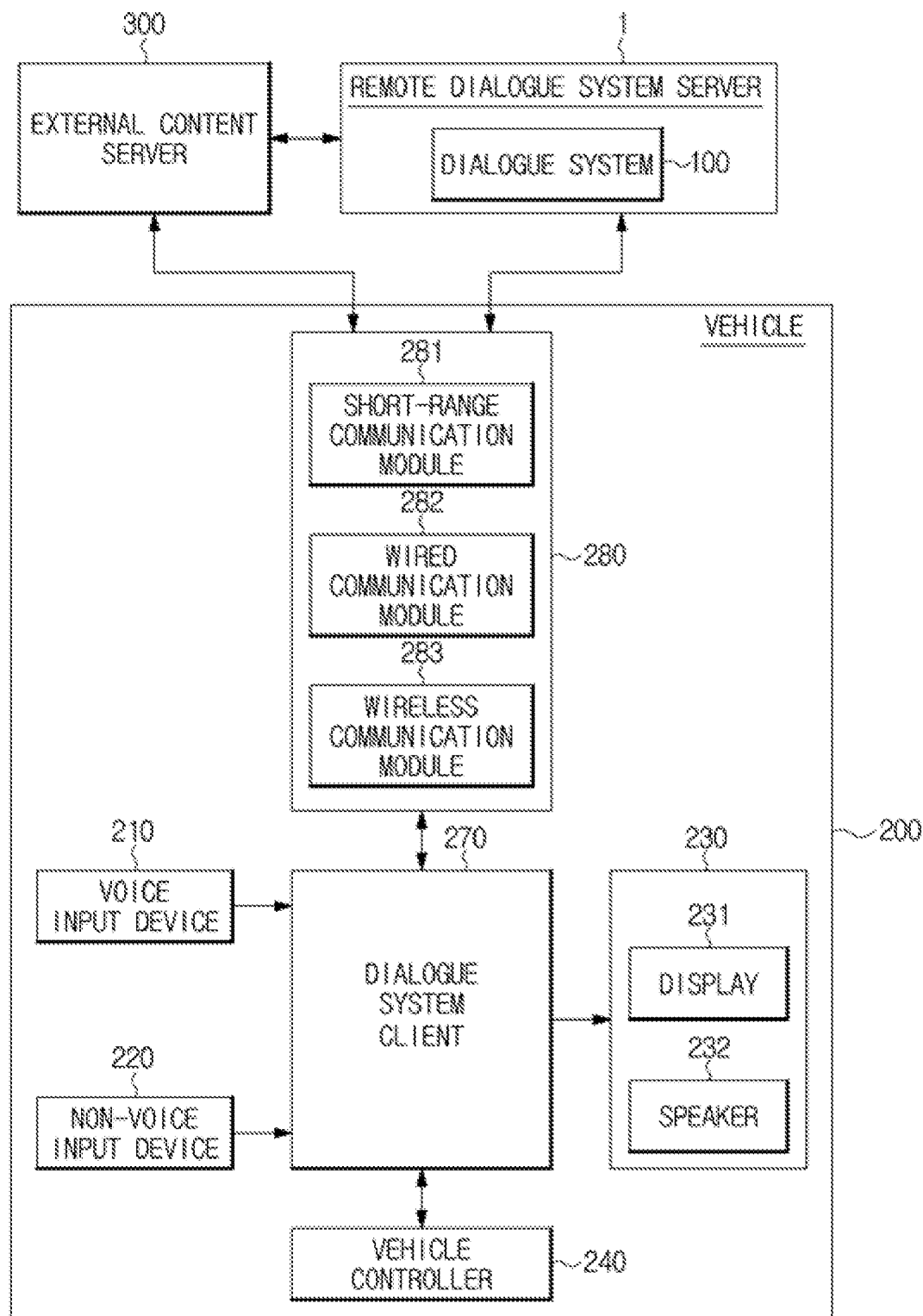

FIG. 11 and FIG. 12 are control block diagrams illustrating a vehicle gateway scheme in which the dialogue system is provided in a remote server and the vehicle is configured as only a gateway connecting a user to the dialogue system.

In the vehicle gateway scheme, as illustrated in FIG. 11, a remote dialogue system server 1 is provided outside of the vehicle 200 and a dialogue system client 270 connected to the remote dialogue system server 1 via the communication device 280 is provided in the vehicle 200. The communication device 280 is configured as a gateway connecting the vehicle 200 to the remote dialogue system server 1.

The dialogue system client 270 may function as an interface connected to an input and output device and execute collection and transmission or reception of data.

When the voice input device 210 and the non-voice input device 220 provided in the vehicle 200 receive user inputs and deliver the user inputs to the dialogue system client 270, the dialogue system client 270 may transmit input data to the remote dialogue system server 1 via the communication device 280.

The controller 240 may also deliver data detected by the vehicle detector 260 to the dialogue system client 270, and the dialogue system client 270 can deliver data detected by the vehicle detector 260 to the remote dialogue system server 1 via the communication device 280.

The above-described dialogue system 100 may be provided in the remote dialogue system server 1, so that a process for input data, dialogue processing based on a processing result of input data, and result processing based on a dialogue processing result can all be executed.

The remote dialogue system server 1 may take information or content necessary for the process for the input data, dialogue management, or result processing from the external content server 300.

The vehicle 200 may also take content necessary to supply a service needed by the user in accordance with a response transmitted from the remote dialogue system server 1 from the external content server 300.

Referring to FIG. 12, the communication device 280 may include one or more communication modules configured for communicating with an external unit and may include, for example, a short-range communication module 281, a wired communication module 282, and a wireless communication module 283.

The short-range communication module 281 may include at least one of various short-range communication modules configured to transmit and receive signals at a short distance using a wireless communication network including a Bluetooth module, an infrared communication module, a radio frequency identification (RFID) communication module, a wireless local access network (WLAN) communication module, an NFC communication module, a Zigbee communication module.

The wired communication module 282 may include at least one of not only various wired communication modules including a local area network (LAN) module, a wide area network (WAN) module, and a value added network (VAN) module but also various cable communication modules including Universal Serial Bus (USB), High Definition Multimedia Interface (HDMI), Digital Visual Interface (DVI), Recommended Standard (RS)-232, power line communication, and Plain Old Telephone Service (POTS).

The wireless communication module 283 may include at least one of not only a WiFi module and a wireless broadband (WiBro) module but also various wireless communication modules connectable to an Internet network in a wireless communication scheme including Global System for Mobile Communication (GSM), Code Division Multiple Access (CDMA), Wideband Code Division Multiple Access (WCDMA), Universal Mobile Telecommunications System (UMTS), Time Division Multiple Access (TDMA), and Long Term Evolution (LTE), 4G, and 5G.

On the other hand, the communication device 280 may further include an internal communication module for communication between internal electronic devices of the vehicle 200. As an internal communication protocol of the vehicle 200, controller area network (CAN), local interconnection network (LIN), FlexRay, or Ethernet may be used.

The dialogue system 100 may exchange data with the external content server 300 or the remote dialogue system server 1 using the wireless communication module 283. V2X communication may be executed using the wireless communication module 283. Data may be exchanged with a mobile device connected to the vehicle 200 using the short-range communication module 281 or the wired communication module 282.

Figure 13:
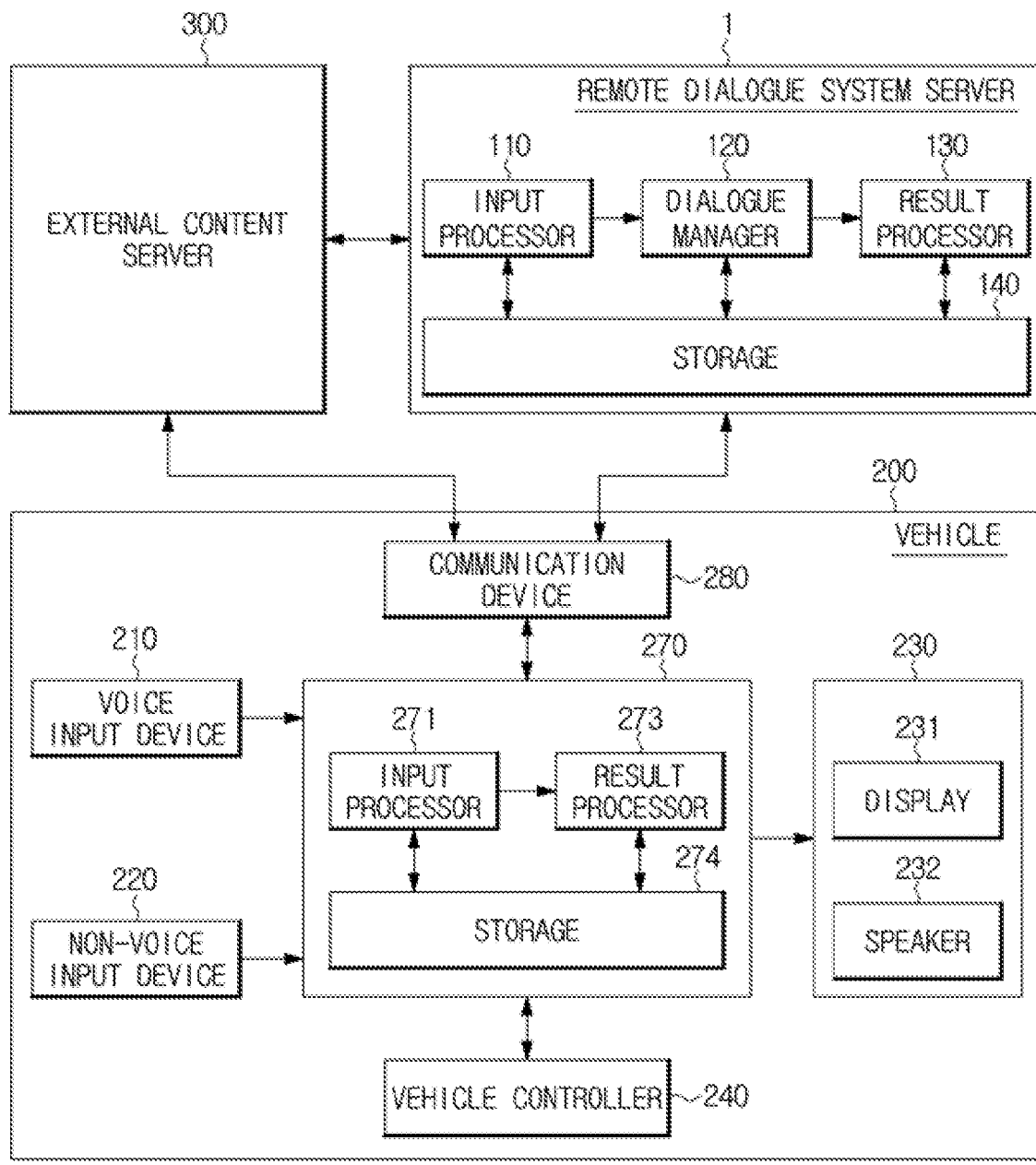
FIG. 13 is a control block diagram for a case in which the vehicle may execute parts of an input process and an output process in the vehicle gateway scheme.

FIG. 13 is a control block diagram for a case in which the vehicle may execute parts of an input process and an output process in the vehicle gateway scheme.

As described above, the dialogue system client 270 of the vehicle 200 may execute only functions of collecting and transmitting or receiving data. As illustrated in FIG. 13, the input processor 271, the result processor 273, and the storage 274 may also be included in the dialogue system client 270 and a process for data input from the user or the vehicle or a process related to supply of a service determined to be needed by the user may also be executed in the vehicle 200. That is, operations of the input processor 110 and the result processor 130 may be executed not only in the remote dialogue system server 1 but also in the vehicle 200.

In the instant case, the operation of the above-described input processor 110 may be executed partially and may also be executed wholly by the dialogue system client 270. An operation of the above-described result processor 130 may also be executed partially or may also be executed wholly by the dialogue system client 270.

A task burden between the remote dialogue system server 1 and the dialogue system client 270 may be determined in consideration of the capacity of data to be processed, a data processing speed, or the like.

On the other hand, the dialogue system client 270 according to an exemplary embodiment of the present invention may also determine a service limitation level based on the driving environment information delivered by the controller 240. Here, in the instant case, the dialogue system client 270 may deliver the driving environment information to the remote dialogue system server 1 via the communication device 280, and may limit an output in accordance with a service level determined by the remote dialogue system server 1 or may control an operation of the controller 240.

Figure 14:
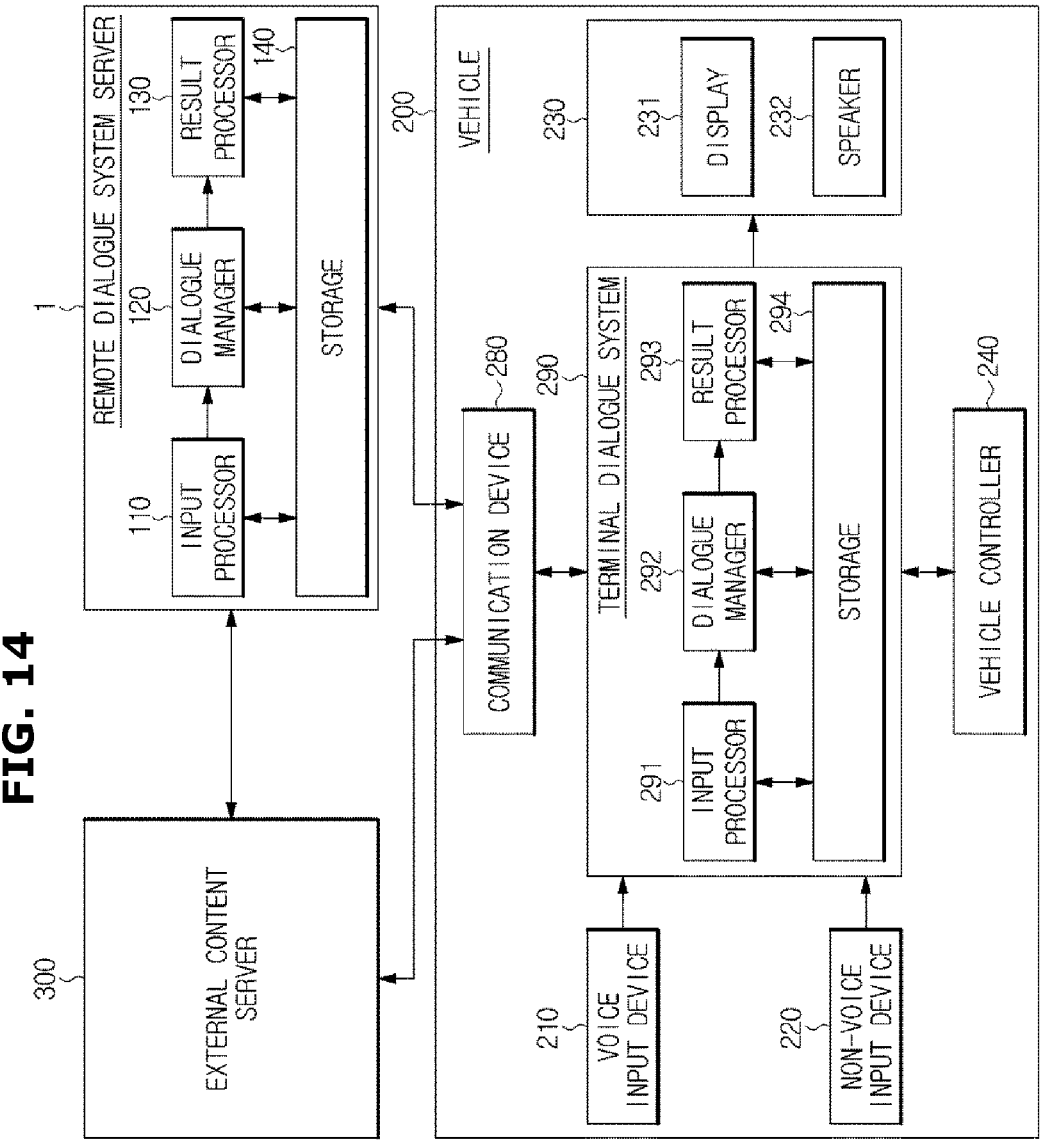
FIG. 14 is a control block diagram illustrating a hybrid scheme in which both a remote dialogue system server and the vehicle may execute dialogue processing.

FIG. 14 is a control block diagram illustrating a hybrid scheme in which both a remote dialogue system server and the vehicle may execute a dialogue process.

In the hybrid scheme, as illustrated in FIG. 14, the remote dialogue system server 1 may also include the input processor 110, the dialogue manager 120, the result processor 130, and the storage 140 and may execute dialogue processing. The vehicle 200 may also include a terminal dialogue system 290 configured to include an input processor 291, a dialogue manager 292, a result processor 293, and a storage 294 and may execute dialogue processing.

However, the processor or the memory provided in the vehicle 200 may be different from the processor or the memory provided in the remote dialogue system server 1 in terms of capacity or performance. Accordingly, when the terminal dialogue system 290 may process all input data, manage a dialogue, and output a result, the terminal dialogue system 290 may execute the whole process. Otherwise, the remote dialogue system server 1 may be requested to execute the process.

Before executing dialogue processing, the terminal dialogue system 290 may determine whether to execute a process of the terminal dialogue system 290 based on a kind of input data and/or may directly execute the process in accordance with a determined result or request the remote dialogue system server 1 to execute the process.

Alternatively, when a situation in which the dialogue processing may not be executed occurs while the terminal dialogue system 290 executes the dialogue processing, the terminal dialogue system 290 may transmit a processed result while requesting the remote dialogue system server 1 to execute the process.

For example, when high-performance computing power and long-term data processing are necessary, the remote dialogue system server 1 may execute a process and the terminal dialogue system 290 may execute a process which has to be executed in real time. For example, when an instance in which it is necessary to immediately execute a process occurs and data has to be processed before synchronization, the terminal dialogue system 290 may be set to preferentially process the data.

When an unregistered speaker is in the vehicle and it is necessary to confirm a user, the remote dialogue system server 1 may be configured to process a dialogue.

When the terminal dialogue system 290 may not autonomously complete dialogue processing when connection to the remote dialogue system 1 via the communication device 280 may not be made, the user may be informed of the fact that the dialogue processing may not be executed via the dialogue partner output device 230.

Data to be stored in the terminal dialogue system 290 or data to be stored in the remote dialogue system server 1 may be determined in accordance with a reference including capacitance of data or a kind of data. For example, data for which there is a concern of privacy invasion because of personal identification may be stored in a storage 294 of the terminal dialogue system 290. Large-sized data may be stored in the storage 140 of the remote dialogue system server 1 and small-sized data may be stored in the storage 294 of the terminal dialogue system 290. Alternatively, small-sized data may also be stored in both the storage 140 of the remote dialogue system server 1 and the storage 294 of the terminal dialogue system 290.

On the other hand, the terminal dialogue system 290 according to an exemplary embodiment of the present invention may also determine a service limitation level based on the driving environment information delivered by the controller 240. Here, in the instant case, the terminal dialogue system 290 may deliver the driving environment information to the remote dialogue system server 1 via the communication device 280 and limit an output in accordance with a service level determined by the remote dialogue system server 1, or may control an operation of the controller 240.

Figure 15:
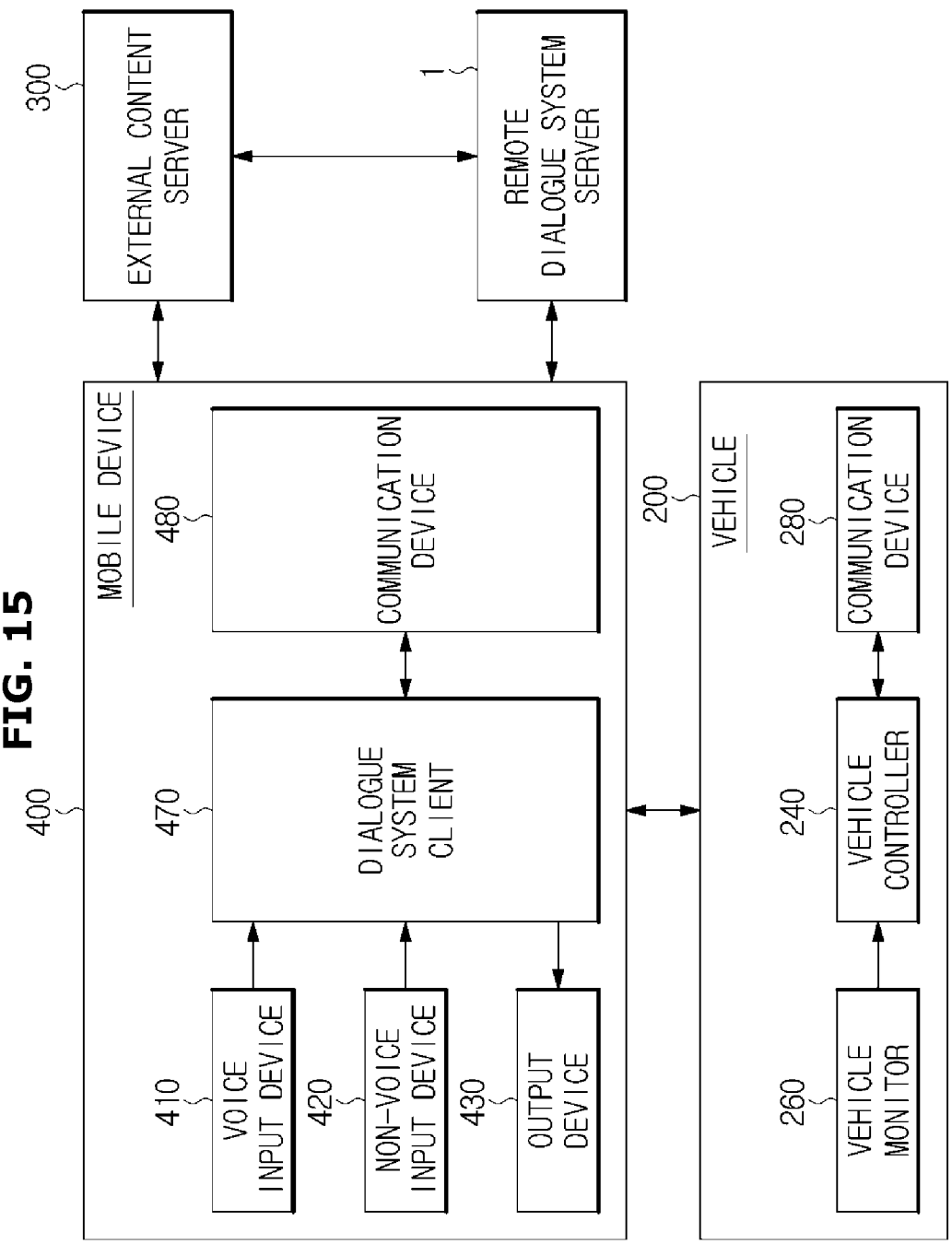
FIG. 15 and FIG. 16 are control block diagrams illustrating a mobile gateway scheme in which a mobile device connected to the vehicle connects a user to the remote dialogue system server.
Figure 16:
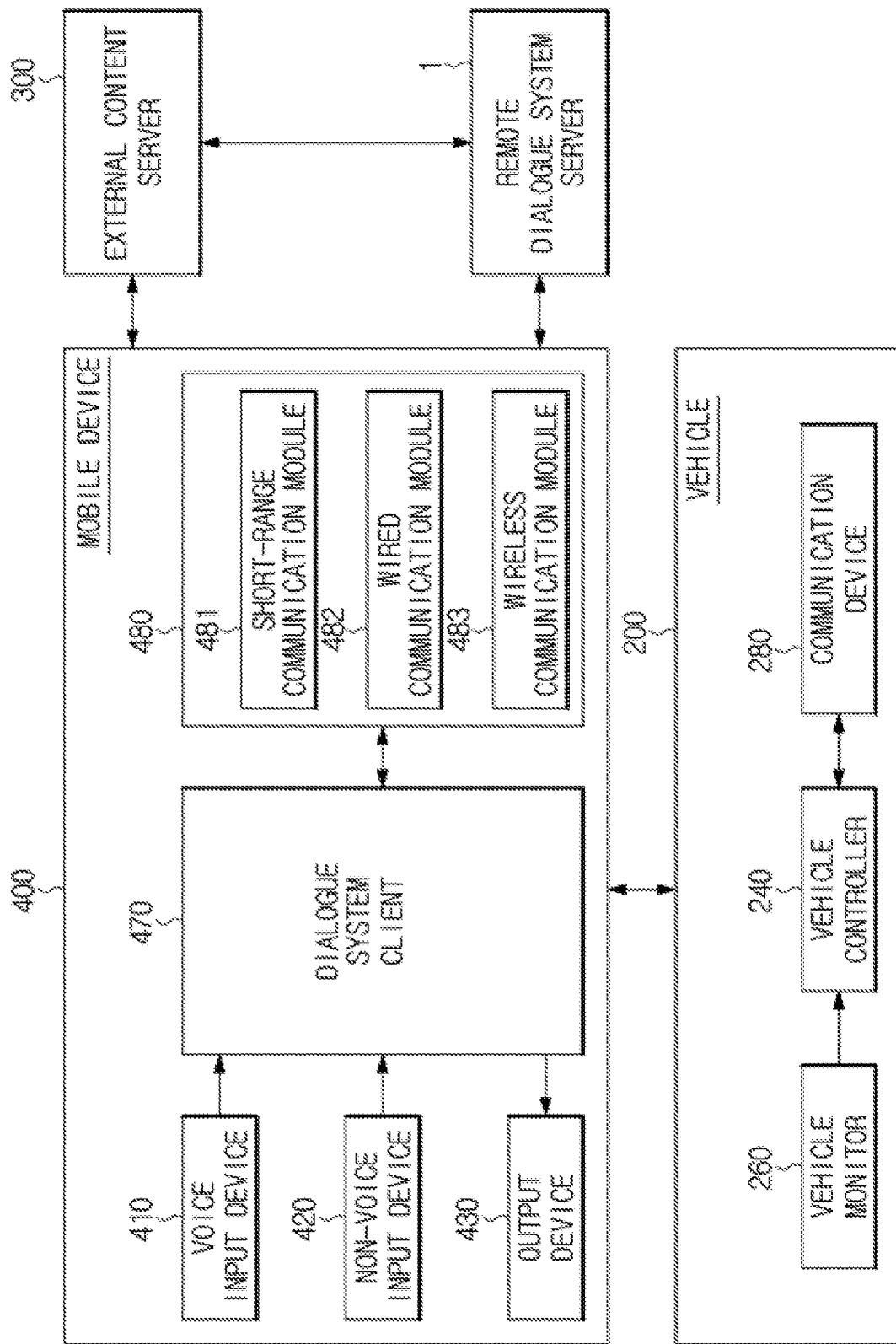

FIG. 15 and FIG. 16 are control block diagrams illustrating a mobile gateway scheme in which a mobile device connected to the vehicle connects a user to the remote dialogue system server.

In the mobile gateway scheme, as illustrated in FIG. 15, the mobile device 400 receives the vehicle state information and the driving environment information from the vehicle 200 and transmits a user input and vehicle state information to the remote dialogue system server 1. That is, the mobile device 400 is configured as a gateway connecting the user to the remote dialogue system server 1 or connecting the vehicle 200 to the remote dialogue system server 1.

The mobile device 400 may be an electronic device including a smartphone, a smartwatch, smart glasses, a personal digital assistant (PDA), or a tablet PC configured to be portable and configured to communicate with an external server and a vehicle to exchange data.

The mobile device 400 includes a voice input device 410 configured to receive an input of a user's voice, a non-voice input device 420 configured to receive a user's non-voice input, an output device 430 configured to output a response in a visual, auditory, or tactile manner, a communication device 480 configured to communicate with the remote dialogue system server 1 and the vehicle 200 to transmit and receive data, and a dialogue system client 470 configured to collect input data from the vehicle 200 and a user and transmit the input data to the remote dialogue system server 1 via the communication device 480.

The voice input device 410 may include a microphone configured to receive a voice input, convert the voice input into an electric signal, and output the electric signal.

The non-voice input device 420 may include an input button, a touch screen, or a camera provided in the mobile device 400.

The output device 430 may include a display, a speaker, or a vibrator provided in the mobile device 400.

The voice input device 410, the non-voice input device 420, and the output device 430 provided as an input and output interface for a user in the mobile device 400 may be used, and the voice input device 210, the non-voice input device 220, and the dialogue partner output device 230 provided in the vehicle 200 may also be used.

When the vehicle 200 transmits data detected by the vehicle monitor 260 and a user input to the mobile device 400, the dialogue system client 470 of the mobile device 400 delivers the data and the user input to the remote dialogue system server 1.

The dialogue system client 470 may deliver a response or a command transmitted from the remote dialogue system server 1 to the vehicle 200. When the dialogue partner output device 230 provided as an input and output interface for a user in the vehicle 200 is used, a response to speech of the user may be output via the dialogue partner output device 230. When the output device 430 provided in the mobile device 400 is used, a response to speech of the user may be output via the output device 430 of the mobile device 400.

A command for vehicle control may be delivered to the vehicle 200 and the controller 240 may execute control corresponding to the delivered command to supply a service needed by the user.

On the other hand, the dialogue system client 470 may collect input data and deliver the input data to the remote dialogue system server 1 and may also execute some or all of the functions of the input processor 110 and the result processor 130 of the dialogue system 100.

Referring to FIG. 16, the communication device 480 of the mobile device 400 may include one or more communication modules configured for communicating with an external device and may include, for example, a short-range communication module 481, a wired communication module 482, and a wireless communication module 483.

The short-range communication module 481 may include at least one of various short-range communication modules configured to transmit and receive signals at a short distance using a wireless communication network including a Bluetooth module, an infrared communication module, an RFID communication module, a WLAN communication module, an NFC communication module, and a Zigbee communication module.

The wired communication module 482 may include at least one of not only various wired communication modules including a LAN module, a WAN module, and a VAN module but also various cable communication modules including USB, HDMI, DVI, RS-232, power line communication, and POTS.

The wireless communication module 483 may include at least one of not only a WiFi module and a WiBro module but also various wireless communication modules connectable to an Internet network in a wireless communication scheme including GSM, CDMA, WCDMA, UMTS, TDMA, and LTE, 4G, and 5G.

For example, the mobile device 400 may be connected to the vehicle 200 via the short-range communication module 481 or the wired communication module 482 and may be connected to the remote dialogue system server 1 or the external content server 300 via the wireless communication module 483.

FIG. 17 is a control block diagram illustrating a mobile-independent scheme in which the dialogue system is mounted on a mobile device.

In the mobile-independent scheme, as illustrated in FIG. 17, the dialogue system 100 is provided in the mobile device 400.

Accordingly, it is not necessary to connect the mobile device 400 to the remote dialogue system server 1 to execute dialogue processing, and the mobile device 400 may autonomously process a dialogue with the user and supply a needed service to the user. Here, information necessary for dialogue processing and service supply may be taken from the external content server 300.

Hereinafter, a detailed configuration of the dialogue system 100 and a specific operation of each constituent element will be described more specifically. In an exemplary embodiment to be described below, a case in which the dialogue system 100 is provided in the vehicle 200 will be assumed to facilitate the description.

Figure 19A:
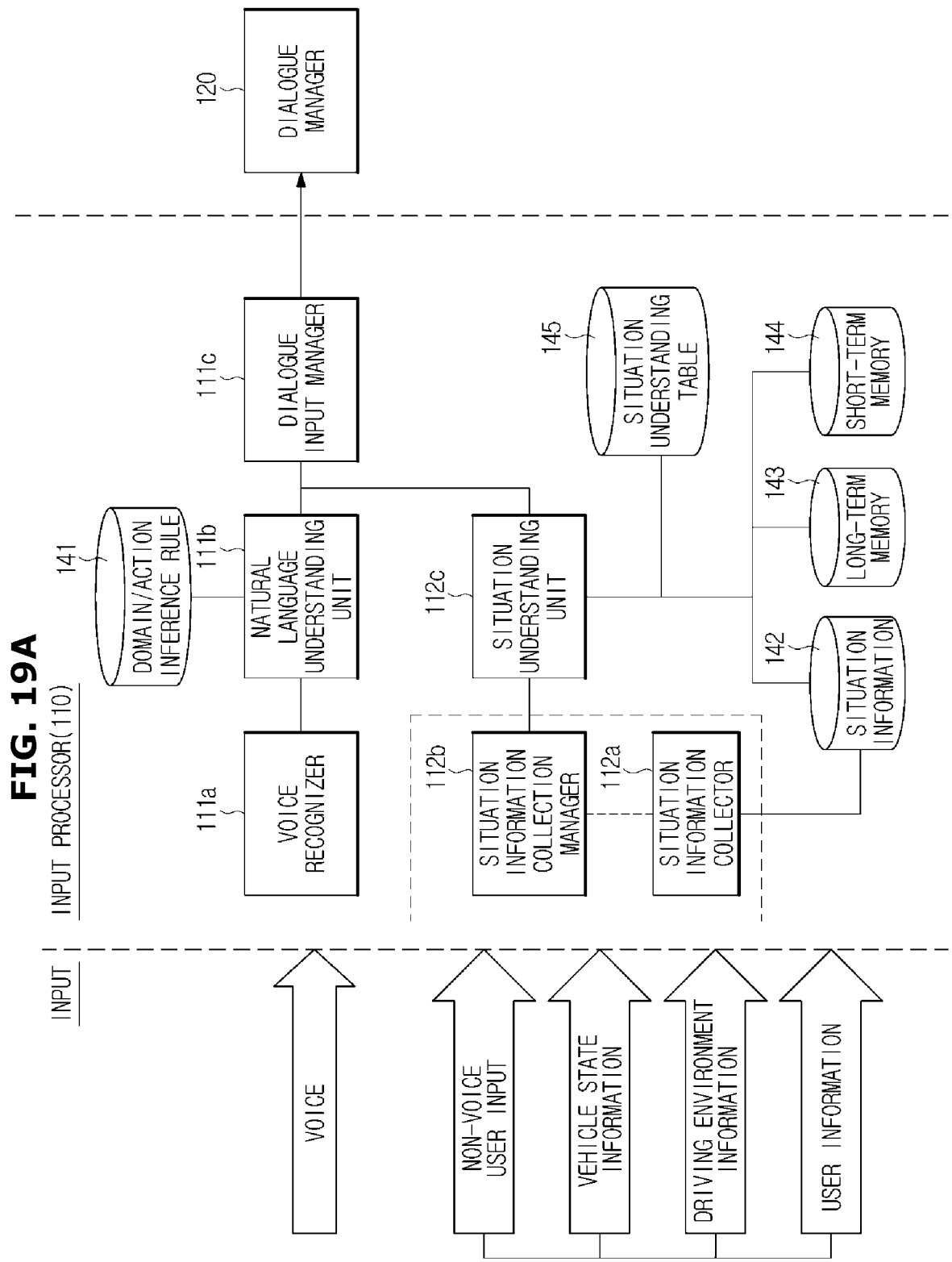
Figure 19B:
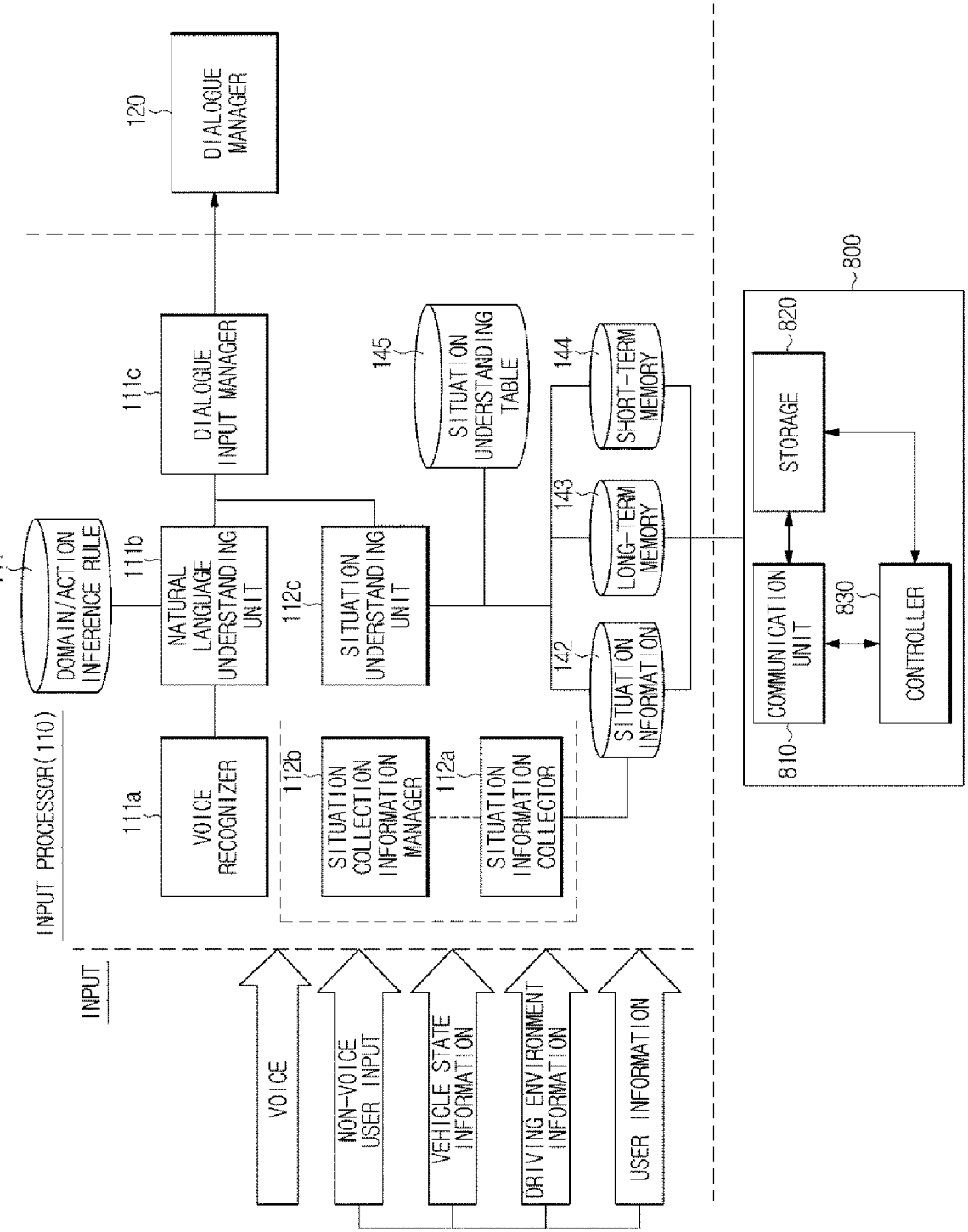

FIG. 18, FIG. 19A, and FIG. 19B are control block diagrams illustrating a subdivided configuration of an input processor in the configuration of the dialogue system.

Referring to FIG. 18, the input processor 110 may include a voice input processor 111 configured to process a voice input and a situation information processor 112 configured to process situation information.

A user's voice input via the voice input device 210 is transmitted to the voice input processor 111, and a non-voice user input input via the non-input device 220 is transmitted to the situation information processor 112.

The controller 240 transmits the vehicle state information, the driving environment information, and the user information to the situation information processor 112. The driving environment information and the user information may be supplied from the external content server 300 or the mobile device 400 connected to the vehicle 200.

The non-voice input may be included in the situation information. That is, the situation information may include vehicle state information, driving environment information, and user information.

The vehicle state information may include information indicating a state of the vehicle as information acquired by detectors provided in the vehicle 200 and information stored as information regarding the vehicle including a type of fuel of the vehicle, in the vehicle.

The driving environment information may include video information acquired by a front camera, a rear camera, or a stereo camera, obstacle information acquired by a detector including a radar, a lidar, or an ultrasonic detector, and rainfall amount/rainfall speed information acquired by a rainfall detector as information acquired by detectors provided in the vehicle 200.

The driving environment information may further include traffic situation information, traffic light information, and information regarding approach or collision likelihood of a nearby vehicle as information acquired through V2X.

The user information may include information regarding a state of the user measured through a camera or a biometric signal measurement device provided in the vehicle, information regarding the user directly input using an input device provided in the vehicle, information regarding the user stored in the external content server 300, and information stored in the mobile device 400 connected to the vehicle.

The voice input processor 111 may include a voice recognizer 111a configured to recognize an input user's voice and output the user's voice as a spoken sentence in a text format, a natural language understanding unit 111b configured to ascertain an intention of the user contained in the spoken sentence by applying a natural language understanding technology to the spoken sentence, and a dialogue input manager 111c configured to deliver a natural language understanding result and situation information to the dialogue manager 120.

The voice recognizer 111a may include a speech recognition engine. The speech recognition engine may recognize a voice spoken by the user by applying a voice recognition algorithm to an input voice and generate a recognition result.

At the present time, since the input voice is converted into a format more useful for voice recognition, a starting point and an ending point are detected from a voice signal to detect an actual voice section included in the input voice. This is referred to as end point detection (EPD).

As such, it is possible to extract a feature vector of the input voice by applying a feature vector extraction technology including cepstrum, linear predictive coefficient (LPC), Mel frequency cepstral coefficient (MFCC), or filter bank energy, in the detected section.

As such, it is possible to obtain a recognition result by comparing the extracted feature vector to a reference pattern. To obtain the recognition result, an acoustic model configured to model signal characteristics of a voice for comparison and a language model configured to model a language order relation between words, syllables, or the like corresponding to a recognized vocabulary may be used. To use the acoustic model and the language model, an acoustic model/language model DB may be stored in the storage 140.

The acoustic model may be classified into a direct comparison method of setting a recognition target with a feature vector model again and comparing the recognition target to feature vectors of voice data and a statistical method of statistically processing feature vectors of a recognition target for use.

As the direct comparison method, there is a vector quantization method as a representative method of setting a unit such as a word, a syllable, or the like which is a recognition target with a feature vector model and comparing how an input voice is similar to the unit. The vector quantization method is a method of mapping feature vectors of input voice data to a codebook which is a reference model and encoding the feature vectors with representative values to compare the encoded values.

The statistical model method is a method of configuring a unit for a recognition target in state sequences and using a relation between the state sequences. The state sequences may be configured as a plurality of nodes. As a method of using the relation between the state sequences, there is a method in which dynamic time warping (DTW), a hidden Markov model (HMM), or a neuron network is used.

The DTW is a method of compensation for a difference on a time axis at the time of a reference model in consideration of dynamic characteristics of a voice in which the length of a signal differs over time even when the same person speaks with the same pronunciation. The HMM is a recognition technology for assuming a voice by a Markov process having a state transition probability and an observation probability of a node (output symbol) in each state and subsequently estimating the state transition probability and the observation probability of the node through learned data and determining a probability of a voice input occurring in an estimation model.

On the other hand, in a language model configured to model a language order relation between words, syllables, or the like, it is possible to reduce acoustic ambiguity and reduce a recognition error by applying an order relation between units of language to units obtained in voice recognition. As the language model, there are a statistical language model and a model based on finite state automata (FSA). In the statistical language model, a word series probability including unigram, bigram, trigram, or the like is used.

The voice recognizer 111a may use any scheme among the above-described schemes in recognition of a voice. For example, an acoustic model to which the hidden Markov model is applied may be used or an N-best searching method in which an acoustic model and a voice model are integrated may be used. In the N-best searching method, up to N recognition result candidates may be selected using the acoustic model and the language model, and subsequently recognition performance may be improved by reevaluating an order of the recognition result candidates.

The voice recognizer 111*a* may determine a confidence value to guarantee confidence of the recognition result. The confidence value is an index indicating how reliable a voice recognition result is. For example, the confidence value can be defined as a relative value of a probability of speech of a syllable or a word which is a recognized result to a probability of speech of another syllable or word. Accordingly, the confidence value may be expressed as a value between 0 and 1 and may also be expressed as a value between 0 and 100.

When a confidence value exceeds a predetermined threshold, the recognition result may be output to execute an operation corresponding to the recognition result. When the confidence value is equal to or less than the threshold, the recognition result may be rejected.

A spoken sentence in a text format which is a recognition result of the voice recognizer 111*a* is input to the natural language understanding unit 111*b*.

The natural language understanding unit 111*b* may ascertain an intention of the user contained in the spoken sentence by applying a natural language understanding technology. Accordingly, the user may input a command through a natural dialogue and the dialogue system 100 may help the user to input a command through a dialogue or supply a service needed by the user.

First, the natural language understanding unit 111*b* executes morpheme analysis of the spoken sentence in the text format. Morphemes, the smallest units of a meaning, are the smallest meaningful elements which may not be further subdivided. Accordingly, in the morpheme analysis, an input sentence string is changed into a morpheme string as a first stage of the natural language understanding.

The natural language understanding unit 111*b* extracts a domain from a spoken sentence based on a morpheme analysis result. By facilitating the domain to identify subjects of a language spoken by the user, for example, domains indicating various subjects including a route guide, weather searching, traffic searching, schedule management, a refueling guide, and air-conditioning control are built as a database.

The natural language understanding unit 111*b* may recognize an entity name from the spoken sentence. The entity name is a unique name of a personal name, a place name, an organization name, a time, a date, a currency, or the like. Recognition of the entity name is a job of identifying the entity name in a sentence and determining a kind of recognized entity name. An important keyword may be extracted from a sentence through the recognition of the entity name and the meaning of the sentence may be ascertained.

The natural language understanding unit 111*b* may analyze a speech act corresponding to the spoken sentence. The analysis of the speech act is performed with a job of analyzing an intention of a user's speech to ascertain an intention of speech regarding whether a user inquires, requests, responds, or simply expresses a feeling.

The natural language understanding unit 111*b* extracts an action corresponding to a speech intention of the user. Based on information including a domain, an entity name, and a speech act corresponding to the spoken sentence, the speech intention of the user is ascertained and an action corresponding to the speech intention is extracted. The action may be defined by an object or an operator.

The natural language understanding unit 111*b* may also extract a factor related to action execution. The factor related to the action execution may be an effective factor directly necessary to execute an action or may be an ineffective factor used to extract the effective factor.

For example, when a spoken sentence of the user is "Let's go to Seoul Station," the natural language understanding unit 111*b* may extract "navigation" as a domain corresponding to the spoken sentence and extract "road guide" as an action. The speech act corresponds to "request."

"Seoul Station" which is an entity name corresponds to [factor: destination] related to the action execution, but a specific exit number or GPS information may be necessary for the road guide through actual navigation. In the instant case, [factor: destination: Seoul Station] extracted by the natural language understanding unit 111*b* may be a candidate factor for searching for Seoul Station actually desired by the user in several Seoul Station POIs.

The natural language understanding unit 111*b* may also extract means for expressing a mathematical relation between words or sentences as in a parse-tree.

The morpheme analysis result, the domain information, the action information, the speech act information, the extracted factor information, the entity name information, and the parse-tree which are processing results of the natural language understanding unit 111*b* are delivered to the dialogue input manager 111*c*.

The situation information processor 112 may include a situation information collector 112*a* configured to collect information from the non-voice input device 220 and the controller 240, a situation information collection manager 112*b* configured to manage collection of situation information, and a situation understanding unit 112*c* configured to understand a situation based on the natural language understanding result and the collected situation information.

The input processor 110 may include a memory configured to store programs used to execute the above-described operations or operations to be described below and a processor configured to execute the stored programs. A single memory and a single processor may be provided. When pluralities of memories and processors are provided, the memories and the processors may be integrated on one chip or may be physically divided.

The voice input processor 111 and the situation information processor 112 included in the input processor 110 may be realized by the same processor or may be realized by separate processors.

Hereinafter, how the constituent elements of the input processor 110 process input data using information stored in the storage 140 will be described with reference to FIGS. 19A and 19B.

Referring to FIG. 19A, the natural language understanding unit 111*b* may use a domain/action inference rule DB 141 to execute domain extraction, entity name recognition, speech act analysis, and action extraction.

A domain extraction rule, a speech act analysis rule, an entity name conversion rule, an action extraction rule, and the like may be stored in the domain/action inference rule DB 141.

Other information such as the non-voice user input, the vehicle state information, the driving environment information, and the user information may be input to the situation information collector 112*a* to be stored in the situation information DB 142, the long-term memory 143, or the short-term memory 144.

For example, raw data detected by the vehicle detector 260 may be stored separately with a detector type and a detector value in the situation information DB 142.

Data meaningful to the user, such as a current state of a user and preference/tendency of the user or data used to determine the current state or the preference/tendency of the user, may be stored in the short-term memory 144 and the long-term memory 143.

As described above, information usable for a long time due to guarantee of permanence, such as telephone numbers, schedules, preferences, educational background, personality, occupation, and family-related information related to the user, may be stored in the long-term memory 143. Information used for a short time period due to non-guarantee of permanence and uncertainty, such as a current/previous location, today's schedule, previous dialogue content, dialogue participants, a surrounding situation, a domain, and a driver state, may be stored in the short-term memory 144. According to kinds of data, the data may be stored in duplicate in two or more storage regions of the situation information DB 142, the short term memory 144, and the long-term memory 143.

Information related to which permanence is determined to be guaranteed among information stored in the short-term memory 144 may be sent to the long-term memory 143.

Information to be stored in the long-term memory 143 may also be acquired using information stored in the short-term memory 144 or the situation information DB 142. For example, a preference of a user may be acquired by analyzing destination information or dialogue content accumulated for a provided time and the acquired preference of the user may be stored in the long-term memory 143.

The information to be stored in the long-term memory 143 may be acquired using the information stored in the short-term memory 144 or the situation information DB 142 inside the dialogue system 100 or in a separate external system.

In the former case, the information may be acquired in the memory manager 135 of the result processor 130 to be described below. In the instant case, data used to acquire meaningful information or permanent information including a preference or tendency of the user, among the data stored in the short-term memory 144 or the situation information DB 142 may be stored in a log file format in the long-term memory 143. The memory manager 135 analyzes data accumulated for a provided time or more, acquires permanent data, and stores the data in the long-term memory 143 again. A position at which the permanent data is stored in the long-term memory 143 may be different from a position at which the data stored in the log file format is stored.

The memory manager 135 may also determine permanent data among the data stored in the short-term memory 144 and may move and store the determined data in the long-term memory 143.

When the information may be acquired in the separate external system, as illustrated in FIG. 19B, a data management system 800 including a communication device 810, a storage 820, and a controller 830 may be used.

The communication device 810 receives the data stored in the situation information DB 142 or the short-term memory 144. The stored data may all be transmitted to the communication device, or only meaningful information including the preference or the tendency of the user or only data used to acquire permanent information may be selected and transmitted. The received data is stored in the storage 820.

The controller 830 analyzes the stored data, acquires the permanent data, and transmits the acquired data to the dialogue system 100 via the communication device 810 again. The transmitted data is stored in the long term memory 143 of the dialogue system 100.

The dialogue input manager 111c may deliver an output result of the natural language understanding unit 111b to the situation understanding unit 112c and obtain situation information regarding the action execution.

The situation understanding unit 112c may determine what the situation information regarding the action execution corresponding to a speech intention of the user is, with reference to action-based situation information stored in the situation understanding table 145.

Figure 20A:
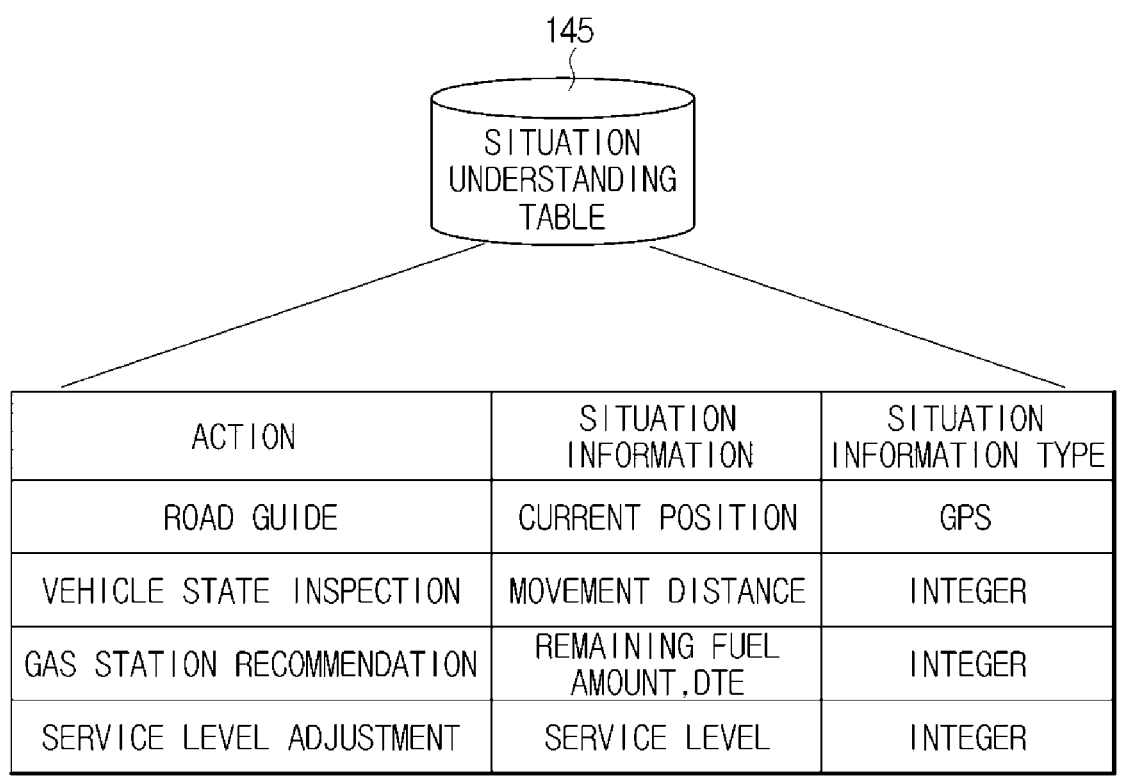
FIG. 20A and FIG. 20B are views illustrating exemplary information stored in a situation understanding table.
Figure 20B:
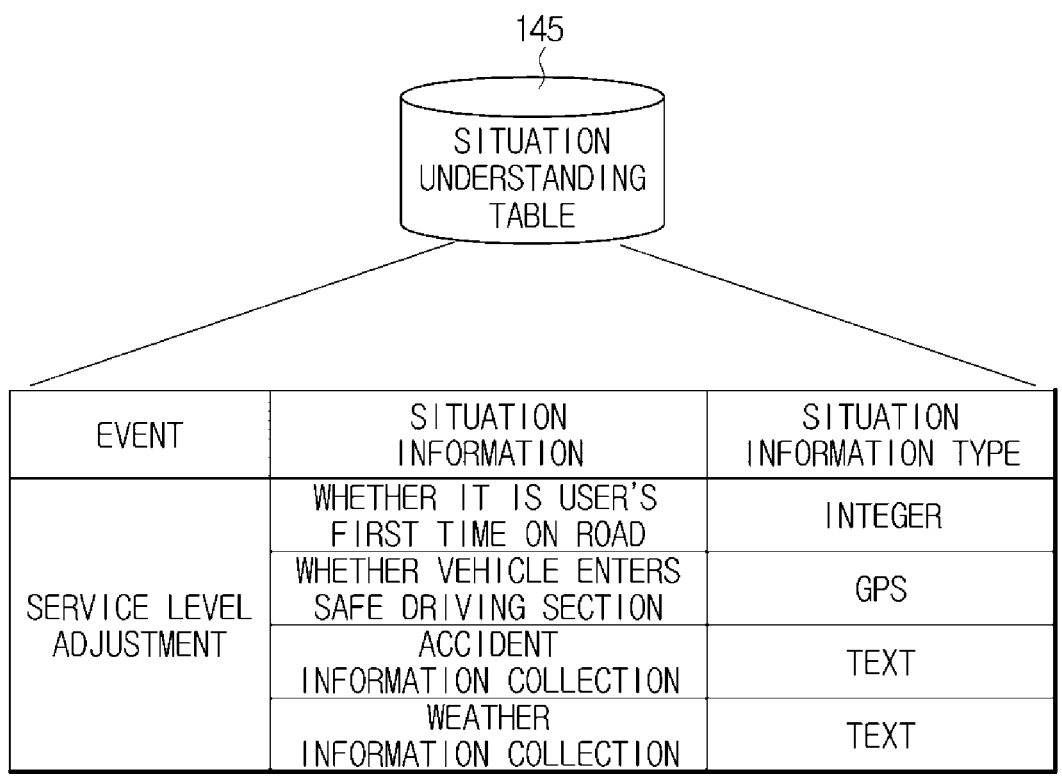

FIG. 20A and FIG. 20B are views illustrating exemplary information stored in a situation understanding table.

Referring to an example of FIG. 20A, situation information and situation information type related to the action execution may be stored by an action in the situation understanding table 145.

For example, when a road guide is an action, a current position may be necessary as the situation information and the situation information type may be GPS information. When vehicle state inspection is an action, a movement distance may be necessary as situation information and the situation information type may be an integer. When gas station recommendation is an action, a remaining fuel amount and a drivable distance (distance to empty (DTE)) may be necessary as the situation information and the situation information type may be an integer.

According to an included embodiment, the user may request the dialogue system 1 to adjust a service level. When service level adjustment is an action, the service level may be necessary as the situation information and the situation information type may be an integer.

When the situation information regarding the action execution corresponding to a speech intention of the user has already been stored in the situation information DB 142, the long-term memory 143, or the short-term memory 144, the situation understanding unit 112c takes corresponding information from the situation information DB 142, the long-term memory 143, or the short-term memory 144 and delivers the corresponding information to the dialogue input manager 111c.

When the situation information regarding the action execution corresponding to a speech intention of the user is not stored in the situation information DB 142, the long-term memory 143, or the short-term memory 144, the situation understanding unit 112c requests the situation information collection manager 112b to transmit necessary information. The situation information collection manager 112b causes the situation information collector 112a to collect the necessary information.

The situation information collector 112a may periodically collect data, may collect data when a specific event occurs, or may periodically collect data and additionally collect data when a specific event occurs. The situation information collector 112a may also collect data when a data collection request is input from situation information collection manager 112b.

The situation information collector 112a collects necessary information, stores the necessary information in the situation information DB 142 or the short-term memory 144, and transmits a confirmation signal to the situation information collection manager 112b.

The situation information collection manager 112b also transmits a confirmation signal to the situation understanding unit 112c. The situation understanding unit 112c takes the necessary information from the situation information DB 142, the long-term memory 143, or the short-term memory 144 and delivers the necessary information to the dialogue input manager 111c.

As a specific example, when an action corresponding to a speech intention of the user is a road guide, the situation understanding unit 112c may retrieve the situation understanding table 145 and know that the situation information regarding the road guide is the current position.

When the current position has already been stored in the short-term memory 144, the situation understanding unit 112c takes the current position from the short-term memory 144 and delivers the current position to the dialogue input manager 111c.

When the current position is not stored in the short-term memory 144, the situation information collection manager 112b is requested to transmit the current position. As such, the situation information collection manager 112b causes the situation information collector 112a to acquire the current position from the controller 240.

The situation information collector 112a acquires the current position, stores the current position in the short-term memory 144, and transmits a confirmation signal to the situation information collection manager 112b. The situation information collection manager 112b also transmits the confirmation signal to the situation understanding unit 112c. As such, the situation understanding unit 112c takes current position information from the short-term memory 144 and delivers the current position information to the dialogue input manager 111c.

The dialogue input manager 111c may deliver an output of the natural language understanding unit 111b and an output of the situation understanding unit 112c to the dialogue manager 120 and manage duplicate inputs so that the inputs are not input to the dialogue manager 120. At the present time, the output of the natural language understanding unit 111b and the output of the situation understanding unit 112c may be combined into one output and the combined output may be delivered to the dialogue manager 120 or may be independently delivered.

On the other hand, when data collected by the situation information collector 112a satisfies a predetermined condition and a specific event is determined to occur, the situation information collection manager 112b may transmit an action trigger signal to the situation understanding unit 112c.

The situation understanding unit 112c retrieves the situation understanding table 145 to search for the situation information regarding the relevant event. When the searched situation information is not stored, a request signal of the situation information is transmitted again to the situation information collection manager 112b.

As exemplified in FIG. 20B, the situation information regarding events and the situation information types may be stored by event in the situation understanding table 145.

An event occurring according to an exemplary embodiment of the present invention may be service level adjustment. The service level adjustment may be determined in accordance with the situation information collected in the situation understanding table 145.

As in the example described in FIG. 3, when the user inputs speech related to a road guide, the dialogue system 100 may determine the road guide by an action. Therefore, the dialogue system 100 may determine the service level adjustment by an association event as the event related to the road guide.

When the service level adjustment is determined by the event, the situation understanding table 145 may collect and store the situation information regarding the service level adjustment.

As the situation information regarding the service level adjustment stored in the situation understanding table 145 according to an included example, there are multiple kinds of information including information regarding whether the user is visiting the destination for the first time, information regarding whether the vehicle enters a safe driving caution section, accident information, and weather information.

The situation information may be stored with the situation information type in the situation understanding table 145. When the situation information is the information regarding whether the user is traveling on a road for the first time, the situation information type is stored as an integer. When the situation information is the information regarding whether the vehicle enters the safe driving caution section, the situation information type may be stored as a GPS value. When the situation information is the accident information or the weather information, the situation information type may be stored as text.

On the other hand, the situation information which is not stored in the situation understanding table 145 is managed by the situation information collection manager 112b. When the situation information regarding the service level adjustment is not stored in the situation understanding table 145, the situation information collection manager 112b collects necessary situation information via the situation information collector 112a and transmits a confirmation signal to the situation understanding unit 112c. The situation understanding unit 112c takes the necessary situation information from the situation information DB 142, the long-term memory 143, or the short-term memory 144 and delivers the necessary situation information to the dialogue input manager 111c along with the action information.

The dialogue input manager 111c inputs the output of the situation understanding unit 112c to the dialogue manager 120.

Figure 21:
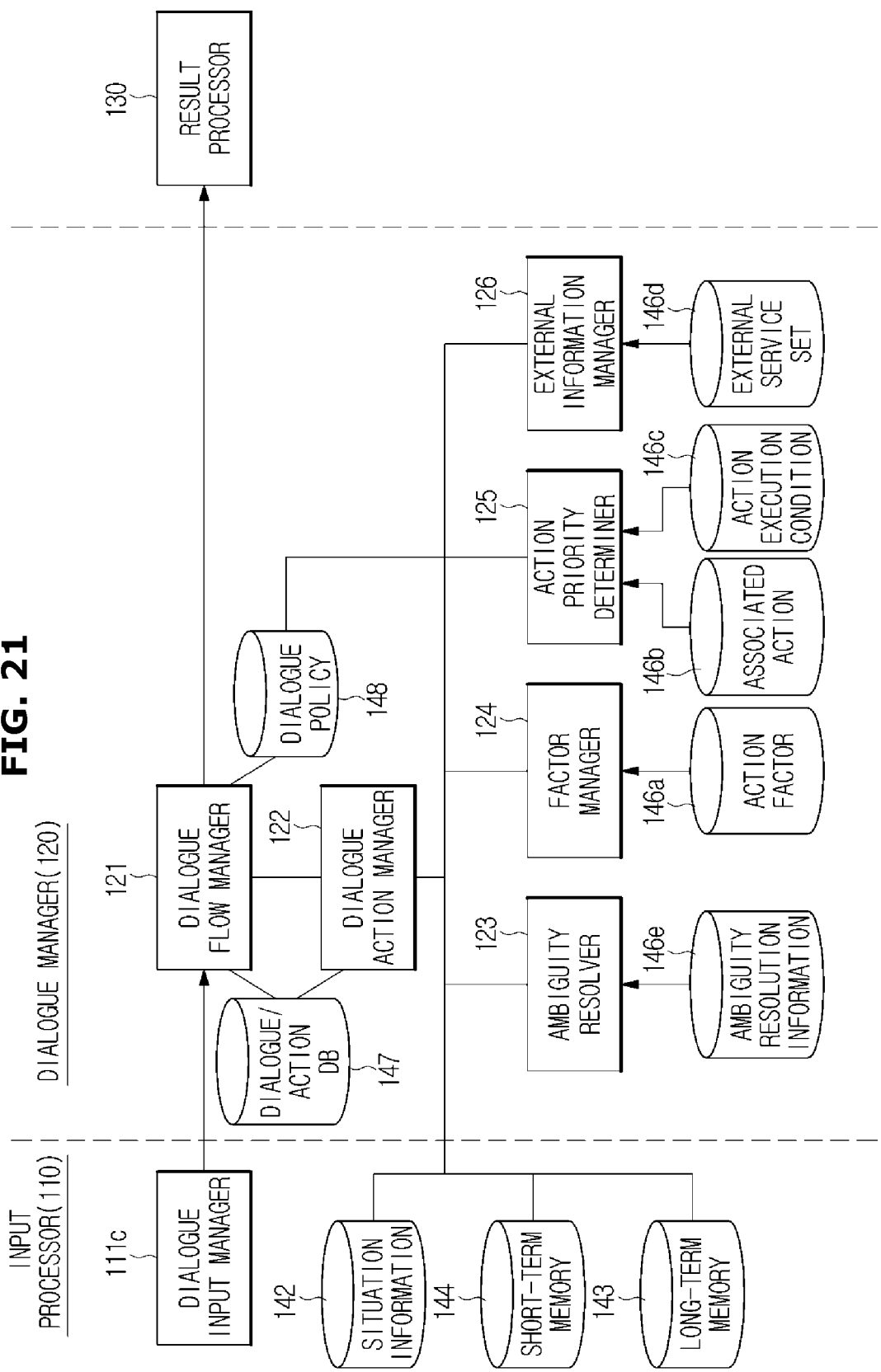
FIG. 21 is a control block diagram illustrating a subdivided configuration of a dialogue manager.
Figure 22:
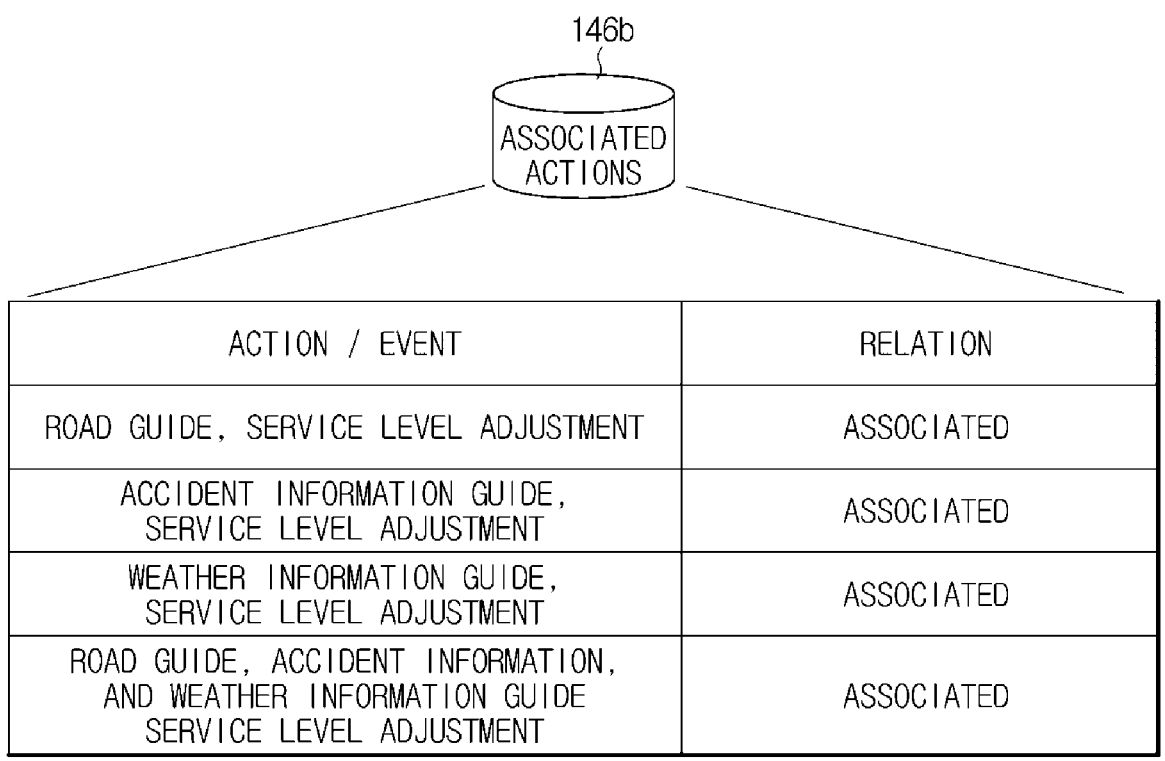
FIG. 22 is a view illustrating exemplary information stored in an associated action DB.
Figure 23:
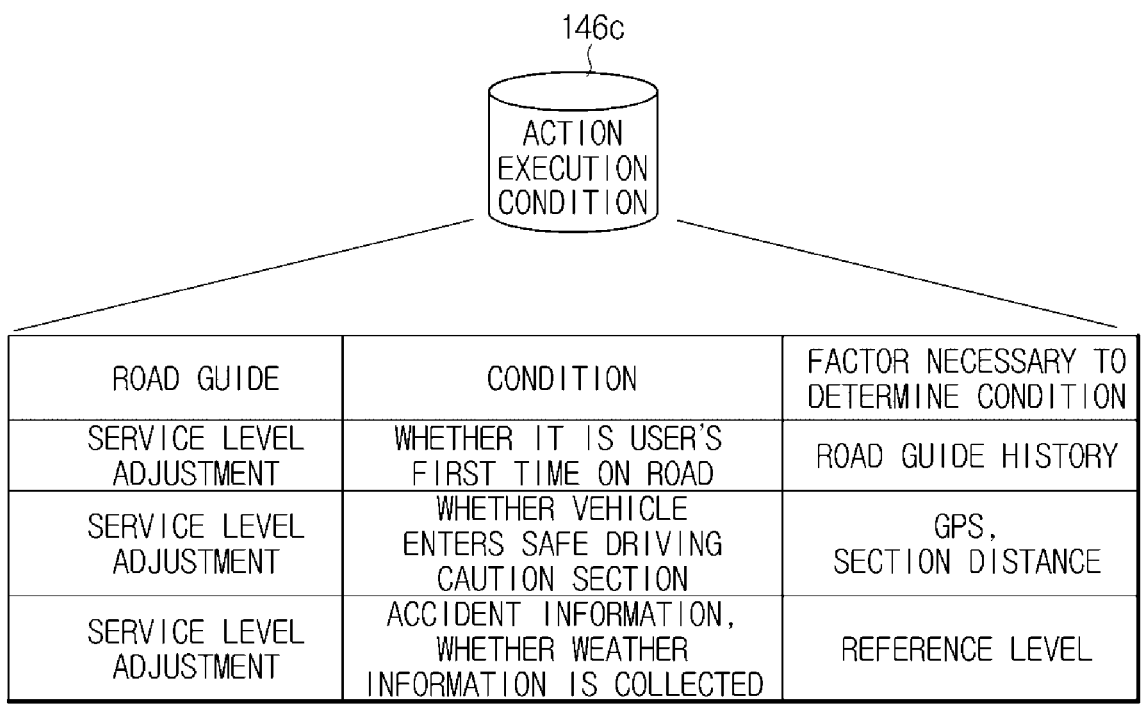
FIG. 23 is a view illustrating exemplary information stored in an action execution condition DB.

FIG. 21 is a control block diagram illustrating a subdivided configuration of a dialogue manager, FIG. 22 is a view illustrating exemplary information stored in an associated action DB, FIG. 23 is a view illustrating exemplary information stored in an action execution condition DB, and FIG. 24 is a view illustrating exemplary information stored in an action factor DB.

Referring to FIG. 21, the dialogue manager 120 may include a dialogue flow manager 121 configured to form a request to generate/delete/update a dialogue or an action, a dialogue action manager 122 configured to generate/delete/update the dialogue or the action in a response to the request from the dialogue flow manager 121, an ambiguity resolver 123 configured to resolve ambiguity of a situation and ambiguity of a dialogue and ultimately clarify an intention of the user, a factor manager 124 configured to manage a factor necessary for action execution, an action priority determiner 125 configured to determine whether the plurality of candidate actions are executed and determine priority of the candidate actions, and an external information manager 126 configured to manage an external content list and relevant information and manage factor information necessary for an external content query.

The dialogue manager 120 may include a memory configured to store programs used to execute the above-described operations or operations to be described below and a processor configured to execute the stored programs. A single memory and a single processor may be provided.

When pluralities of memories and processors are provided, the memories and the processors may be integrated on one chip or may be physically divided.

The constituent elements included in the dialogue manager 120 may be realized by a single processor or may be realized by separate processors.

The dialogue manager 120 and the input processor 110 may also be realized by a single processor or may be realized by separate processors.

A natural language understanding result (an output of a natural language understanding unit) and the situation information (an output of the situation understanding unit) which are outputs of the dialogue input manager 111a are input to the dialogue flow manager 121. The output of the natural language understanding unit 111b also includes not only information including a domain and an action but also information regarding speech content of the user including a morpheme analysis result. The output of the situation understanding unit 112c may include not only the situation information but also an event determined by the situation information collection manager 112b.

The dialogue flow manager 121 retrieves whether there is a dialogue task or an action task corresponding to an input from the dialogue input manager 111a in a dialogue/action DB 147.

The dialogue/action DB 147 is a storage space for managing states of dialogues and states of actions and may store dialogue states and action states of a currently progressing dialogue and action and reserve actions which progress in the future. For example, states of an ended dialogue/action, a stopped dialogue/action, a progressing dialogue/action, and a dialogue/action which will progress may be stored.

A final output state of switching/nesting of an action, a switched action index, an action change time, a screen/voice/command, or the like may be stored.

For example, when a domain and an action corresponding to a user's speech is extracted and there is a dialogue or an action corresponding to the domain and the action among the recently stored dialogues, the dialogue or the action may be determined to be a dialogue task or an action task corresponding to an input from the dialogue input manager 111a.

When the domain and the action corresponding to the user's speech are not extracted, the dialogue action generator 122 may be requested to generate any task or refer to the recently stored task.

When there is no dialogue task or action task corresponding to the output of the input processor 110 in the dialogue/action DB 147, the dialogue flow manager 121 requests the dialogue action manager 122 to generate a new dialogue task and a new action task.

The dialogue flow manager 121 may refer to a dialogue policy DB 148 to manage the flow of a dialogue. The dialogue policy DB 148 stores a policy for developing a dialogue and stores a policy for selecting/starting/proposing/stopping/ending a dialogue specifically.

The dialogue policy DB 148 may also store a policy for a viewpoint or a method of outputting a response by the system and may store a policy for making a response in association with several services and a policy for deleting an existing action and substituting the existing action with another action.

For example, when the number of candidate actions is plural or the number of actions corresponding to an intention or situation of the user is plural (actions A and B), both a policy of generating a response to two actions including "Execute action A and then execute action B?" at one time and a policy for generating a response to one action and subsequently generating a separate response to action B including "Action A is executed" and "Execute action B?" are possible.

According to an included embodiment, the dialogue system 100 may execute a road guide action including "Road guide is started" in a response to speech of a user making a request for guidance to Incheon International Airport. Furthermore, the dialogue system 100 may output a result to inquire about whether an action of service level adjustment is executed in accordance with a dialogue policy.

The dialogue policy DB 147 may also store a policy for determining priority between candidate actions. The priority determination policy will be described later.

The dialogue action manager 122 allocates a storage space to the dialogue/action DB 147 and generates a dialogue task and an action task corresponding to the output of the input processor 110.

Conversely, when the domain and the action may not be extracted from the speech of the user, the dialogue action manager 122 may generate any dialogue state. In the instant case, as will be described below, the ambiguity resolver 123 may ascertain an intention of the user and determine an appropriate action corresponding to the intention of the user based on speech content of the user, a surrounding situation, a vehicle state, user information, and the like.

When there are the dialogue task and the action task corresponding to the output of the input processor 110 in the dialogue/action DB 147, the dialogue flow manager 121 requests the dialogue action manager 122 to refer to the corresponding dialogue task and action task.

The action priority determiner 125 searches for an action list associated with the action or the event included in the output of the input processor 110 in the associated action DB 146b to extract the candidate actions.

As exemplified in FIG. 22, the associated action DB 146b may indicate mutually associated actions, a relation between the associated actions, actions associated with events, and a relation between the events and the associated actions. For example, at least one of the road guide, an accident information guide, and a weather information guide may be classified into an action associated with an action including service level adjustment and a relation between the actions may correspond to mutual association.

For example, the accident information is accident information attracting attention of a driver while driving of the vehicle 200. When the driver executes a service supplied by the dialogue system 100 or participates in a dialogue while driving the vehicle on a road on which there is accident information, the driver may be distracted. Accordingly, the dialogue system 100 may classify actions of recommending the service level adjustment while executing an action of providing the accident information, and a relation between the actions may correspond to mutual association.

Specifically, in execution of an action of providing the accident information, a service level adjustment action may be executed together. Here, executing the actions together may include both executing the service level adjustment action before or after the action of providing the accident information and executing the service level adjustment action together during the execution of the action of providing the accident information.

When the event determined in the situation information collection manager 112b is transmitted together from the input processor 110 in addition to the action corresponding to the user's speech, both an action associated with the action corresponding to the user's speech and action associated with the event can become candidate actions.

The extracted candidate action list is delivered to the dialogue action manager 122. As such, the dialogue action manager 122 adds the candidate action list to update an action state of the dialogue/action DB 147.

The action priority determiner 125 searches for conditions for executing each candidate action in an action execution condition DB 146c.

As exemplified in FIG. 23, the action execution condition DB 146c may store conditions necessary to execute actions and factors used to determine whether the conditions are satisfied action by action.

For example, the service level adjustment action which is an associated action of the road guide action may include whether the user is traveling on a road for the first time, whether the vehicle on a current route enters a safe driving caution section, and whether collected situation information is accident information or weather information, as action execution conditions.

The action execution condition DB 146c may store a road guide history, GPS coordinates, a distance to a safe driving caution section, and a reference level as condition determination factors along with the above-described conditions.

The action priority determiner 125 delivers the execution conditions of the candidate actions to the dialogue action manager 122. As such, the dialogue action manager 122 adds the action execution condition candidate action by candidate action to update an action state of the dialogue/action DB 147.

The action priority determiner 125 may search for a factor necessary to determine the action execution condition (hereinafter referred to as a condition determination factor) in the situation information DB 142, the long-term memory 143, the short-term memory 144, or the dialogue/action DB 147 and may determine whether each candidate action is executed using the searched factor.

When the factor used to determine the action execution condition is not stored in the situation information DB 142, the long-term memory 143, the short-term memory 144, or the dialogue/action DB 147, a necessary factor may be taken from the external content server 300 via the external information manager 126.

The action priority determiner 125 may determine whether each candidate action is executed using the factor necessary to determine the action execution condition. The priority of each candidate action may be determined based on whether each candidate action is executed and a priority determination rule stored in the dialogue policy DB 148.

Referring back to FIG. 23, the action priority determiner 125 collects the road guide history as the condition determination factor related to a first trip. When a current road guide history is not found in the road guide history, the action priority determiner 125 may determine that a condition for executing the service level adjustment action is satisfied.

The condition determination factor related to the entrance of the safe driving caution section may include current GPS coordinates and a distance to the safe driving caution section. When the distance from the current position to the safe driving caution section is equal to or greater than a predetermined distance, the action priority determiner 125 may set the priority of the service level adjustment action to be low since the vehicle has not yet entered the safe driving caution section.

According to the condition determination factor regarding whether the accident information or the weather information is collected, a level included in each piece of information may be determined. For example, each piece of accident information or weather information collected from the outside of the vehicle may include a level at which the dialogue system 100 can determine whether speech starts. When the accident information collected as the situation information is a large-scale accident, the accident information may include a level value predetermined in various pieces of data. When the level value included in the accident information is used as a condition determination factor and the level value exceeds a provided reference, the action priority determiner 125 may determine that a condition for executing the service level adjustment is satisfied.

A score for each candidate action may be determined in accordance with a current situation. Higher priority is allocated as the determined score is higher. For example, as expressed in [Math 1] below, an action corresponding a user's speech, a safety score, a convenience score, a processing time, a processing time point (whether a process is immediately executed), user preference (the degree of accommodation of the user at the time of suggestion of a service or preference defined in advance by the user), a manager score, a vehicle state association score, and an action success ratio (dialogue success ratio) may be used as factors for score determination.

$$\text{Priority score} = w1 * \text{user's speech action} + w2 * \text{safety score} + w3 * \text{convenience score} + w4 * \text{processing time} + w5 * \text{processing time point} + w6 * \text{user preference} + w7 * \text{manager score} + w8 * \text{vehicle state association score} + w9 * \text{action success ratio} * \text{whether action is executable (1: executable, undecided, 0: unexecutable)} * \text{whether action is completed (completed: 1, uncompleted: 0)} \quad [\text{Math 1}]$$

As described above, the action priority determiner 125 may supply a service needed by the user by searching for not only actions directly related to speech of the user or situation information but also an action list associated with the actions and determining the priority of the actions.

The action priority determiner 125 delivers information regarding whether each candidate action is executed and the priority to the dialogue action manager 122 and the dialogue action manager 122 adds the delivered information to update an action state of the dialogue/action DB 147.

The factor manager 124 may search for a factor used to execute each candidate action (hereinafter referred to as an action factor) in an action factor DB 146a.

As exemplified in FIG. 24, the action factor DB 146a may store an essential factor, a selection factor, an initial value of a factor, and a reference position for taking a factor by action. When the initial value of the factor is stored, a factor value corresponding to a relevant factor is not included in speech of the user or situation information output from the input processor 110, and a relevant factor value is not stored in the situation information DB 142 either, an action may be executed in accordance with the stored initial value or the user may be allowed to confirm whether the action is executed in accordance with the stored initial value.

For example, the essential factor used to execute a service level adjustment action may include a level integer value and the selection factor may include situation information input through the input processor 110. The initial value may include an integer value of a current service level.

The situation information may be acquired by sequentially retrieving the dialogue/action DB 147, the situation information DB 142, the short-term memory 144, and the long-term memory 143. For example, the situation information regarding the reference position is used to take information collected by searching for the road guide history, the accident information, and the weather information and determine whether the action is executed.

As another example, the essential factor used to execute the road guide action may include a current position and a destination and the selection factor may include a route type. A fast route may be stored with the initial value of the selection factor. The current position and the destination may be acquired by sequentially retrieving the dialogue/action DB 147, the situation information DB 142, the short-term memory 144, and the long-term memory 143.

As described above, the factor manager 124 takes a factor value of a factor searched in the action factor DB 146a from a relevant position. The reference position from which the factor value may be taken may be at least one of the situation information DB 142, the long-term memory 143, the short-term memory 144, the dialogue/action DB 147, and the external content server 300.

When the factor manager 124 takes the factor value from the external content server 300, the factor value may be taken via the external information manager 126. The external information manager 126 may determine where information is taken with reference to an external service set DB 146d.

The external service set DB 146d stores information regarding an external content server associated with the dialogue system 100. For example, the external service set DB 146d may store information regarding an external service name, description of an external service, a type of information supplied by the external service, an external service using method, and an entity supplying the external service.

The factor value acquired by the factor manager 124 is delivered to the dialogue action manager 122. As such, the dialogue action manager 122 adds a candidate-action-based factor value to the action state to update the dialogue/action DB 147.

The factor manager 124 may acquire the factor values of all the candidate actions and may also acquire the factor value of the candidate action determined to be executed by the action priority determiner 125.

The factor manager 124 may selectively use various factor values indicating the same information. For example, Seoul Station in a text format indicating a destination may be converted into Seoul Station in a POI format using a destination searching service of navigation.

When there is no ambiguity in a dialogue or a situation, necessary information may be obtained through operations of the action priority determiner 125, the factor manager 124, and the external information manager 126 described above, and the dialogue and the action may be managed. However, when there is ambiguity in the dialogue or the situation, it is difficult to supply an appropriate service needed by the user in only an operation of the action priority determiner 125, the factor manager 124, and the external information manager 126.

In the instant case, the ambiguity resolver 123 may resolve the ambiguity of the dialogue or the ambiguity of the situation. For example, when anaphora including "that person," "that place from yesterday," "father," "mother," "grandmother," and "daughter-in-law" is disposed in a dialogue and there is ambiguity about what is indicated, the ambiguity resolver 123 may resolve such ambiguity with reference to the situation information DB 142, the long-term memory 143, or the short-term memory 144 and may suggest a guide for resolving such ambiguity.

For example, ambiguous expressions including "that place from yesterday," "Mart A near home," and "Seoul Station where I went yesterday" included in a dialogue may be factor values of action factors or may correspond to factor values of condition determination factors. However, in the instant case, since the relevant words are ambiguous, an action may not actually be executed or an action execution condition may not be determined.

The ambiguity resolver 123 may resolve ambiguity of the factor value with reference to information stored in the situation information DB 142, the long-term memory 143, or the short-term memory 144. Alternatively, necessary information may also be taken from the external content server 300 using the external information manager 126 as necessary.

For example, by searching for a place that the user visited yesterday with reference to the short-term memory 144, "that place from yesterday" may be converted into information which can be used as a destination of the road guide action. By searching for a home address of a user with reference to the long-term memory 143 and taking positional information regarding Mart A near the home address from the external content server 300, "Mart A near home" may be converted into information which can be used as the destination of the road guide action.

When an action (an object or an operator) is not clearly extracted in the input processor 110 or an intention of the user is ambiguous, the ambiguity resolver 123 may ascertain an intention of the user and determine a corresponding action with reference to an ambiguity resolution information DB 146e.

FIG. 25 is a view illustrating exemplary information stored in an ambiguity resolution information DB.

The ambiguity resolution information DB 146e may store a spoken sentence in association with an action corresponding to the spoken sentence based on the vehicle state information and the surrounding situation information. The spoken sentence stored in the ambiguity resolution information DB 146e may be a spoken sentence from which an action may not be extracted through natural language understanding. In the example of FIG. 25, a case in which speech content of a morpheme analysis result is content the user's hand is cold or frozen will be described.

The surrounding situation information may include vehicle-outside temperature and information regarding rain. The vehicle state information may include information regarding whether an air conditioner/heater is turned on/off, an air volume, a wind direction, and information regarding whether a steering heat line is turned on/off.

As a specific example, when the outside temperature exceeds 20 degrees, it is raining, and an air conditioner is turned on, the temperature of the air conditioner may be set to be low, and thus it may be ascertained that the user's hands are cold. Thus, raising the temperature of the air conditioner by 3 degrees may be stored as a corresponding vehicle control action.

When the outside temperature exceeds 20 degrees, it is raining, and an air conditioner is turned off, it may be ascertained that a user feels cold due to the rain. Thus, turning a heater on may be stored as a corresponding vehicle control action.

When the outside temperature exceeds 20 degrees, it is not raining, an air conditioner is turned on, and a wind direction of the air conditioner is set to be oriented upward, wind of the air conditioner is directed toward the user's hands and it may be ascertained that the user's hands are cold. Thus, changing a wind direction of the air conditioner to be oriented downward may be stored as a corresponding vehicle control action.

When the outside temperature exceeds 20 degrees, it is not raining, an air conditioner is turned on, a wind direction of the air conditioner is set to be oriented downward, and a wind amount is set to be medium or higher, the wind direction of the air conditioner is strong and it may be ascertained that the user is cold. Thus, lowering the wind amount of the air conditioner may be stored as a corresponding vehicle control action.

When the outside temperature exceeds 20 degrees, it is not raining, an air conditioner is turned on, a wind direction of the air conditioner is set to be oriented downward, and a wind amount is set to be weak (low), raising the temperature of the air conditioner by 3 degrees may be stored as a corresponding vehicle control action.

When the outside temperature is lower than 20 degrees and a heater is turned off, it may be ascertained that the user's hands are cold due to the cold weather. Thus, turning the heater on may be stored as a corresponding vehicle control action.

When the outside temperature is lower than 20 degrees, a heater is turned on, and a steering heat line is turned off, it may be ascertained that the user's hands are cold because heat is not being delivered to the hands. Thus, turning the steering heat line on may be stored as a corresponding vehicle control action.

When the outside temperature is lower than 20 degrees, both a heater and a steering heat line are turned on, and a wind direction of the heater is set to be oriented downward, the wind of the heater is not delivered to the user's hands and thus it may be ascertained they are cold. Thus, changing the wind direction of the heater in both directions may be stored as a corresponding vehicle control action.

When the outside temperature is lower than 20 degrees, both a heater and a steering heat line are turned on, a wind direction of the heater is set to be oriented upward, and the temperature of the heater is set to be lower than the maximum, raising the temperature of the heater may be stored as a corresponding vehicle control action.

When the outside temperature is lower than 20 degrees, both a heater and a steering heat line are turned on, a wind direction of the heater is set to be oriented upward, the temperature of the heater is set to be the maximum, and the wind amount of the heater is not set to be the maximum, increasing the wind amount of the heater may be stored as a corresponding vehicle control action.

When the outside temperature is lower than 20 degrees, both a heater and a steering heat line are turned on, a wind direction of the heater is set to be oriented upward, both the temperature of the heater and the wind direction of the heater are set to be the maximum, and a heat line seat is turned off, turning the heat line seat on may be stored as a corresponding vehicle control action.

When the outside temperature is lower than 20 degrees, both a heater and a steering heat line are turned on, a wind direction of the heater is set to be oriented upward, both the temperature of the heater and the wind amount of the heater are set to be the maximum, and a heat line seat is turned on, an announcement to wait for a while since the heater is currently in full operation may be output in the corresponding vehicle control action.

FIG. 26A and FIG. 26B are tables summarizing various examples in which the ambiguity resolver resolves ambiguity, extracts an action with reference to the ambiguity resolution information DB, and control a vehicle.

For example, as illustrated in FIG. 26A and FIG. 26B, when speech content of a morpheme analysis result is content in that the user's hands are cold or frozen, a surrounding situation is summer, a vehicle state is a state in which a wind direction of an air conditioner is oriented toward the head of the user (upward), a predetermined temperature of the air conditioner is 19 degrees, and a wind amount is set to be the maximum, it may be ascertained that the user's hands are cold due to the wind of the air conditioner going to the hands. Accordingly, an air conditioner control action of changing the wind direction toward the user's feet (downward) and reducing the volume of the wind amount may be extracted as an action corresponding to the speech and the vehicle may be controlled in accordance with the extracted action.

In the speech with the same content, when the surrounding situation is winter, the vehicle state is a state in which the wind direction of the heater is oriented toward the feet of the passenger, a predetermined temperature of the air conditioner is 25 degrees, and a wind amount is set to be strong, it may be ascertained that the user's hands are cold because heat is not being delivered to the hands of the user. Accordingly, an action of turning a heat line of a steering wheel on may be extracted as an action corresponding to the speech and the vehicle may be controlled in accordance with the extracted action.

When the speech content of the morpheme analysis result is content that a user feels stuffy and the vehicle state is a state in which a vehicle speed is 30 km/h or less and intervals before and after the vehicle are less than 30 cm, it may be ascertained that the user feels stuffy due to traffic congestion. Accordingly, an action of changing a route option (fast route guidance) in a road guide action, playing multimedia content including music, or turning on a chatting function may be extracted as an action corresponding to the corresponding speech, and the vehicle may be controlled in accordance with the extracted action.

When the speech content of the morpheme analysis result is content that a user feels drowsy and the vehicle state is a state of an internal-air mode, it may be ascertained that the drowsiness is caused due to non-circulation of air. Accordingly, an action of changing the internal-air mode to an outer-air mode may be extracted as an action corresponding to the speech and the vehicle may be controlled in accordance with the extracted action.

In the speech with the same content, when the vehicle state is a state in which the outer-air mode is set and a heater is turned on, it may be ascertained that the drowsiness is caused due to heat released from the heater. Accordingly, opening a window may be extracted as an action corresponding to the speech and the vehicle may be controlled in accordance with the extracted action.

When the speech content of the morpheme analysis result is content that a user is sweating or feels hot, the surrounding situation is winter and a vehicle state is a state in which the heater is turned on, it may be ascertained that the hotness is caused due to heat of the heater. Accordingly, lowering the temperature of the heater or reducing a wind amount may be stored as an action corresponding to the speech.

In the speech with the same content, when the surrounding situation is winter and the heater is turned off, it may be ascertained that the hotness is caused due to heat of the body of the user. Accordingly, opening a window or recommending opening a window may be extracted as an action corresponding to the speech and the vehicle may be controlled in accordance with the extracted action.

In the speech with the same content, when the surrounding situation is summer and the vehicle state is a state in which the air conditioner is turned off, it may be ascertained that the hotness is caused due to a high temperature inside the vehicle. Accordingly, turning the air conditioner on may be extracted as an action corresponding to the speech and the vehicle may be controlled in accordance with the extracted action.

In the speech with the same content, when the surrounding situation is summer and the vehicle state is a state in which the air conditioner is turned on, it may be ascertained that the hotness is due to the temperature of the air conditioner being set too high. Accordingly, lowering the temperature of the air conditioner or increasing a wind amount may be extracted as an action corresponding to the speech and the vehicle may be controlled in accordance with the extracted action.

When the speech content of the morpheme analysis result is content that a user feels cold, the surrounding situation is summer and the vehicle state is a state in which the air conditioner is turned on, it may be ascertained that the coldness is due to the temperature of the air conditioner being to be low or the wind of the air conditioner being strong. Accordingly, raising the temperature of the air conditioner or reducing a wind amount may be extracted as an action corresponding to the speech and the vehicle may be controlled in accordance with the extracted action.

In the speech with the same content, when the surrounding situation is summer and the vehicle state is a state in which the air conditioner is turned off, it may be ascertained that the coldness is caused due to a problem of a body condition of the user. Accordingly, turning the heater on or checking a biorhythm of the user may be extracted as an action corresponding to the speech and the vehicle may be controlled in accordance with the extracted action.

In the speech with the same content, when the surrounding situation is winter and the vehicle state is a state in which the heater is turned on, it may be ascertained that the coldness is due to the temperature of the heater being set too low and a wind amount being weak. Accordingly, changing the internal-air mode to the outer-air mode or opening a window may be extracted as an action corresponding to the speech and the vehicle may be controlled in accordance with the extracted action.

In the speech with the same content, when the surrounding situation is winter and the vehicle state is a state in which the heater is turned off, it may be ascertained that the coldness is due to non-execution of the heater. Accordingly, executing the heater may be extracted as an action corresponding to the speech and the vehicle may be controlled in accordance with the extracted action.

When the speech content of the morpheme analysis result is content that a user has a headache, the surrounding situation is winter and the vehicle state is a state in which the heater is turned on, it may be ascertained that the headache is caused due to non-circulation of air. Accordingly, raising the temperature of the air conditioner or reducing a wind amount may be extracted as an action corresponding to the speech and the vehicle may be controlled in accordance with the extracted action.

In the speech with the same content, when the surrounding situation is winter and the vehicle state is a state in which the heater is turned off, it may be ascertained that the headache is caused due to coldness. Accordingly, executing the heater may be extracted as an action corresponding to the speech and the vehicle may be controlled in accordance with the extracted action.

In the speech with the same content, when the surrounding situation is summer and the vehicle state is a state in which the air conditioner is turned off, it may be ascertained that the headache is caused due to hotness. Accordingly, executing the air conditioner may be extracted as an action corresponding to the speech and the vehicle may be controlled in accordance with the extracted action.

In the speech with the same content, when the surrounding situation is summer and the vehicle state is a state in which the air conditioner is turned on, it may be ascertained that headache is caused due to air-conditioning. Accordingly, changing a wind direction or a wind amount of the air conditioner may be extracted as an action corresponding to the speech and the vehicle may be controlled in accordance with the extracted action.

When the speech content of the morpheme analysis result is content that a user feels uncomfortable, the surrounding situation is winter and it is raining, it may be ascertained that the discomfort is caused due to high humidity. Accordingly, executing a defogging function or executing a dehumidification function may be extracted as an action corresponding to the speech and the vehicle may be controlled in accordance with the extracted action.

In the speech with the same content, when the surrounding situation is summer and it is not raining, it may be ascertained that the discomfort is caused due to seasonal characteristics and heat. Accordingly, executing the air conditioner at the minimum temperature may be extracted as an action corresponding to the speech and the vehicle may be controlled in accordance with the extracted action.

In the speech with the same content, when the surrounding situation is summer and it is raining, it may be ascertained that the discomfort is caused due to heat and high humidity. Accordingly, executing the air conditioner in a dehumidification mode may be extracted as an action corresponding to the speech and the vehicle may be controlled in accordance with the extracted action.

In the operation of the ambiguity resolver 123 described above, an action actually desired by the user or an action actually necessary for the user may be accurately ascertained and supplied by considering the surrounding situation information and the vehicle state information along with speech of the user even when there is ambiguity in the speech or a situation of the user.

The information regarding the action determined by the ambiguity resolver 123 may be delivered to the dialogue action manager 122. As such, the dialogue action manager 122 may update the dialogue/action DB 147 based on the delivered information.

Even for the action determined by the ambiguity resolver 123, the action priority determiner 125 and the factor manager 124 determine the action execution conditions, determine priority, and execute an operation of taking a factor value, as described above.

When the values acquirable by the current situation and the dialogue are all acquired among the factor values used to execute each action, the dialogue action manager 122 transmits a signal to the dialogue flow manager 121.

Conversely, when a factor value necessary for the action execution or the condition determination is not in the dialogue/action DB 147, the external content server 300, the long-term memory 143, the short-term memory 144, and the situation information DB 142 and is acquirable via a user, the result processor 130 may also generate a dialogue response to inquire of the user about the factor value.

The dialogue flow manager 121 delivers a dialogue state and information regarding an action corresponding to the top priority to the result processor 130. Information regarding a plurality of candidate actions may also be delivered in accordance with a dialogue policy.

Figure 27:
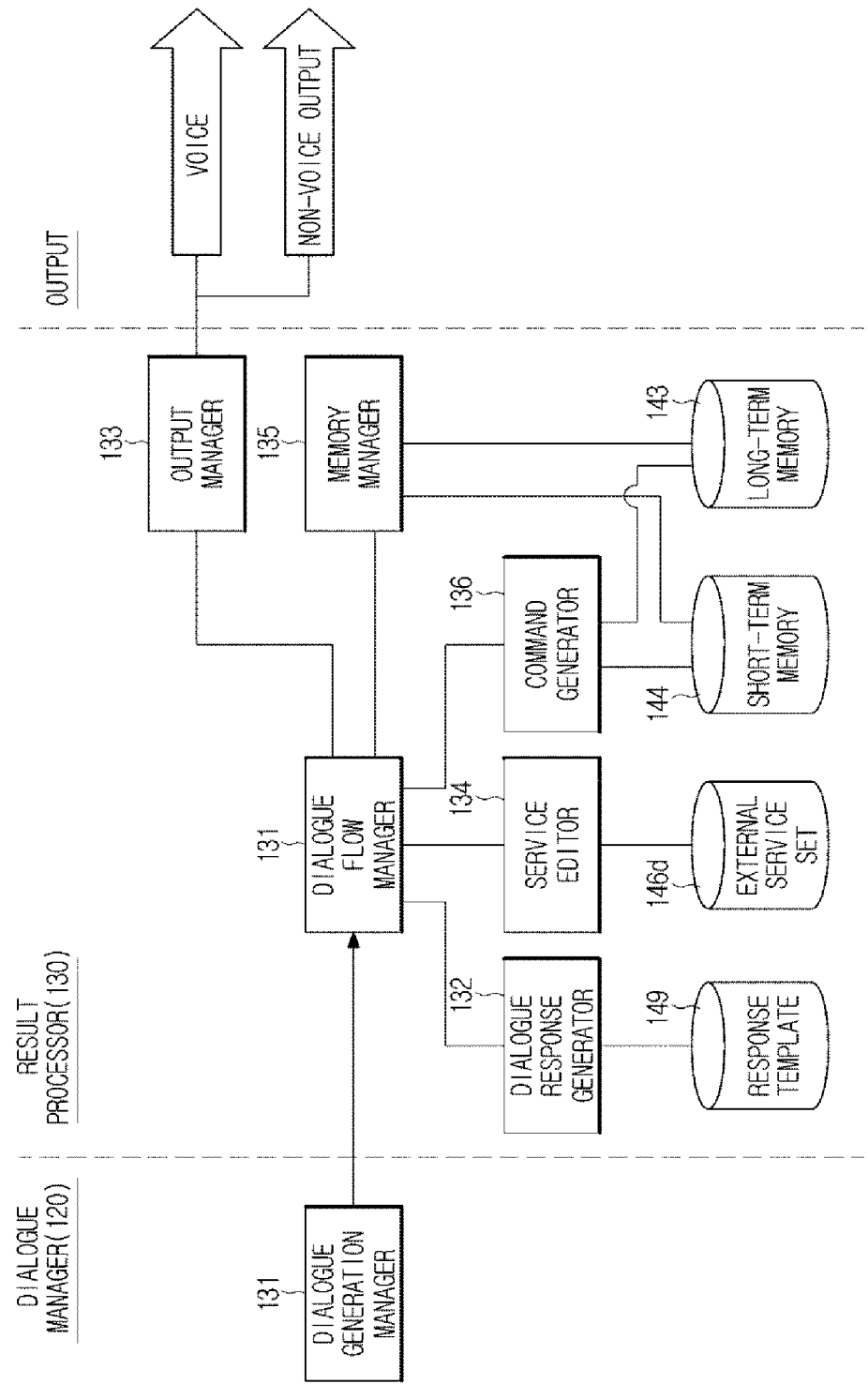
FIG. 27 is a control block diagram illustrating a subdivided configuration of a result processor.

FIG. 27 is a control block diagram illustrating a subdivided configuration of the result processor.

Referring to FIG. 27, the result processor 130 includes a response generation manager 131 configured to manage generation of a response necessary to execute an action input from the dialogue manager 120, a dialogue response generator 132 configured to generate a text response, an image response, or an audio response in a response to a request of the response generation manager 131, a command generator 136 configured to generate a command for vehicle control or a command for supplying a service using external content in a response to a request of the response generation manager 131, a service editor 134 configured to sequentially or sporadically execute several services to supply a service desired by the user and gather result values, an output manager 133 configured to output the generated text response, image response, or audio response or output the command generated by the command generator and decide an output order when the number of outputs is plural, and a memory manager 135 configured to manage the long-term memory 143 and the short-term memory 144 based on the output of the response generation manager 131 and the output manager 133.

The result processor 130 may include a memory configured to store programs used to execute the above-described operations or operations to be described below and a processor configured to execute the stored programs. A single memory and a single processor may be provided. When pluralities of memories and processors are provided, the memories and the processors may be integrated on one chip or may be physically divided.

The constituent elements included in the result processor 130 may be realized by the same processor or may be realized by separate processors.

The result processor 130, the dialogue manager 120, and the input processor 110 may be realized by the same processor or may be realized by separate processors.

Responses output to correspond to speech or situations of the user may include a dialogue response, vehicle control, and external content supply. The dialogue response may have a format of a response with an initial dialogue, an inquiry, and information supply and may be stored as a database in a response template 149.

The response generation manager 131 requests the dialogue response generator 132 and the command generator 136 to generate a response necessary to execute an action determined by the dialogue manager 120. To generate the response, information regarding an action to be executed may be transmitted to the dialogue response generator 132 and the command generator 136. The information regarding the action to be executed may include an action name and a factor value. To generate the response, the dialogue response generator 132 and the command generator 136 may refer to a current dialogue state and action state.

The dialogue response generator 132 may extract a dialogue response form by retrieving the response template 149 and generate a dialogue response by filling a factor value necessary for the extracted dialogue response form. The generated dialogue response is delivered to the response generation manager 131. When the factor value necessary for the generation of the dialogue response is not delivered from the dialogue manager 120 or an instruction to use external content, the external content may be supplied from the external content server 300 or may be delivered in the long-term memory 143, the short-term memory 144, or the situation information DB 142.

For example, when the action determined by the dialogue manager 120 corresponds to a road guide, the response template 149 may be retrieved to extract "Guide is started," as the dialogue response form.

According to a disclosed embodiment, when the dialogue manager 120 determines service level adjustment through an associated action, situation information regarding the service level adjustment is collected. When a collected route history to a guided destination indicates that it is the user's first visit, the dialogue manager 120 may extract "This is your first time on the present route. You should limit your use of the dialogue service," and "Would you still like to use it?" as a dialogue response form from the response template 149.

When a response to speech or a situation of the user includes the vehicle control or the external content supply, the command generator 136 generates a command to execute the vehicle control or the external content supply. For example, when an action determined by the dialogue manager 120 is control of an air conditioning device, a window, a seat, AVN, or the like, the command generator 136 generates a command to execute the control and delivers the command to the response generation manager 131.

Alternatively, when it is necessary to supply external content in the action determined by the dialogue manager 120, the command generator 136 generates a command to receive the content from the external content server 300 and delivers the command to the response generation manager 131.

When the number of commands generated by the command generator 136 is plural, the service editor 134 determines an order and a method of executing the plurality of commands and delivers the order and the method to the response generation manager 131.

The response generation manager 131 delivers the response delivered from the dialogue response generator 132, the command generator 136, or the service editor 134 to the output manager 133.

The output manager 133 determines an output timing, an output order, an output position, or the like of the dialogue response generated by the dialogue response generator 132 and the command generated by the command generator 136.

The output manager 133 outputs the response by transmitting the dialogue response generated by the response generator 132 and the command generated by the command generator 136 at an appropriate timing, in an appropriate order, and to an appropriate output position. A text to speech (TTS) response may be output through the speaker 232 and the text response may be output through the display 231. When the dialogue response is output in a TTS format, a TTS module provided in the vehicle 200 may be used or the output manager 133 may include the TTS module.

The command may be transmitted to the controller 240 depending on a control target or may be transmitted to the communication device 280 to communicate with the external content server 300.

The response generation manager 131 may also deliver a response delivered from the dialogue response generator 132, the command generator 136, or the service editor 134 to the memory manager 135.

The output manager 133 may also deliver a response output by the output manager 133 to the memory manager 135.

The memory manager 135 manages the long-term memory 143 and the short-term memory 144 based on the content delivered from the response generation manager 131 and the output manager 133. For example, based on the generated and output dialogue response, the memory manager 135 may update the short-term memory 144 by storing dialogue content between the user and the system or may update the long-term memory 143 by storing information regarding the user acquired through dialogue with the user.

Of the information stored in the short-term memory 144, meaningful and permanent information such as a tendency or preference of the user or information used to acquire the meaningful and permanent information may also be stored in the long-term memory 143.

Based on the vehicle control corresponding to the generated and output command or an external content request, the preference of the user, the vehicle control history, or the like stored in the long-term memory 143 may also be updated.

In the dialogue system 100 according to the above-described embodiment, an optimum service needed by the user may be supplied in consideration of various situations occurring inside a vehicle. Even when speech of a user is not input, the dialogue system 100 can determine a service needed by the user based on collected situation information or driver information and can supply the service preemptively.

The dialogue system 100 according to a disclosed example can limit the service level supplied by the dialogue system 100 and selectively supply a service when a current situation input with the situation information is a situation to which a driver has to pay attention.

For example, when the service level is limited and subsequently dialogue steps with the user exceed the predetermined number of times, the dialogue system 100 can output a warning response. The dialogue system 100 can limit the searching function so that the driver can drive carefully. An exemplary embodiment will be described later in FIG. 30 and the like.

Furthermore, the dialogue system 100 can vary an evaluation reference of the vehicle state in accordance with a situation at the time of starting a vehicle and can preemptively supply feedback. A driving start time point is defined as a vehicle starting time, an electronic parking brake (EPB) cancellation time, a navigation destination setting time. Weighting values are provided to a vehicle state evaluation system determining a driving function score and individual units and the variable weighting values to be applied to individual units are changed depending on situation elements. When a vehicle state is determined to be problematic, a problem solution for the individual unit including a repair shop guide may be supplied.

The dialogue system 100 may determine whether a fuel amount is not to reach a destination at the time of starting the vehicle, may automatically add a favorite gas station of the user as a stop along a route to the destination as feedback when the fuel amount is not enough, and may guide the user to the gas station. A gas station automatically added as a stop in a response to the user may be changed.

Even when a current vehicle state does not indicate that a fuel amount is not enough, a refueling place or time may be preemptively supplied by considering a future schedule of the user, a main movement record, a remaining fuel amount, and the like.

Information regarding a physical state and sleeping record of a driver may be acquired and starting a vehicle may be permitted conditionally based on the acquired information. For example, when the physical state and the sleeping record are recognized outside of the vehicle and thus a risk of a drowsiness is recognized, a driver may be encouraged not to drive. Alternatively, information regarding recommended driving hours may be supplied in accordance with the physical state and the sleeping record.

When a trigger indicating a risk of drowsiness repeatedly occurs, a risk of drowsiness may be detected, and a warning may be output in accordance with the degree of detected risk or feedback for automatically changing a route (a rest area) may be supplied. The trigger indicating a risk of drowsiness may be acquired by manually measuring a state of a driver or a state of a vehicle, for example, when a reduction in a hearing rate is indicated, a distance to a preceding vehicle is equal to or greater than a reference distance, or a speed is equal to or less than a reference speed. Alternatively, the trigger may actively be acquired through a dialogue, for example, by inquiring of a driver and measuring a response speed of the driver.

When a user inputs speech expressing his or her feeling, a specific domain or action may not be extracted from the speech of the user. However, the dialogue system 100 can ascertain an intention of the user and develop a dialogue using surrounding situation information, vehicle state information, user state information, or the like. The present example can be executed by causing the ambiguity resolver 230 to resolve ambiguity of the speech of the user, as described above.

Figure 28:
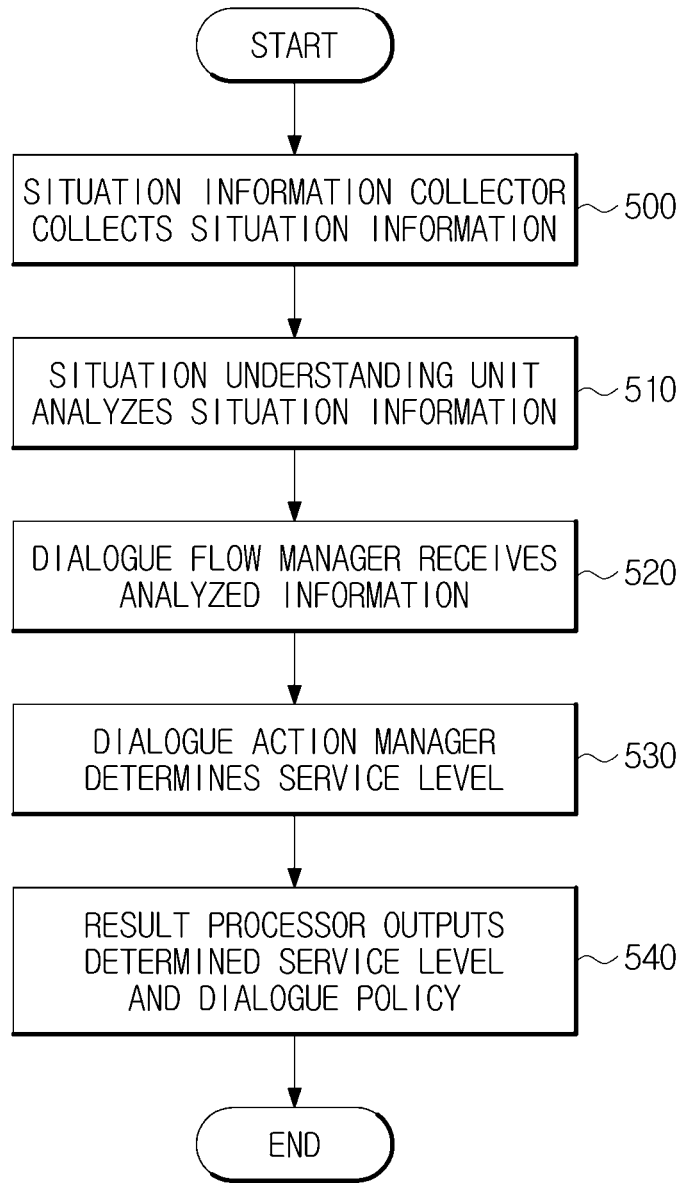
FIG. 28 is a flowchart illustrating adjustment of a service level by the dialogue system according to an exemplary embodiment.

FIG. 28 is a flowchart illustrating adjustment of a service level by the dialogue system according to an exemplary embodiment.

According to an exemplary embodiment of the present invention, the dialogue system 100 collects the situation information while driving of a vehicle (500).

The situation information may include driving environment information and various other kinds of information. For example, the situation information includes at least one of information regarding whether it is a driver's first time on a driving route to a road guide destination, accident information on the driving route, a safe driving caution section in which a driver has to drive carefully, and weather information. Even when the vehicle 200 is not driving, the situation information may include various information interfering with concentration of a user.

On the other hand, the situation information is collected via the controller 240, the non-voice input device 220, and the communication device 280 by the situation information collector 112a included in the dialogue system 100.

The situation information collected by the situation information collector 112a is delivered to the situation understanding unit 112c via the situation information collection manager 112b. The situation understanding unit 112c analyzes the situation information (510).

The situation understanding unit 112c examines an association relation between the collected situation information and a currently executed dialogue service.

For example, the situation understanding unit 112c may determine an association relation between a road guide requested by the user and the service level adjustment. The situation understanding unit 112c may analyze a history of the collected road guides and derive a result which is a first trip. When it is the user's first time visiting a guidance destination, the situation understanding unit 112c may determine that the current situation information is associated with the service level adjustment. The situation understanding unit 112c delivers the analyzed information to the dialogue manager 120, the dialogue flow manager 121 (520).

The dialogue flow manager 121 may determine whether an output regarding the service level adjustment is executed through the current dialogue/action state with the user. When the dialogue flow manager 121 determines that a dialogue regarding the service level adjustment is necessary in terms of a current dialogue policy, the dialogue flow manager 121 controls the dialogue action manager 122.

The dialogue action manager 122 determines the service level to be changed under the control of the dialogue flow manager 121 (530).

The dialogue action manager 122 may determine the service level in accordance with a determination reference stored in the dialogue/action DB 147. A specific determination reference will be described later in FIG. 29.

When the dialogue manager 120 determines the service level, the dialogue flow manager 121 determines speech for informing of a change in the service level through the dialogue policy 148.

The determined dialogue policy and the service level may be delivered to the result processor 130. As such, when the dialogue policy and the service level are delivered, the result processor 130 may output a TTS response through the speaker 232 and output a text response through the display 231 (540).

Thereafter, when agreement of the user is input, the dialogue system 100 outputs a service executed by the dialogue system 100 and a control signal delivered to the controller 240 in accordance with the determined service level. A specific description of the service limitation will be made later in FIG. 30.

FIG. 29 is a view illustrating a determination reference by which a service level is determined according to an exemplary embodiment.

Referring to FIG. 29, the situation information related to the driving environment information may include navigation information, accident information, and weather information.

First, when the navigation information is input as situation information, the dialogue system 100 may use information regarding whether it is the user's first time on the current route and whether the guidance driving route is the safe driving section, as a determination reference. When the input navigation information corresponds to the determination reference, a service determination parameter increases by +1.

Here, the service determination parameter is a numerical value (integer) for determining the service level. That is, the dialogue system 100 may apply the determination reference of the currently input driving environment information and determine the service level in accordance with a total sum of the service determination parameters for each piece of information.

As another example, when the accident information is input as driving environment information, the dialogue system 100 may use information regarding whether there is accident information on the route as a determination reference. When the accident information is disposed in the current driving route, the dialogue system 100 increases the service determination parameter by +1.

As yet another example, when the weather information is input as the driving environment information, the dialogue system 100 may determine whether the weather information corresponds to rain/fog/snow or the like or may use information regarding whether attention on the current driving route is necessary for weather as a determination reference.

On the other hand, determination references of the service level in the dialogue system 100 are not limited thereto and various determination references are used. The above-described determination references may be combined to serve as determination references of the service level. For example, when the situation information includes information indicating that it is the user's first time on the driving route and accident information is received together during the first trip, a total sum of the service determination parameters may increase.

FIG. 30 is a view illustrating an example of limitation of a service adjusted in accordance with a service level.

According to a disclosed example, the service level is classified into a basic dialogue type, attention stage 1, attention stage 2, and attention stage 3.

The basic dialogue type is a stage at which all the services to be supplied to the dialogue system 100 are supplied and may include all of various operations of executing a dialogue with a user and controlling the controller 240 in accordance with a dialogue result.

The attention stage 1 is a stage at which higher caution than the basic dialogue type is necessary. At the attention stage 1, the dialogue system 100 may limit a service to the user checking his or her own speech.

The service for the user checking his or her own speech may be a service for transmitting text or an e-mail through the mobile device 400. While driving, the user may request the dialogue system 100 to transmit text or an e-mail to the outside via the mobile device 400 or the communication device 280 connected to the vehicle 200. After the dialogue system 100 completes a service, the user may request a service for confirming a transmitted factor. The service may endanger the user by reducing his or her concentration on driving since the user has to read text. Accordingly, at the attention stage 1, the dialogue system 100 may limit a checking service for confirming text after transmitting text or an e-mail.

The dialogue system 100 may utilize a response for requesting attention as a dialogue policy when the number of dialogue steps increases along with the above-described service limitation.

The dialogue system 100 may request a driver to pay attention by outputting a warning response to the driver when the number of dialogue steps exceeds a predetermined number of times. The attention request may be stored in the dialogue policy DB 148 and may be output under the control of the dialogue manager 120.

The attention stage 2 is a stage at which higher attention than the attention stage 1 is necessary. At the attention stage 2, not only the service limited at the attention stage 1 but also a searching function is limited. Since there is a large probability of the user confirming a searching result in the searching function, there is a danger of decreasing concentration on driving.

The searching function may include a function of searching for information via an Internet communication network through the dialogue system 100 or searching for various information stored in the controller 240.

The dialogue system 100 may utilize a response for requesting attention as a dialogue policy when the number of dialogue steps increases along with the service limitation as in the attention stage 1.

The attention stage 3 is a stage at which higher attention than the attention stage 2 is necessary. The dialogue system 100 may execute only an emergency dialogue with a user.

The emergency dialogue includes a rescue request and urgent warning control of a vehicle. At the attention stage 3, most of the services supplied by the dialogue system 100 may be limited.

On the other hand, the service level is merely an example of the present invention and can be modified variously without limitation.

Figure 31:
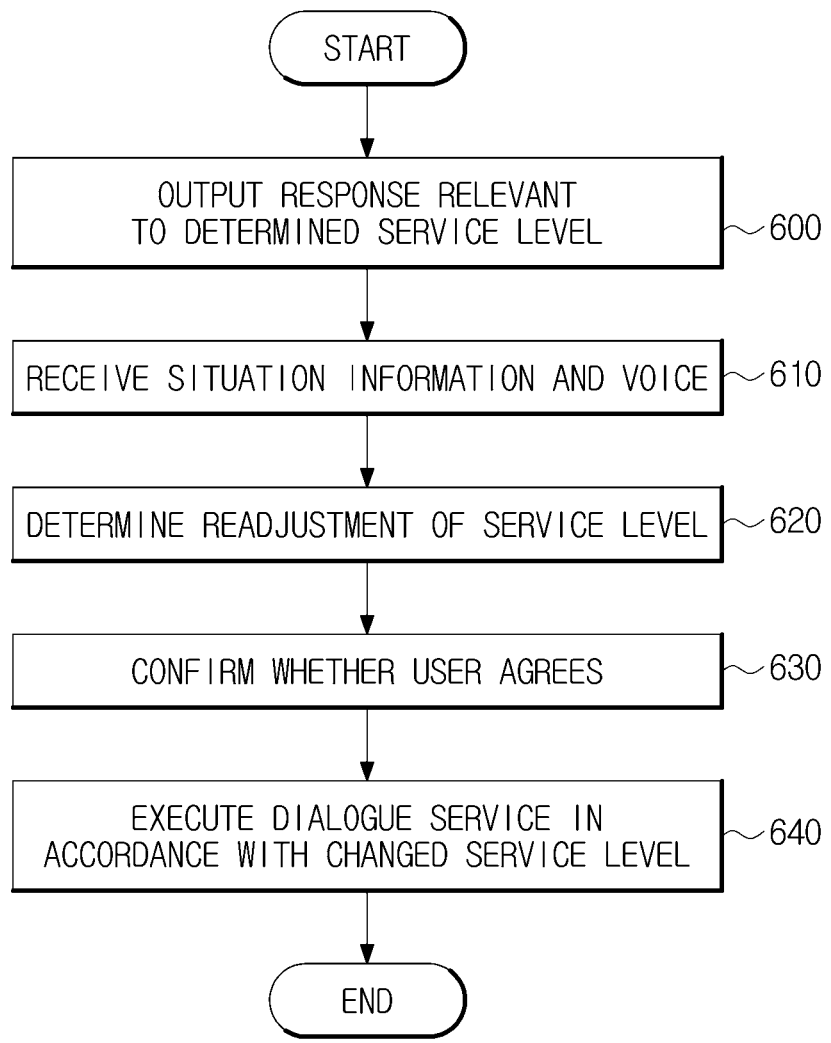
FIG. 31 is a flowchart illustrating adjustment of a service level according to another exemplary embodiment of the present invention.

FIG. 31 is a flowchart illustrating adjustment of a service level according to another exemplary embodiment of the present invention.

Referring to FIG. 31, the dialogue system 100 may determine a service level and output a response relevant to the service level, as described in FIG. 28 and the like (600).

The dialogue system 100 may continuously receive situation information and a voice of a user while executing an operation in accordance with the determined service level (610).

After the service level is adjusted, the dialogue system 100 continuously receives the situation information and the voice of the user via the input processor 110. That is, although the service level of the dialogue system 100 is limited, the kind of collected information is not limited.

The dialogue system 100 may determine whether the service level is readjusted through the collected driving environment information and voice of the user even after the service level is adjusted (620).

For example, when the situation information provided as a determination reference of the service limitation is cancelled, the dialogue system 100 delivers a situation of a change in the situation information to the user. The adjustment of the service level may be inquired again.

As another example, while driving, the user may cancel the limitation in accordance with the determined service level. The user may request the dialogue system 100 to change the service level. After the natural language understanding of the user of the dialogue system 100, the service level determined in accordance with a factor may be changed.

That is, the included dialogue system 100 may actively or passively change the service level and supply a service suitable for a situation even when the service level is limited.

The dialogue system 100 may ask the user to agree when the service level is determined to be readjusted (630).

Such stages are executed in accordance with a policy stored in the dialogue policy DB. When there is a response of the user, the dialogue system 100 executes the service in accordance with the changed service level (640).

The dialogue system 100 included in the stages may supply a service suitable for the situation of the user beyond the limitation that an intention of the user is ascertained in accordance with an existing standard dialogue scenario, minimize attention distraction of the user, and offer safe driving and general safety.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A dialogue system comprising:
an input processor configured to extract situation information including at least one of vehicle state information regarding a state of a vehicle and driving environment information regarding a driving environment of the vehicle or an action corresponding to speech of a user;
a storage configured to store the extracted situation information;
a dialogue manager configured to determine a service level to be supplied based on the situation information and determine an action of adjusting the determined service level; and
a result processor configured to generate speech to execute the determined action and generate a control signal of service limitation based on the determined service level,
wherein the storage stores a dialogue policy to be executed in accordance with the determined service level, and the result processor generates a response for a result of the service limitation based on the dialogue policy and outputs the response for notifying the user that a service is adjusted in accordance with the determined service level,
wherein the dialogue manager applies a determination reference of currently input driving environment information and determines the service level based on a determination parameter,
wherein the dialogue manager increases the determination parameter when the currently input driving environment information corresponds to the determination reference, and
wherein the dialogue manager acquires situation information necessary to determine whether the action corresponding to the determined service level is executed from the storage and determines the action of adjusting the service level based on the acquired situation information.

2. The dialogue system according to claim 1, wherein
the storage stores situation information associated with the extracted action, and
the input processor extracts an action of service level adjustment associated with an action corresponding to the speech.

3. The dialogue system according to claim 2, wherein the input processor requests the vehicle to transmit situation information necessary to determine the service level when situation information regarding the action for adjusting the service level associated with the action corresponding to the speech is not stored in the storage.

4. The dialogue system according to claim 1, wherein the storage stores the determination parameter for determining the service level.

5. The dialogue system according to claim 4, wherein the dialogue manager determines the service level based on the determination parameter and the situation information.

6. The dialogue system according to claim 1, wherein the dialogue manager determines an action of readjusting the adjusted service level based on new situation information received by the input processor.

7. The dialogue system according to claim 6, wherein the result processor generates speech to execute an action regarding a changed service level.

8. The dialogue system according to claim 6, wherein the result processor generates a control signal of the vehicle based on the changed service level.

9. The dialogue system according to claim 1, further including:
a communication device configured to receive the situation information from the vehicle and transmit a response to the vehicle.

10. The dialogue system according to claim 1, further including:
a communication device configured to communicate with an external server,
wherein the dialogue manager requests the external server to transmit a factor value when the situation information is not able to be acquired from the storage.

11. The dialogue system according to claim 1, further including:
a communication device configured to receive the situation information from a mobile device connected to the vehicle and transmit a response and the control signal of the service limitation to the mobile device.

12. The dialogue system according to claim 1,
wherein the determination parameter is a numerical value for determining the service level, and
wherein the dialogue manager determines the service level in accordance with a total sum of determination parameters for each of the driving environment information.

13. A dialogue service processing method comprising:
storing situation information including at least one of vehicle state information regarding a state of a vehicle and driving environment information regarding a driving environment of the vehicle in a storage;
extracting the situation information and an action corresponding to speech of a user;
acquiring, from the storage, at least one of a factor value of a condition determination factor used to determine whether at least one action candidate including the action corresponding to the speech is executed and a factor value of an action factor used to execute the at least one action candidate;
determining a service level to be supplied based on the situation information and an action to be executed from the at least one action candidate based on the acquired factor value of the condition determination factor; and
generating a control signal of service limitation based on the determined service level and a response to execute the determined action using the acquired factor value of the action factor,
wherein the storage stores a dialogue policy to be executed in accordance with the service level, and the generating of the control signal includes generating a response for a result of the service limitation based on the dialogue policy and outputting the response for notifying the user that a service is adjusted in accordance with the determined service level,
wherein the determining the service level to be supplied based on the situation information comprises:
applying a determination reference of currently input driving environment information; and
determining the service level based on a determination parameter, and
wherein the determination parameter increases when the currently input driving environment information corresponds to the determination reference, and
wherein the determining of the service level includes determining the service level using the situation information as the factor value of the condition determination factor or the factor value of the action factor.

14. The dialogue service processing method according to claim 13, further including:
storing situation information regarding an action in the storage by action; and
acquiring situation information regarding the action corresponding to the speech from the storage and transmitting the acquired situation information to a dialogue manager.

15. The dialogue service processing method according to claim 14, further including:
requesting the vehicle to transmit situation information necessary to determine the service level when the situation information regarding the action corresponding to the speech is not stored in the storage.

16. The dialogue service processing method according to claim 13, wherein the service level is changed based on the situation information delivered by the vehicle.

17. The dialogue service processing method according to claim 13, wherein the situation information includes at least one of navigation information, accident information, and weather information.

18. The dialogue service processing method according to claim 13,
wherein the determination parameter is a numerical value for determining the service level, and
wherein the determining the service level in accordance with a determination parameter comprises determining the service level in accordance with a total sum of determination parameters for each of the driving environment information.

19. A vehicle comprising:
a dialogue system including:
an input processor configured to extract situation information including at least one of vehicle state information regarding a state of a vehicle and driving environment information regarding a driving environment of the vehicle or an action corresponding to speech of a user,
a storage configured to store the extracted situation information,
a dialogue manager configured to determine a service level to be supplied based on the situation information and determine an action of adjusting the determined service level, and
a result processor configured to generate speech to execute the determined action and generate a control signal of service limitation based on the determined service level,
wherein the storage stores a dialogue policy to be executed in accordance with the determined service level, and the result processor generates a response for a result of the service limitation based on the dialogue policy and outputs the response for notifying the user that a service is adjusted in accordance with the determined service level,
wherein the dialogue manager applies a determination reference of currently input driving environment information and determines the service level based on a determination parameter,
wherein the dialogue manager increases the determination parameter when the currently input driving environment information corresponds to the determination reference, and
wherein the dialogue manager acquires situation information necessary to determine whether the action corresponding to the determined service level is executed from the storage and determines the action of adjusting the service level based on the acquired situation information.

20. The vehicle according to claim 19, further including:
a controller configured to execute an operation related to the determined service based on the control signal.

21. The vehicle according to claim 19,
wherein the determination parameter is a numerical value for determining the service level, and
wherein the dialogue manager determines the service level in accordance with a total sum of determination parameters for each of the driving environment information.

* * * * *